(12) United States Patent
Mercer et al.

(10) Patent No.: US 10,934,104 B2
(45) Date of Patent: Mar. 2, 2021

(54) INFEED ASSEMBLY QUICK CHANGE FEATURES

(71) Applicant: Stolle Machinery Company, LLC, Centennial, CO (US)

(72) Inventors: Richard James Edward Mercer, North Yorkshire (GB); Ian Kenneth Scholey, Barnsley (GB); Seth Daniel Holdmeyer, Cincinnati, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 18 days.

(21) Appl. No.: 16/407,229

(22) Filed: May 9, 2019

(65) Prior Publication Data
US 2019/0344976 A1 Nov. 14, 2019

Related U.S. Application Data

(60) Provisional application No. 62/670,199, filed on May 11, 2018.

(51) Int. Cl.
*B65G 29/02* (2006.01)
*B65G 43/08* (2006.01)
(Continued)

(52) U.S. Cl.
CPC .......... *B65G 47/848* (2013.01); *B21D 43/18* (2013.01); *B21D 51/2638* (2013.01);
(Continued)

(58) Field of Classification Search
CPC .... B65G 47/848; B65G 47/918; B65G 29/02; B65G 43/08; B21D 43/18; B21D 51/2638; B21D 51/2692
(Continued)

(56) References Cited

U.S. PATENT DOCUMENTS

| | | | |
|---|---|---|---|
| 1,698,999 | A | 1/1929 | Hothersall |
| 3,357,755 | A | 12/1967 | Danly |

(Continued)

FOREIGN PATENT DOCUMENTS

| | | |
|---|---|---|
| EP | 0041302 | 12/1981 |
| EP | 0075068 | 3/1983 |

(Continued)

OTHER PUBLICATIONS

Stolle Machinery Company, LLC, PCT/US19/31406 International Search Report, dated Aug. 2, 2019, 16 pages.

*Primary Examiner* — Douglas A Hess
(74) *Attorney, Agent, or Firm* — Eckert Seamans Cherin & Mellott, LLC

(57) ABSTRACT

A quick-change starwheel guide assembly is structured to be coupled to a starwheel guide assembly mounting base. The quick-change starwheel guide assembly includes a starwheel guide assembly mounting assembly, a starwheel guide assembly support assembly, a number of starwheel guide assembly guiderails and a starwheel guide assembly can body height adjustment assembly. The starwheel guide assembly mounting assembly is coupled to the starwheel guide assembly support assembly. The starwheel guide assembly guiderails are coupled to the starwheel guide assembly mounting assembly. The starwheel guide assembly can body height adjustment assembly is coupled to at least one the starwheel guide assembly guiderail. At least one of the starwheel guide assembly mounting assembly or the can body height adjustment assembly is a quick-change assembly.

18 Claims, 43 Drawing Sheets

(51) Int. Cl.
  *B65G 47/84* (2006.01)
  *B65G 47/91* (2006.01)
  *B21D 51/26* (2006.01)
  *B21D 43/18* (2006.01)

(52) U.S. Cl.
  CPC ......... *B21D 51/2692* (2013.01); *B65G 29/02* (2013.01); *B65G 47/918* (2013.01); *B65G 2201/0252* (2013.01); *B65G 2207/08* (2013.01)

(58) Field of Classification Search
  USPC ................. 198/471.1, 473.1, 803.1, 803.5
  See application file for complete search history.

(56) References Cited

U.S. PATENT DOCUMENTS

| | | |
|---|---|---|
| 3,581,542 A | 6/1971 | Wahler et al. |
| 3,600,927 A | 8/1971 | Wahler |
| 3,603,275 A | 9/1971 | Eickenhorst et al. |
| 3,680,350 A | 8/1972 | Pavleszek et al. |
| 3,687,098 A | 8/1972 | Maytag |
| 3,688,538 A | 9/1972 | Hoyne |
| 3,757,558 A | 9/1973 | Heinle |
| 3,760,751 A | 9/1973 | Dunn et al. |
| 3,763,807 A | 10/1973 | Hilgenbrink |
| 3,771,345 A | 11/1973 | Paramonoff |
| 3,782,314 A | 1/1974 | Franek et al. |
| 3,786,957 A | 1/1974 | Hilgenbrink |
| 3,808,868 A | 5/1974 | Wolfe |
| 3,812,696 A | 5/1974 | Kneusel et al. |
| 3,820,486 A | 6/1974 | Hilgenbrink |
| 3,831,416 A | 8/1974 | Wolfe |
| 3,845,653 A | 11/1974 | Hilgenbrink |
| 3,898,828 A | 8/1975 | Cassai et al. |
| 3,964,413 A | 6/1976 | Saunders |
| 3,983,729 A | 10/1976 | Traczyk et al. |
| 3,995,572 A | 12/1976 | Saunders |
| 4,018,176 A | 4/1977 | Gnyp et al. |
| 4,034,692 A | 7/1977 | Hennes et al. |
| 4,058,998 A | 11/1977 | Franek et al. |
| 4,070,888 A | 1/1978 | Gombas |
| RE30,144 E | 11/1979 | Gnyp et al. |
| 4,173,883 A | 11/1979 | Boik |
| 4,261,193 A | 4/1981 | Boik |
| 4,272,977 A | 6/1981 | Gombas |
| 4,280,353 A | 7/1981 | Murphy |
| 4,341,103 A | 7/1982 | Escallon et al. |
| 4,380,165 A | 4/1983 | Post |
| 4,392,764 A | 7/1983 | Kubis et al. |
| 4,403,493 A | 9/1983 | Atkinson |
| 4,446,714 A | 5/1984 | Cvacho |
| 4,450,700 A | 5/1984 | Robertson, Jr. et al. |
| 4,457,158 A | 7/1984 | Miller et al. |
| 4,502,425 A | 3/1985 | Wride |
| 4,512,172 A | 4/1985 | Abbott et al. |
| 4,513,595 A | 4/1985 | Cvacho |
| 4,519,232 A | 5/1985 | Traczyk et al. |
| 4,527,412 A | 7/1985 | Stoffel et al. |
| 4,563,887 A | 1/1986 | Bressan et al. |
| 4,578,007 A | 3/1986 | Diekhoff |
| 4,606,207 A | 8/1986 | Slade |
| 4,693,108 A | 9/1987 | Traczyk et al. |
| 4,723,430 A | 2/1988 | Hahn |
| 4,732,027 A | 3/1988 | Traczyk et al. |
| 4,760,725 A | 8/1988 | Halasz |
| 4,774,839 A | 10/1988 | Caleffi et al. |
| 4,781,047 A | 11/1988 | Bressan et al. |
| 4,826,382 A | 5/1989 | Bulso, Jr. et al. |
| 4,854,149 A | 8/1989 | Porucznik et al. |
| 4,885,924 A | 12/1989 | Claydon et al. |
| 5,018,379 A | 5/1991 | Shirai et al. |
| 5,024,077 A | 6/1991 | Bulso, Jr. et al. |
| 5,121,621 A | 6/1992 | Ihly |
| 5,138,858 A | 8/1992 | Johnson et al. |
| 5,222,385 A | 6/1993 | Halasz et al. |
| 5,228,321 A | 7/1993 | Shibasaka |
| 5,245,848 A | 9/1993 | Lee, Jr. et al. |
| 5,249,449 A | 10/1993 | Lee et al. |
| 5,253,500 A | 10/1993 | Willoughby |
| 5,282,375 A | 2/1994 | Lee, Jr. et al. |
| 5,297,414 A | 3/1994 | Sainz |
| 5,325,696 A | 7/1994 | Jentzsch et al. |
| 5,341,667 A | 8/1994 | Lee, Jr. |
| 5,349,836 A | 9/1994 | Lee, Jr. |
| 5,351,852 A | 10/1994 | Trageser et al. |
| 5,353,619 A | 10/1994 | Chu et al. |
| 5,355,709 A | 10/1994 | Bauder et al. |
| 5,355,710 A | 10/1994 | Diekhoff |
| 5,372,028 A | 12/1994 | Brilman et al. |
| 5,394,727 A | 3/1995 | Diekhoff et al. |
| 5,433,098 A | 7/1995 | Bowlin et al. |
| 5,448,903 A | 9/1995 | Johnson |
| 5,467,628 A | 11/1995 | Bowlin et al. |
| 5,469,729 A | 11/1995 | Hager |
| 5,487,295 A | 1/1996 | Diekhoff et al. |
| 5,497,900 A | 3/1996 | Caleffi et al. |
| 5,522,248 A | 6/1996 | Diekhoff et al. |
| 5,524,468 A | 6/1996 | Jentzsch et al. |
| 5,540,352 A | 7/1996 | Halasz et al. |
| 5,553,826 A | 9/1996 | Schultz |
| 5,557,963 A | 9/1996 | Diekhoff |
| 5,572,893 A | 11/1996 | Goda et al. |
| 5,611,231 A | 3/1997 | Marritt et al. |
| 5,676,006 A | 10/1997 | Marshall |
| 5,678,445 A | 10/1997 | Schultz |
| 5,628,786 A | 11/1997 | Hahn |
| 5,697,242 A | 12/1997 | Halasz et al. |
| 5,704,241 A | 1/1998 | Babbitt et al. |
| 5,706,686 A | 1/1998 | Babbitt et al. |
| 5,711,178 A | 1/1998 | Hogendoorn et al. |
| 5,713,235 A | 2/1998 | Diekhoff |
| 5,724,848 A | 3/1998 | Aschberger |
| 5,730,314 A | 3/1998 | Wiemann et al. |
| 5,737,958 A | 4/1998 | Sainz et al. |
| 5,755,130 A | 5/1998 | Tung et al. |
| 5,768,932 A | 6/1998 | Hahn |
| 5,775,161 A | 7/1998 | Caleffi et al. |
| 5,778,723 A | 7/1998 | Diekhoff |
| 5,785,294 A | 7/1998 | Schultz |
| 5,813,267 A | 9/1998 | Aschberger et al. |
| 5,832,769 A | 11/1998 | Schultz |
| 5,836,473 A | 11/1998 | Jentzsch et al. |
| 5,934,127 A | 8/1999 | Ihly |
| 5,960,666 A | 10/1999 | Schultz |
| 6,032,502 A | 3/2000 | Halasz et al. |
| 6,055,836 A | 5/2000 | Waterworth et al. |
| 6,058,753 A | 5/2000 | Jowitt et al. |
| 6,077,544 A | 6/2000 | Debregeas et al. |
| 6,077,554 A | 6/2000 | Wiemann et al. |
| 6,079,244 A | 6/2000 | Robinson et al. |
| 6,085,563 A | 7/2000 | Heiberger et al. |
| 6,094,961 A | 8/2000 | Aschberger |
| 6,098,832 A | 8/2000 | Jentzsch et al. |
| 6,132,155 A | 10/2000 | Gouliard et al. |
| 6,164,109 A | 12/2000 | Bartosch |
| 6,167,743 B1 | 1/2001 | Marritt et al. |
| 6,178,797 B1 | 1/2001 | Marshall et al. |
| 6,199,420 B1 | 3/2001 | Bartosch |
| 6,240,760 B1 | 6/2001 | Heiberger et al. |
| 6,253,597 B1 | 7/2001 | Hogendoorn et al. |
| 6,257,544 B1 | 7/2001 | Schultz |
| 6,293,421 B1 | 9/2001 | Jentzsch et al. |
| 6,328,832 B1 * | 12/2001 | Otruba .................. B65C 9/1807 156/215 |
| 6,349,586 B1 | 2/2002 | Johnson et al. |
| 6,351,980 B1 | 3/2002 | Jowitt et al. |
| 6,351,981 B1 | 3/2002 | Jowitt et al. |
| 6,357,982 B1 | 3/2002 | Jowitt et al. |
| 6,393,883 B1 | 5/2002 | Freck |
| 6,484,550 B2 | 11/2002 | Halasz et al. |
| 6,591,886 B1 * | 7/2003 | Gonzalo .................. B65C 9/02 156/556 |
| 6,616,393 B1 | 9/2003 | Jentzsch |
| 6,637,247 B2 | 10/2003 | Bowlin |

(56) References Cited

U.S. PATENT DOCUMENTS

| | | |
|---|---|---|
| 6,694,843 B2 | 2/2004 | Bartosch et al. |
| 6,698,265 B1 | 3/2004 | Thomas |
| 6,752,000 B2 | 6/2004 | Reynolds et al. |
| 6,761,055 B2 | 7/2004 | Scholey et al. |
| 6,837,089 B2 | 1/2005 | Jentzsch |
| 6,959,577 B2 | 11/2005 | Jentzsch |
| 7,073,365 B2 | 7/2006 | Geho et al. |
| 7,150,174 B2 | 12/2006 | Claydon |
| 7,201,031 B2 | 4/2007 | Shuey et al. |
| 7,263,868 B2 | 9/2007 | Jentzsch et al. |
| 7,310,983 B2 | 12/2007 | Schill et al. |
| 7,387,007 B2 | 6/2008 | Schill et al. |
| 7,404,309 B2 | 7/2008 | Schill et al. |
| 7,409,845 B2 | 8/2008 | Schill et al. |
| 7,418,852 B2 | 9/2008 | Schill et al. |
| 7,454,944 B2 | 11/2008 | Schill et al. |
| 7,497,145 B2 | 3/2009 | El Hachem et al. |
| 7,497,322 B2 * | 3/2009 | Lanfranchi .......... B65G 47/848 198/471.1 |
| 7,568,573 B2 * | 8/2009 | Schill ................. B65G 47/5154 198/438 |
| 7,726,165 B2 | 6/2010 | Myers et al. |
| 7,770,425 B2 | 8/2010 | Egerton et al. |
| 7,784,319 B2 | 8/2010 | Saville |
| 7,797,978 B2 | 9/2010 | Sasso, Jr. et al. |
| 7,818,987 B2 | 10/2010 | Marshall |
| 7,886,894 B2 | 2/2011 | Schill et al. |
| 7,918,328 B2 | 4/2011 | Schill et al. |
| 7,942,256 B2 | 5/2011 | Coates |
| 7,950,259 B2 | 5/2011 | Marshall |
| 7,954,625 B2 * | 6/2011 | Dewert ................ B65G 47/846 198/473.1 |
| 7,997,111 B2 | 8/2011 | Mercer et al. |
| 8,096,156 B2 | 1/2012 | Olson et al. |
| 8,161,784 B2 | 4/2012 | Farnham |
| 8,245,551 B2 | 8/2012 | Egerton |
| 8,286,456 B2 | 10/2012 | Coates |
| 8,297,098 B2 | 10/2012 | Marshall et al. |
| 8,322,183 B2 | 12/2012 | Myers et al. |
| 8,375,759 B2 | 2/2013 | Sanginiti et al. |
| 8,459,088 B2 | 6/2013 | Coates |
| 8,464,567 B2 | 6/2013 | Saville |
| 8,464,836 B2 | 6/2013 | Green |
| 8,464,856 B2 | 6/2013 | Marshall |
| 8,511,125 B2 | 8/2013 | Reimer et al. |
| 8,601,843 B2 | 12/2013 | Dunwoody et al. |
| 8,616,559 B2 | 12/2013 | Marshall |
| 8,627,705 B2 | 1/2014 | Marshall |
| 8,733,146 B2 | 5/2014 | Babbitt et al. |
| 8,776,572 B2 | 7/2014 | Weis |
| 8,807,325 B2 | 8/2014 | Olson et al. |
| 8,935,947 B2 | 1/2015 | Yoo |
| 9,169,085 B2 * | 10/2015 | Schill ................... B65G 47/848 |
| 9,182,026 B2 | 11/2015 | Bowlin et al. |
| D751,922 S | 3/2016 | Ramsey et al. |
| 9,290,329 B2 | 3/2016 | Egerton |
| 9,321,093 B2 | 4/2016 | Adams et al. |
| 9,327,338 B2 | 5/2016 | Boysel et al. |
| 9,352,378 B1 | 5/2016 | Flickinger |
| 9,517,498 B2 | 12/2016 | Siles et al. |
| D787,952 S | 5/2017 | Jacober et al. |
| 9,950,832 B2 | 4/2018 | Gogola et al. |
| 9,957,076 B2 | 5/2018 | Tung et al. |
| 9,957,096 B2 | 5/2018 | Niec |
| 9,962,924 B2 | 5/2018 | Carreras |
| 9,968,982 B2 | 5/2018 | Dunwoody et al. |
| 9,968,983 B2 | 5/2018 | Dunwoody |
| 9,969,524 B2 | 5/2018 | Gatewood et al. |
| 9,975,164 B2 | 5/2018 | Carstens et al. |
| 10,150,628 B2 * | 12/2018 | Wolf .................... B65B 61/025 |
| 2002/0029599 A1 | 3/2002 | Heiberger et al. |
| 2002/0148266 A1 | 10/2002 | Heiberger et al. |
| 2003/0177803 A1 | 9/2003 | Golding et al. |
| 2009/0107202 A1 | 4/2009 | Farnham et al. |
| 2009/0206096 A1 | 8/2009 | Hirotsu et al. |
| 2010/0107718 A1 | 5/2010 | Kang |
| 2010/0107719 A1 | 5/2010 | Geho |
| 2010/0212393 A1 | 8/2010 | Babbitt et al. |
| 2012/0042708 A1 | 2/2012 | Watkins et al. |
| 2012/0043294 A1 | 2/2012 | Dick et al. |
| 2012/0312066 A1 | 12/2012 | Myers et al. |
| 2012/0326372 A1 | 12/2012 | Olson et al. |
| 2013/0055785 A1 | 3/2013 | Moreno |
| 2013/0062161 A1 | 3/2013 | Coates |
| 2013/0149073 A1 | 6/2013 | Babbitt et al. |
| 2013/0233123 A1 | 9/2013 | Bowlin et al. |
| 2014/0060137 A1 | 3/2014 | Dunwoody et al. |
| 2014/0158501 A1 | 6/2014 | Schill et al. |
| 2014/0174144 A1 | 6/2014 | Boysel et al. |
| 2014/0253718 A1 | 9/2014 | Leitzen et al. |
| 2014/0366605 A1 | 12/2014 | Hosoi |
| 2015/0013422 A1 | 1/2015 | Hosoi et al. |
| 2015/0101387 A1 | 4/2015 | Pallini |
| 2015/0239607 A1 | 8/2015 | Fields et al. |
| 2015/0352625 A1 | 12/2015 | Hewitt et al. |
| 2016/0031594 A1 | 2/2016 | Ramsey et al. |
| 2016/0107219 A1 | 4/2016 | Kaanta et al. |
| 2016/0251105 A1 | 9/2016 | Robinson et al. |
| 2019/0344322 A1 * | 11/2019 | Mercer et al. |
| 2019/0344325 A1 * | 11/2019 | Mercer et al. |
| 2019/0344326 A1 * | 11/2019 | Mercer et al. |
| 2019/0344327 A1 * | 11/2019 | Mercer et al. |
| 2019/0344977 A1 * | 11/2019 | Mercer et al. |
| 2019/0345958 A1 * | 11/2019 | Mercer et al. |

FOREIGN PATENT DOCUMENTS

| | | |
|---|---|---|
| EP | 0140469 | 5/1985 |
| EP | 0234839 | 9/1987 |
| EP | 0245049 | 11/1987 |
| EP | 0297754 | 1/1989 |
| EP | 0384427 | 8/1990 |
| EP | 0482581 | 4/1992 |
| EP | 0520693 | 12/1992 |
| EP | 0559178 | 9/1993 |
| EP | 0570005 | 11/1993 |
| EP | 0661119 | 7/1995 |
| EP | 0750953 | 1/1997 |
| EP | 0899199 | 3/1999 |
| EP | 0930111 | 7/1999 |
| EP | 1068909 | 1/2001 |
| EP | 1188499 | 3/2002 |
| EP | 1297914 | 4/2003 |
| EP | 1308225 | 5/2003 |
| EP | 2251114 | 11/2010 |
| EP | 2388082 | 11/2011 |
| EP | 2401216 | 5/2014 |
| JP | 2016047541 | 4/2016 |
| JP | 2016107339 | 6/2016 |
| JP | 2016147310 | 8/2016 |
| WO | 82/00785 | 3/1982 |
| WO | 83/02577 | 8/1983 |
| WO | 84/02667 | 7/1984 |
| WO | 84/03873 | 10/1984 |
| WO | 95/05253 | 2/1995 |
| WO | 96/16754 | 6/1996 |
| WO | 96/27459 | 9/1996 |
| WO | 96/33032 | 10/1996 |
| WO | 97/31730 | 9/1997 |
| WO | 97/39848 | 10/1997 |
| WO | 98/11379 | 3/1998 |
| WO | 98/19807 | 5/1998 |
| WO | 98/39117 | 9/1998 |
| WO | 98/57763 | 12/1998 |
| WO | 99/14000 | 3/1999 |
| WO | 99/58264 | 11/1999 |
| WO | 00/12242 | 3/2000 |
| WO | 00/16926 | 3/2000 |
| WO | 00/23212 | 4/2000 |
| WO | 00/44513 | 8/2000 |
| WO | 01/56717 | 8/2001 |
| WO | 02/22287 | 3/2002 |
| WO | 02/060615 | 8/2002 |
| WO | 03/101642 | 12/2003 |

(56) References Cited

FOREIGN PATENT DOCUMENTS

| | | |
|---|---|---|
| WO | 2004/000481 | 12/2003 |
| WO | 2004/089561 | 10/2004 |
| WO | 2005/084846 | 9/2005 |
| WO | 2006/055185 | 5/2006 |
| WO | 2006123666 | 11/2006 |
| WO | 2007/123715 | 11/2007 |
| WO | 2007/127000 | 11/2007 |
| WO | 2007/136608 | 11/2007 |
| WO | 2008/067522 | 6/2008 |
| WO | 2008/077231 | 7/2008 |
| WO | 2008/147487 | 12/2008 |
| WO | 2009/100972 | 8/2009 |
| WO | 2009/132254 | 10/2009 |
| WO | 2009/132269 | 10/2009 |
| WO | 2010/048726 | 5/2010 |
| WO | 2010/048727 | 5/2010 |
| WO | 2010/099067 | 9/2010 |
| WO | 2010/099069 | 9/2010 |
| WO | 2010/099081 | 9/2010 |
| WO | 2010/099082 | 9/2010 |
| WO | 2010/099165 | 9/2010 |
| WO | 2010/099171 | 9/2010 |
| WO | 2011049308 | 4/2011 |
| WO | 2011/113710 | 9/2011 |
| WO | 2012/024671 | 2/2012 |
| WO | 2012/027293 | 3/2012 |
| WO | 2012/170618 | 12/2012 |
| WO | 2013/070199 | 5/2013 |
| WO | 2013/118727 | 8/2013 |
| WO | 2013/118728 | 8/2013 |
| WO | 2013/134727 | 9/2013 |
| WO | 2014/089351 | 6/2014 |
| WO | 2014/099496 | 6/2014 |
| WO | 2014164796 | 10/2014 |
| WO | 2016/124402 | 8/2016 |
| WO | 2017/019291 | 2/2017 |

\* cited by examiner

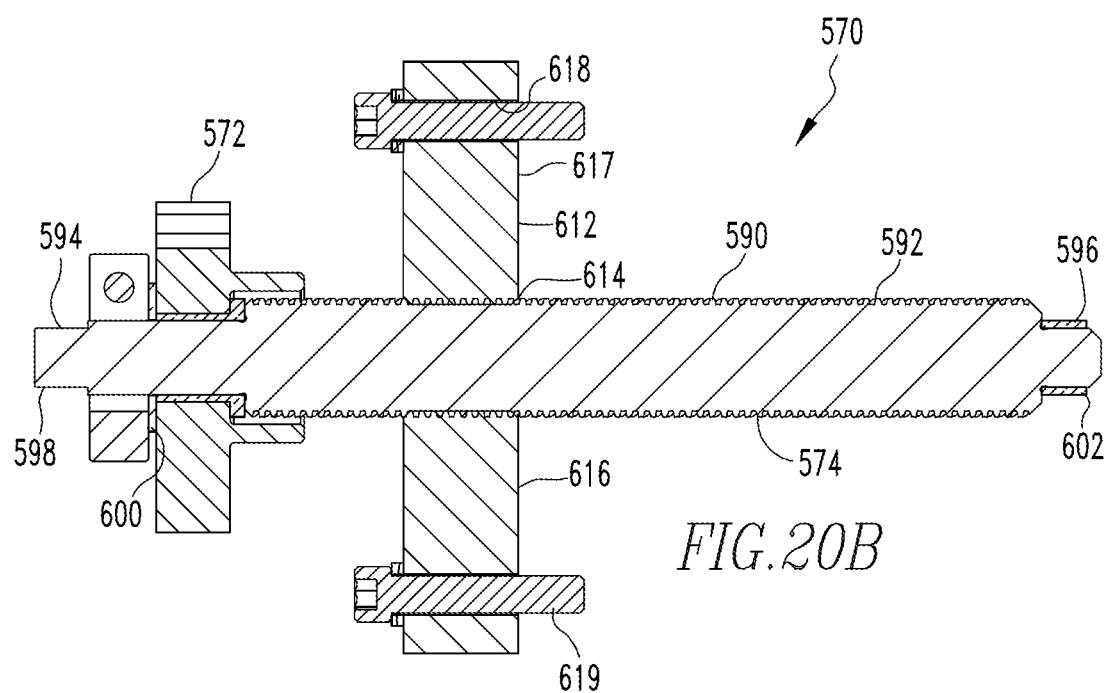
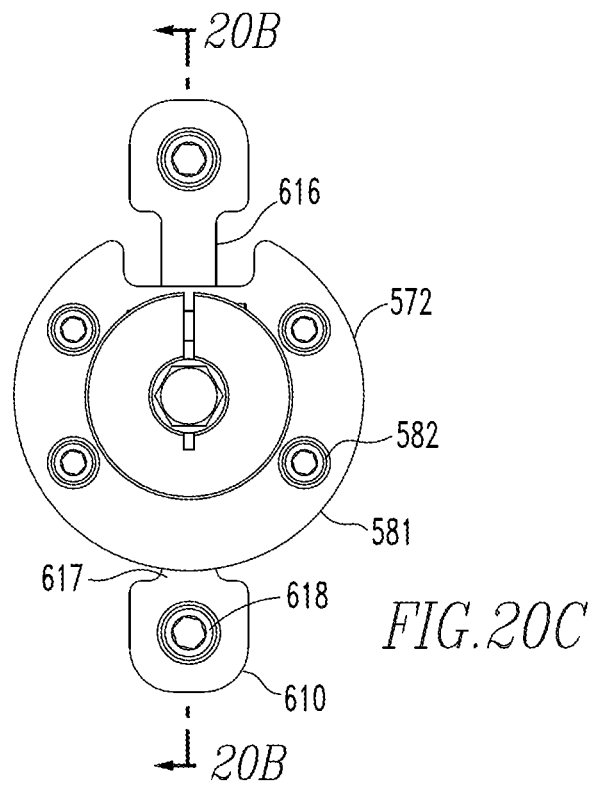

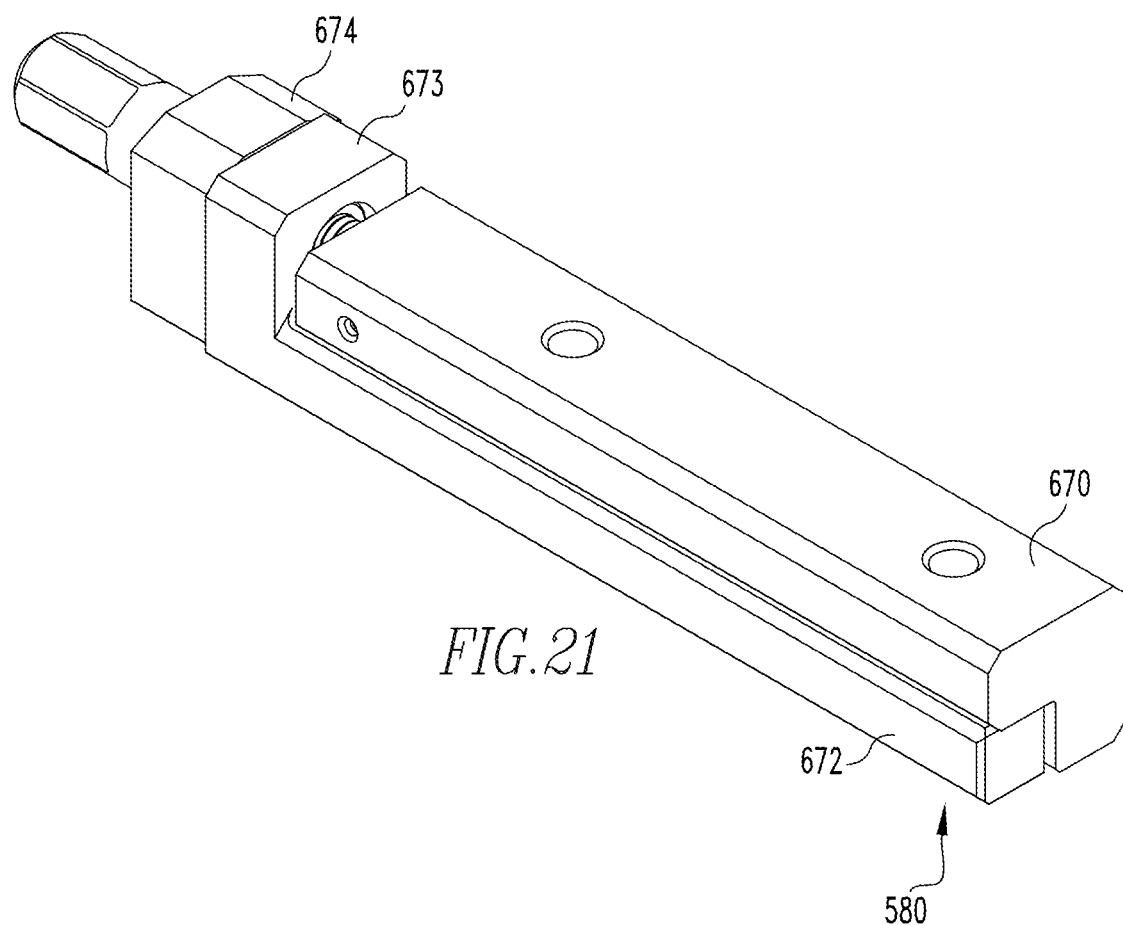
FIG.21
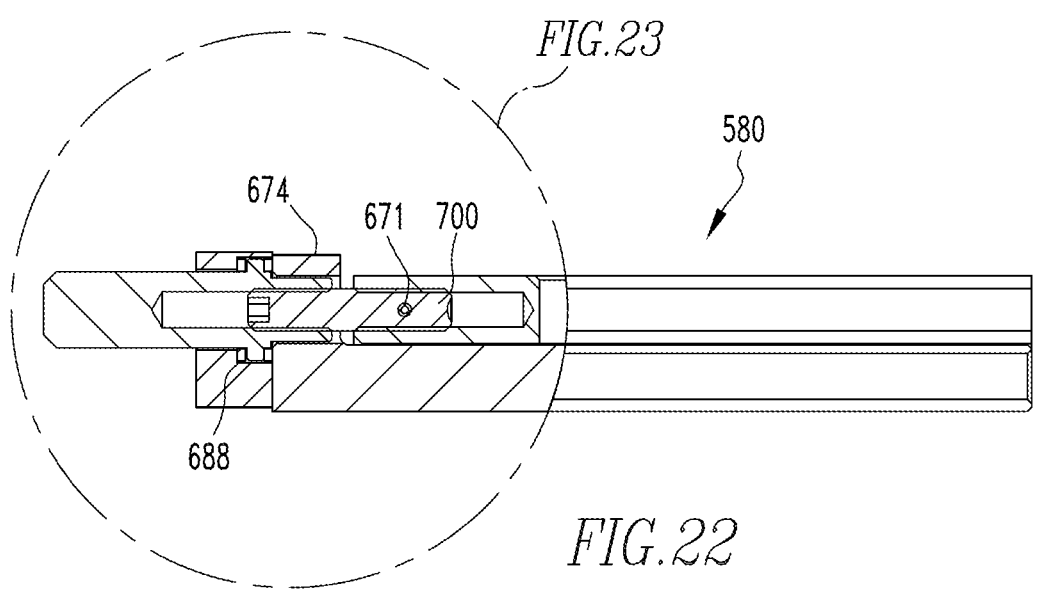
FIG.23
FIG.22

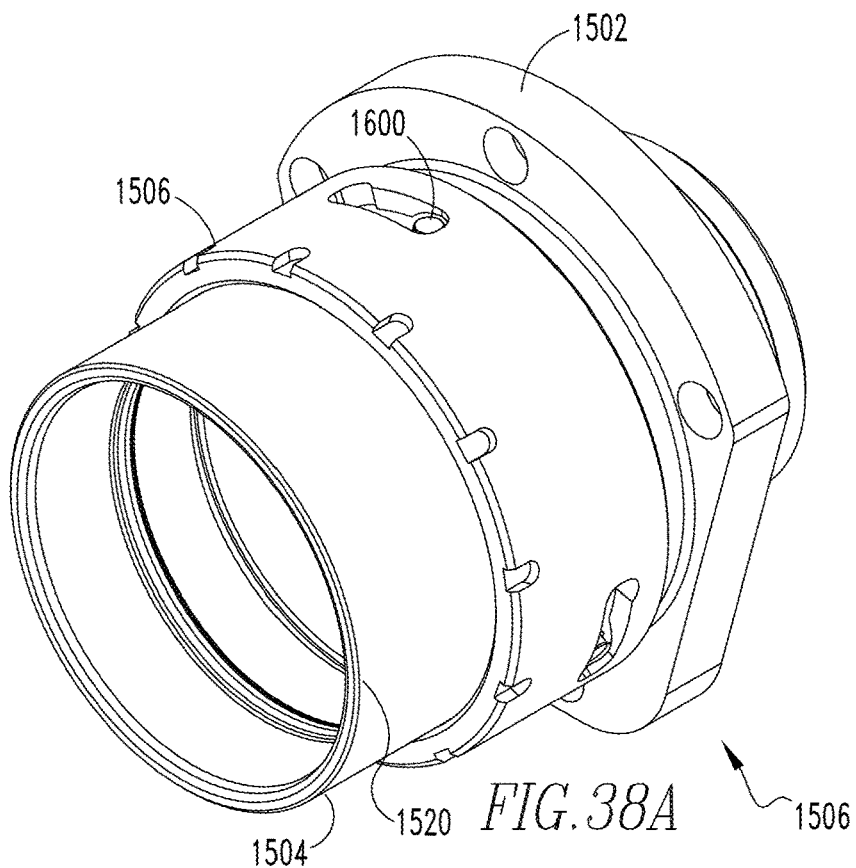
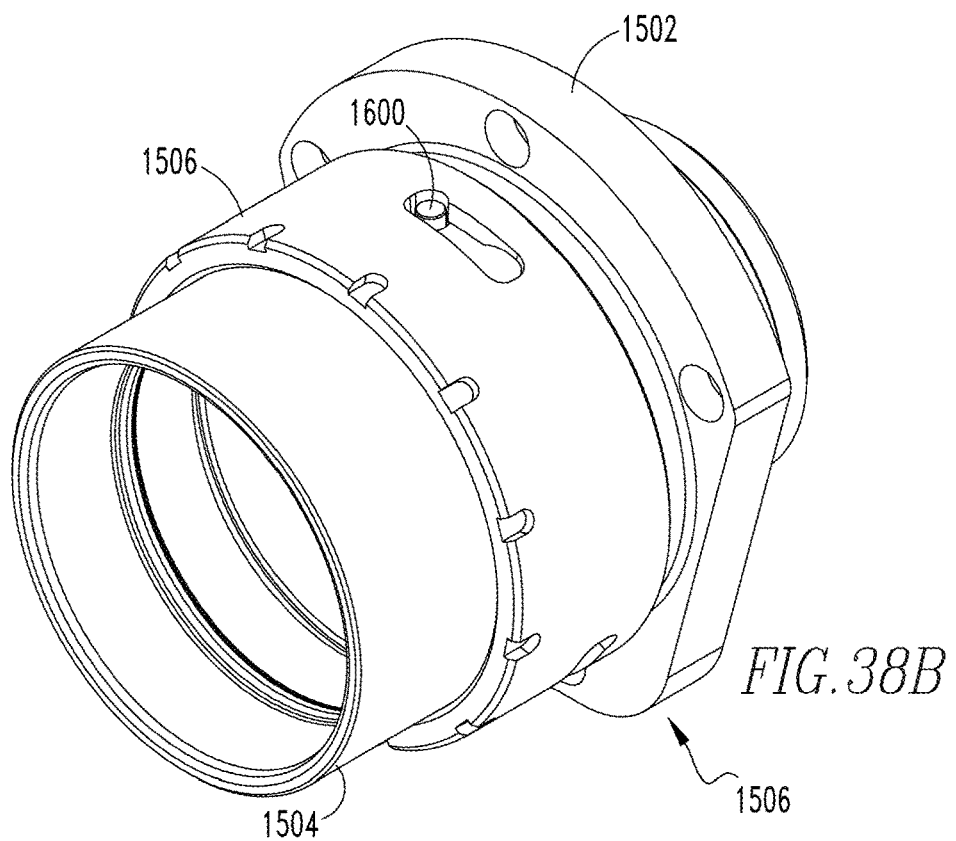

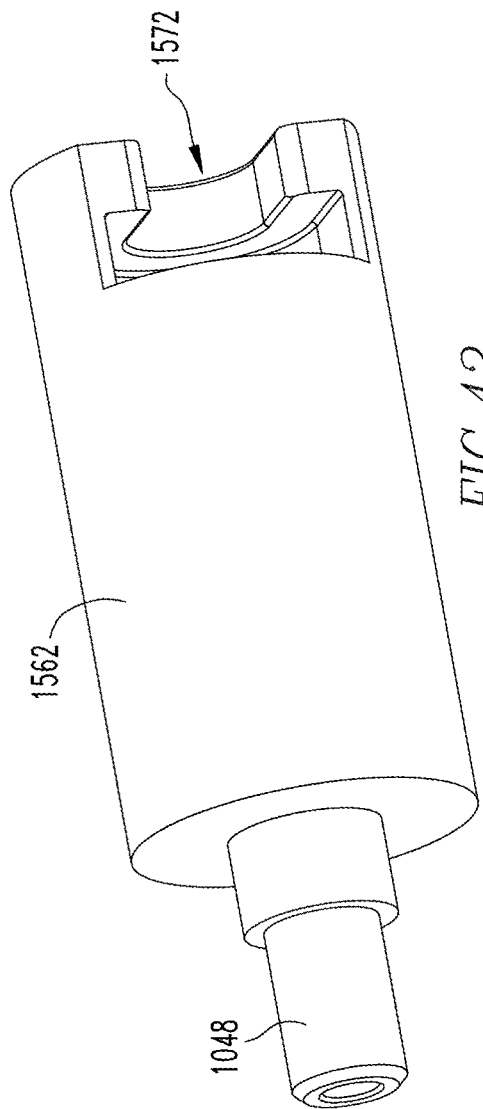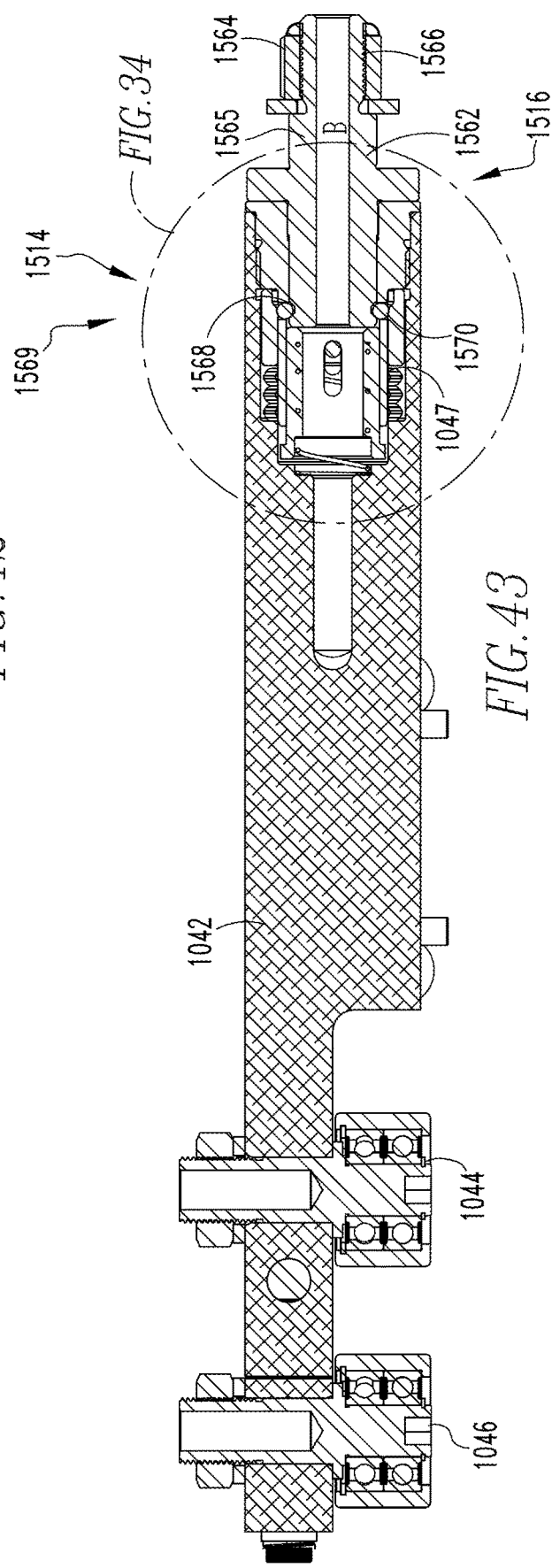

INFEED ASSEMBLY QUICK CHANGE FEATURES

CROSS REFERENCE TO RELATED APPLICATIONS

This application claims priority to U.S. Provisional Application No. 62/670,199, filed May 11, 2018, entitled, INFEED ASSEMBLY QUICK CHANGE FEATURES.

FIELD OF THE INVENTION

The disclosed and claimed concept relates to a necking machine and, in particular, to a necking machine with quick-change elements on the infeed assembly.

BACKGROUND INFORMATION

The can bodies are, typically, formed in a bodymaker. That is, a bodymaker forms blanks such as, but not limited to, disks or cups into an elongated can body. A can body includes a base and a depending sidewall. The sidewall is open at the end opposite the base. The bodymaker, typically, includes a ram/punch that moves the blanks through a number of dies to form the can body. The can body is ejected, from the ram/punch for further processing such as, but not limited to, trimming, washing, printing, flanging, inspecting, and placed on pallets which are shipped to the filler. At the filler, the cans are taken off of the pallets, filled, ends placed on them and then the filled cans are repackaged in six packs and/or twelve pack cases, etc.

Some can bodies are further formed in a necking machine (also identified as a "necker" machine). Necking machines are structured to reduce the cross-sectional area of a portion of a can body sidewall, i.e., at the open end of the sidewall. That is, prior to coupling a can end to the can body, the diameter/radius of the can body sidewall open end is reduced relative to the diameter/radius of other portions of the can body sidewall. The necking machine includes a number of processing and/or forming stations disposed in series. That is, the processing and/or forming stations are disposed adjacent to each other and a transfer assembly moves a can body between adjacent processing and/or forming stations. As the can body moves through the processing and/or forming stations it is processed or formed. A greater number of processing and/or forming stations in a necking machine is not desirable. That is, it is desirable to have the least number of processing and/or forming stations possible while still completing the desired forming.

The necking machine includes an infeed assembly structured to move can bodies into the path for processing. The infeed assembly includes several elements that are structured to accommodate can bodies of a specific size. These elements include a number of starwheels and guide assemblies disposed adjacent to the starwheels. As is known, a starwheel includes a disk-like body having semi-circular pockets disposed about the radial surface. Within each pocket is a vacuum port that is in fluid communication with a vacuum assembly. The vacuum assembly is structured to apply a vacuum to the port during a portion of the rotation of the starwheel. Generally, the vacuum port is disposed at a location so that when a can body is disposed on the starwheel, the vacuum port is at a medial location relative to the can body height.

Thus, in an exemplary embodiment, a generally cylindrical can body is supplied to a first starwheel and moves into a pocket. Almost simultaneously, a vacuum is applied through the vacuum port thereby temporarily coupling the can body to the first starwheel. Once the first starwheel rotates the can body to a selected location adjacent a second starwheel, or other construct that supports the can body, the vacuum is disengaged thereby allowing the can body to decouple from the first starwheel. As the can body disengages from the first starwheel, the vacuum assembly applies a vacuum to a pocket on the second starwheel thereby temporarily coupling the can body to the second starwheel.

Further, adjacent the starwheels, or many of the plurality of starwheels, guides are disposed. The guides, in an exemplary embodiment, include two spaced rails, i.e., guiderails. The guiderails each include an arcuate surface disposed adjacent an associated starwheel. The guiderails are positioned adjacent a starwheel at a location so that the guiderails are immediately adjacent the radial surface of a can body temporarily coupled to a starwheel. That is, the guiderails are positioned so that a can body temporarily coupled to a starwheel moves along a path immediately parallel to the surface of the guiderails. In an exemplary embodiment, one guiderail is disposed in the same position relative to the starwheel and that position is generally adjacent the exposed face of the starwheel. This is because the base of the can body (which is heavier/more massive than the open end of the can body) is disposed adjacent the exposed face of the starwheel. The other guiderail is positioned adjacent the open end of the can body. Thus, the positioning of the rails depends upon the height of the can body as well as the radius of the can body. If a can body becomes uncoupled from the starwheel prematurely, the guides substantially maintain the can body in the pocket and thereby allow the can body to again be temporarily coupled to a starwheel. That is, the guides keep the can body from being tossed away from, or skewed relative to, the starwheel.

In this configuration, a starwheel accommodates can bodies within a limited range of heights and diameters. That is, for example, can bodies having generally the same height and diameter are temporarily coupled to the starwheel pocket. If, for example, the radius of the can body is smaller than the radius of the pocket, the can body fits within the pocket. But, if the radius of the can body is too small, the can, body is too far from the guides and, if, the can body becomes uncoupled from the starwheel prematurely, the guides cannot maintain the can body in the pocket. That is, the can body could become skewed relative to the pocket and not be in a position whereby the vacuum can be reapplied so as to temporarily couple the can body to the starwheel.

So as to accommodate can bodies of different diameters/radii, the guides are adjustable. The problem with adjustable guides is that known guide assemblies include multiple fasteners that must be removed when adjusting the guides. This is time consuming and the fasteners may be lost during the procedure. These are problems.

Similarly, if a starwheel is structured to accommodate can bodies of a specific height, a change in the height of the can body requires an adjustment so that each rail is disposed at a location either near the base or, open end of the can body. As with the adjustment for a change in diameter, known guide assemblies include multiple fasteners that must be removed when adjusting the guides to accommodate a can body of a different height. As such, adjusting the position of the guiderail is time consuming and the fasteners may be lost during the procedure. These are problems.

There is, therefore, a need for a necking machine with quick-change elements on the guiderail assemblies. There is a further need for guiderail assemblies wherein the couplings cannot be lost during adjustment or exchange of the guiderail assemblies.

SUMMARY OF THE INVENTION

These needs, and others, are met by at least one embodiment of the disclosed and claimed concept which provides a quick-change starwheel guide assembly structured to be coupled to a starwheel guide assembly mounting base. The quick-change starwheel guide assembly includes a starwheel guide assembly mounting assembly, a starwheel guide assembly support assembly, a number of starwheel guide assembly guiderails and a starwheel guide assembly can body height adjustment assembly. The starwheel guide assembly mounting assembly is coupled to the starwheel guide assembly support assembly. The starwheel guide assembly guiderails are coupled to the starwheel guide assembly mounting assembly. The starwheel guide assembly can body height adjustment assembly is coupled to at least one the starwheel guide assembly guiderail. At least one of the starwheel guide assembly mounting assembly or the can body height adjustment assembly is a quick-change assembly. A quick-change starwheel guide assembly in this configuration solves the problems stated above.

BRIEF DESCRIPTION OF THE DRAWINGS

A full understanding of the invention can be gained from the following description of the preferred embodiments when read in conjunction with the accompanying drawings in which:

FIG. 20B is cross-sectional side view of a quick-change height adjustment assembly traveling hub assembly. FIG. 20C is a front view of a quick-change height adjustment assembly traveling hub assembly.

FIG. 21 is an isometric view of a traveling hub assembly positioning key assembly.

FIG. 22 is a partial cross-sectional side view of a traveling hub assembly positioning key assembly.

FIGS. 38A-38C are isometric views of another embodiment of an outer die assembly quick-change die assembly with the elements in different configurations.

FIG. 42 is a detail isometric view of a portion of an inner die assembly quick-change die assembly.

FIG. 43 is a cross-sectional view of an inner die assembly quick-change die assembly.

DESCRIPTION OF THE PREFERRED EMBODIMENTS

Figure 1:
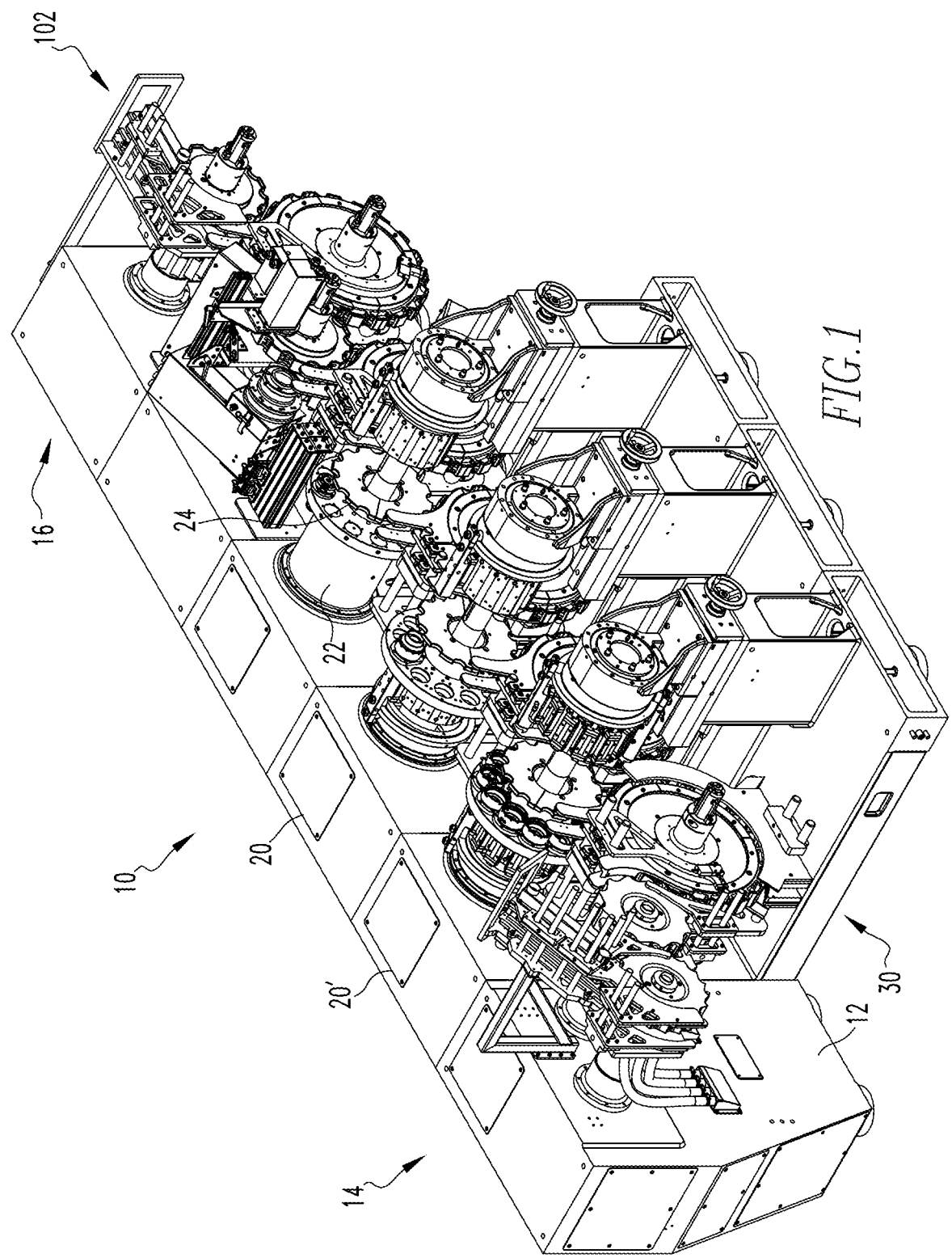
FIG. 1 is an isometric view of a necker machine.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut or threaded bore. Further, a passage in an element is part of the "coupling" or "coupling component(s)." For example, in an assembly of two wooden boards coupled together by a nut and a bolt extending through passages in both boards, the nut, the bolt and the two passages are each a "coupling" or "coupling component."

As used herein, a "fastener" is a separate component structured to couple two or more elements. Thus, for example, a bolt is a "fastener" but a tongue-and-groove coupling is not a "fastener," That is, the tongue-and-groove elements are part of the elements being coupled and are not a separate component.

As used herein, a "retained" coupling means a coupling component(s) that while movable, cannot be separated from an associated element. For example, on an automobile, a lug nut tethered to a wheel is a "retained" coupling. That is, in use, the lug nut extends through a wheel hub and is coupled to an axle hub thereby coupling the wheel to the axle. When the wheels need to be rotated, the lug nut is decoupled from an axle hub thereby decoupling the wheel from the axle hub. The tethered lug nut cannot, however, be decoupled from the wheel hub due to the tether. In this configuration, the lug nut cannot be misplaced. Any of the retained couplings described below are alternately a "release coupling," a "retained release" coupling or a "reduced actuation" coupling. Use of a "retained" coupling solves the problems discussed above.

As used herein, a "release" coupling is two or more coupling components that move between a secure/tight position and a loose position relative to each other. During normal use, the elements of a "release" coupling are not separated. For example, a hose clamp including an elongated, slotted, looped body and a threaded fastener rotatably mounted thereon is a "release" coupling. As is known, utilizing the threaded fastener to draw the looped body in one direction tightens the hose clamp about a hose while extending the looped body loosens the hose clamp. During normal use, the looped body and the fastener are not separated. Any of the release couplings described below are alternately a "retained" coupling, a "retained release" coupling or a "reduced actuation" coupling. Use of a "release" coupling solves the problems discussed above.

As used herein, a "retained release" coupling is a release coupling wherein the elements of the release coupling are not separable from the element(s) to which the release couplings are coupled. For example, a hose clamp that is tethered to the hose which it clamps is a "retained release" coupling. Any of the retained release couplings described below are alternately a "retained" coupling, a "release" coupling or a "reduced actuation" coupling. Use of a "retained release" coupling solves the problems discussed above.

As used herein, a "reduced actuation" coupling means a coupling that moves between a secure/locked/engaged position and a released/unlocked/disengaged position with a minimal action. As used herein, a "minimal action" means less than a 360° rotation for rotating couplings. Any of the reduced actuation couplings described below are alternately a "retained" coupling, a "release" coupling or a "retained release" coupling. Use of a "reduced actuation" coupling solves the problems discussed above.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. As used herein, "adjustably fixed" means that two components are coupled so as to move as one while maintaining a constant general orientation or position relative to each other while being able to move in a limited range or about a single axis. For example, a doorknob is "adjustably fixed" to a door in that the doorknob is rotatable, but generally the doorknob remains in a single position relative to the door. Further, a cartridge (nib and ink reservoir) in a retractable pen is "adjustably fixed" relative to the housing in that the cartridge moves between a retracted and extended position, but generally maintains its orientation relative to the housing. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, "temporarily disposed" means that a first element(s) or assembly(ies) is resting on a second element(s) or assembly(ies) in a manner that allows the first element/assembly to be moved without having to decouple or otherwise manipulate the first element. For example, a book simply resting on a tab e, i.e., the book is not glued or fastened to the table, is "temporarily disposed" on the table.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, "correspond" indicates that two structural components are sized and shaped to be similar to, each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one a plurality). That is, for example, the phrase "a number of elements" means one element or a plurality of elements. It is specifically noted that the term "a 'number' of [X]" includes a single [X].

As used herein, a "limited number" of couplings means six or fewer couplings.

As used herein, a "significantly limited number" of couplings means four or fewer couplings.

As used herein, a "very limited number" of couplings means two or fewer couplings.

As used herein, an "exceedingly limited number" of couplings means one coupling.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center of the cylinder. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein, "axially extending" means extending in the axial direction or along an axial line. That is, for example, an "axially extending" line extends from the bottom of a cylinder toward the top of the cylinder and substantially parallel to a central longitudinal axis of the cylinder.

As used herein, "generally curvilinear" includes elements having multiple curved portions, combinations of curved portions and planar portions, and a plurality of planar portions or segments disposed at angles relative to each other thereby forming a curve.

As used herein, a "planar body" or "planar member" is a generally thin element including opposed, wide, generally parallel surfaces, i.e., the planar surfaces of the planar member, as well as a thinner edge surface extending between the wide parallel surfaces. That is, as used herein, it is inherent that a "planar" element has two opposed planar surfaces. The perimeter, and therefore the edge surface, may include generally straight portions. e.g., as on a rectangular planar member, or be curved, as on a disk, or have any other shape.

As used herein, for any adjacent ranges that share a limit, e.g., 0%-5% and 5%-10, or, 0.05 inch-0.10 inch and 0.001 inch-0.05 inch, the upper limit of the lower range, i.e., 5% and 0.05 inch in the examples above, means slightly less than the identified limit. That is, in the example above, the range 0%-5% means 0%-4.999999% and the range 0.001 inch-0.05 inch means 0.001 inch-0.04999999 inch.

As used herein, "upwardly depending" means an element that extends upwardly and generally perpendicular from another element.

As employed herein, the terms "can" and "container" are used substantially interchangeably to refer to any known or suitable container, which is structured to contain a substance (e.g., without limitation, liquid; food; any other suitable substance), and expressly includes, but is not limited to, beverage cans, such as beer and beverage cans, as well as food cans.

As used herein, a "product side" means the side of a container that contacts, or could contact, a product such as, but not limited to, a food or beverage. That is, the "product side" of the construct is the side of the construct that, eventually, defines the interior of a container.

As used herein, a "customer side" means the side of a construct used in a container that does not contact, or could not contact, a product such as, but not limited to, a food or beverage. That is, the "customer side" of the construct is the side of the construct that, eventually, defines the exterior of a container.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, a "drive assembly" means elements that are operatively coupled to the rotating shafts extending back to front in a processing station. A "drive assembly" does not include the rotating shafts extending back to front in a processing station.

As used herein, a "lubrication system" means a system that applies a lubricant to the external surfaces of a linkage, e.g., shafts and gears, of a drive assembly.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being, modified as would be understood by one of ordinary skill in the art.

As used herein, "at" means on and/or near relevant to the term being modified as would be understood by one of ordinary skill in the art.

Figure 2:
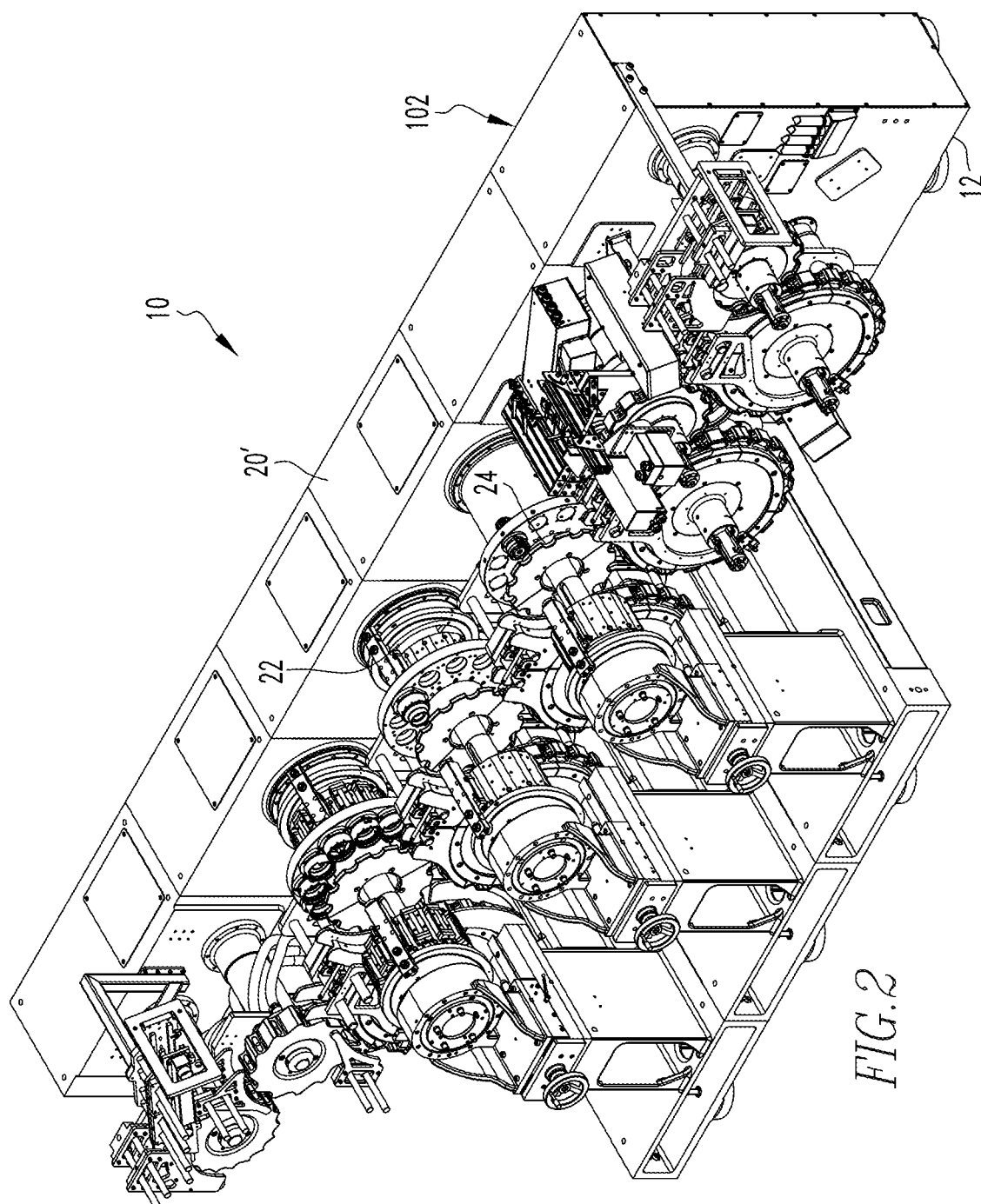
FIG. 2 is another isometric view of a necker machine.
Figure 3:
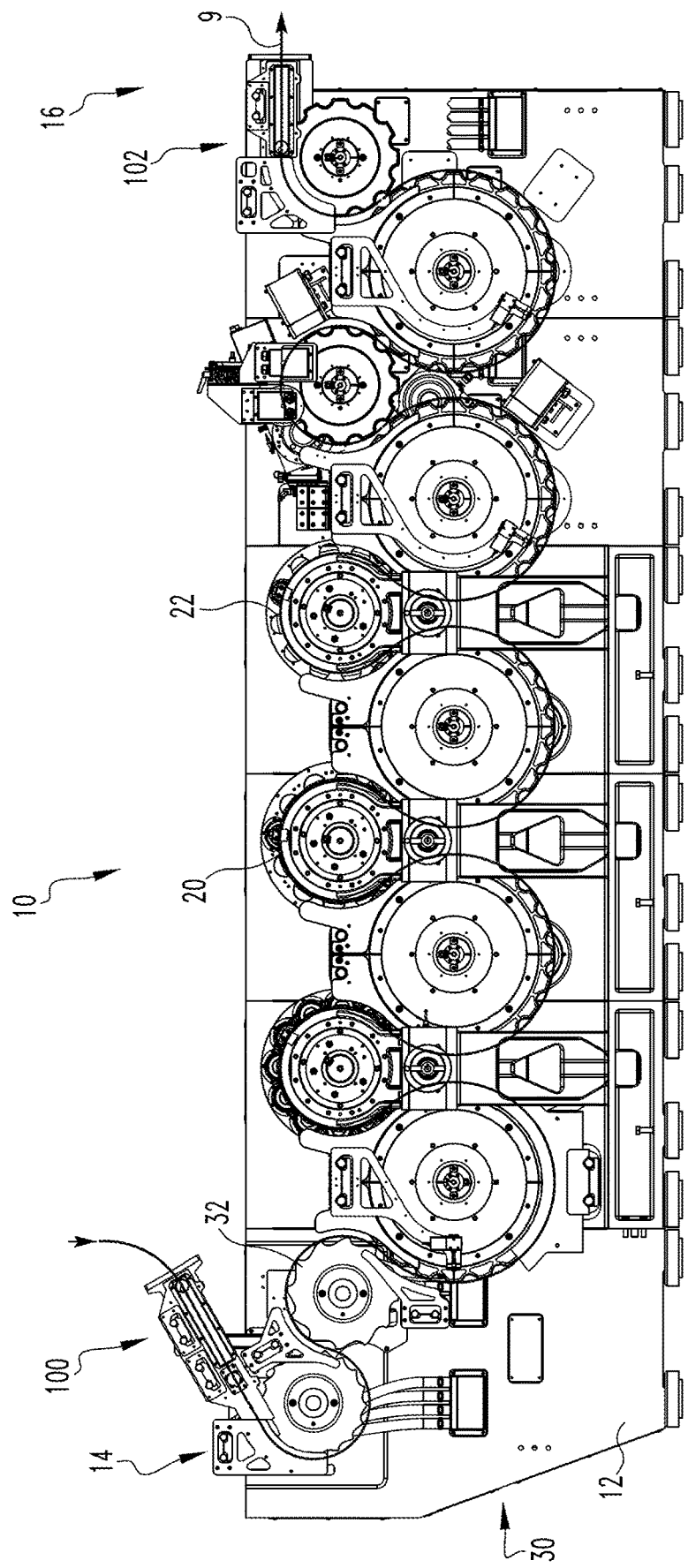
FIG. 3 is a front view of a necker machine.
Figure 4:
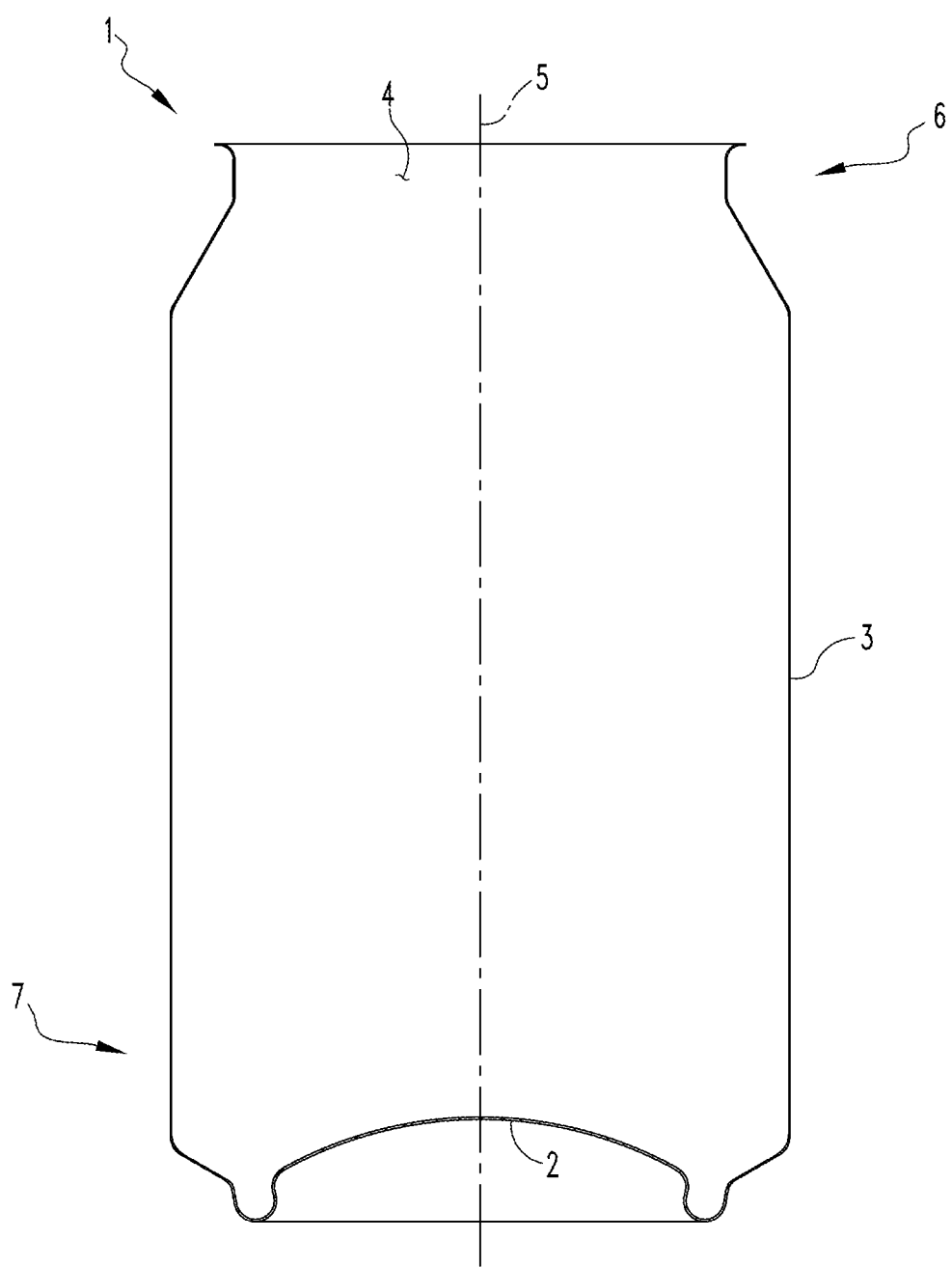
FIG. 4 is a schematic cross-sectional view of a can body.

As shown in FIGS. 1-3, a necker machine 10 is structured to reduce the diameter of a portion of a can body 1. As used herein, to "neck" means to reduce the diameter/radius of a portion of a can body 1. That is, as shown in FIG. 4, a can body 1 includes a base 2 with an upwardly depending sidewall 3. The can body base 2 and can body sidewall 3 define a generally enclosed space 4. In the embodiment discussed below, the can body 1 is a generally circular and/or an elongated cylinder. It is understood that this is only one exemplary shape and that the can body 1 can have other shapes. The can body has a longitudinal axis 5. The can body sidewall 3 has a first end 6 and a second end 7. The can body base 2 is at the second end 7. The can body first end 6 is open. The can body first end 6 initially has substantially the same radius/diameter as the can body sidewall 3. Following forming operations in the necker machine 10, the radius/diameter of the can body first end 6 is smaller than the other portions of the radius/diameter at the can body sidewall 3.

Figure 49:
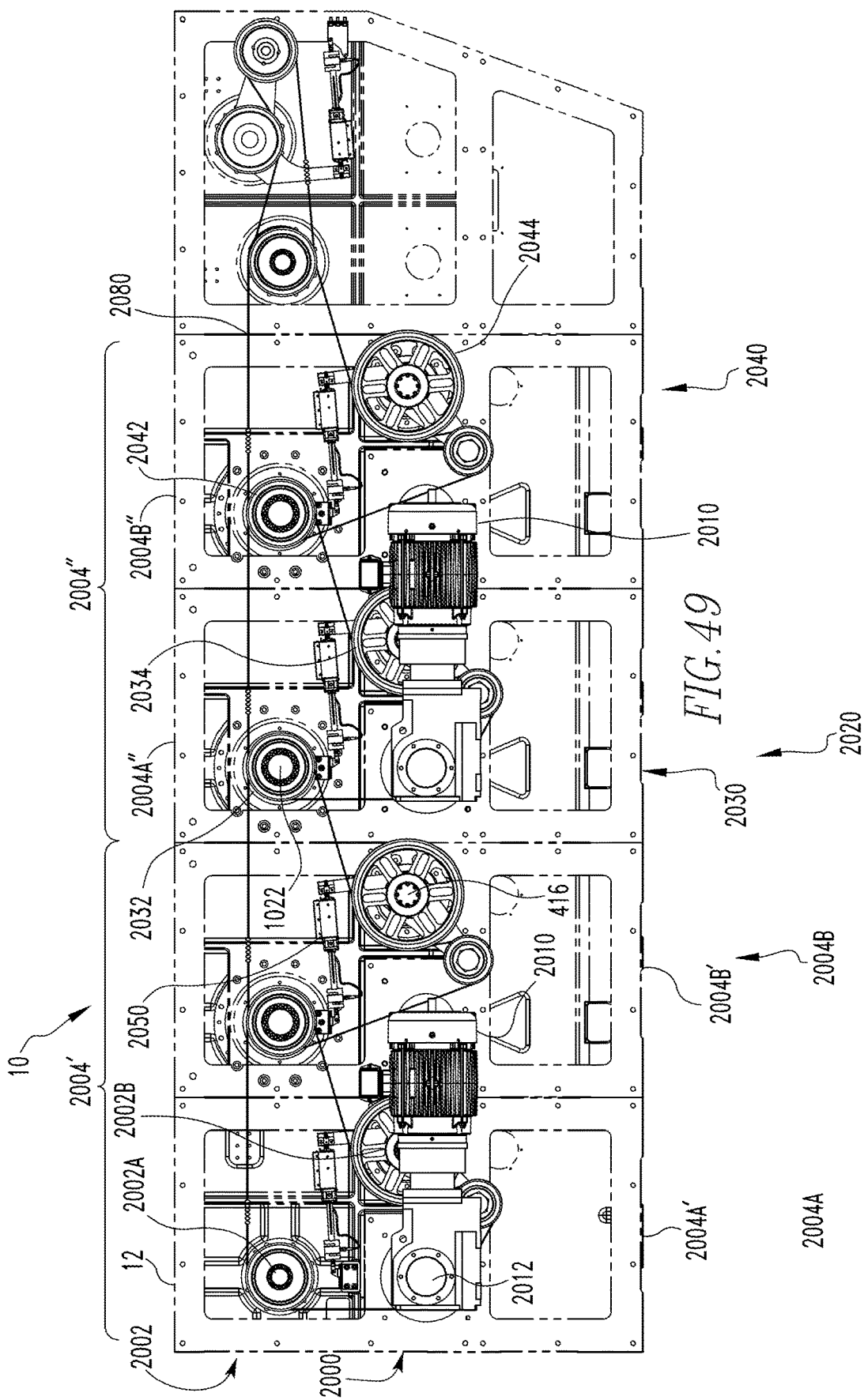
FIG. 49 is a rear view of a drive assembly.

The necker machine 10 includes an infeed assembly 100, a plurality of processing/forming stations 20, a transfer assembly 30, and a drive assembly 2000 (FIG. 49). Hereinafter, processing/forming stations 20 are identified by the term "processing stations 20" and refer to generic processing stations 20. Specific processing stations, which are included in the collective group of "processing stations 20," are discussed below and are given a separate reference number. Each processing station 20 has a width which is generally the same as all other processing stations 20. Thus, the length/space occupied by the necker machine 10 is determined by the number of processing stations 20.

As is known, the processing stations 20 are disposed adjacent to each other and in series. That is, the can bodies 1 being processed by the necker machine 10 each move from an upstream location through a series of processing stations 20 in the same sequence. The can bodies 1 follow a path, hereinafter, the "work path 9," That is, the necker machine 10 defines the work path 9 wherein can bodies 1 move from an "upstream" location to a "downstream" location; as used herein, "upstream" generally means closer to the infeed assembly 100 and "downstream" means closer to an exit assembly 102. With regard to elements that define the work path 9, each of those elements have an "upstream" end and a "downstream end" wherein the can bodies move from the "upstream" end to the "downstream end." Thus, as used herein, the nature/identification of an element, assembly, sub-assembly, etc. as an "upstream" or "downstream" element or assembly, or, being in an "upstream" or "downstream" location, is inherent. Further, as used herein, the nature/identification of an element, assembly, sub-assembly, etc. as an "upstream" or "downstream" element or assembly, or, being in an "upstream" or "downstream" location, is a relative term.

As noted above, each processing station 20 has a similar width and the can body 1 is processed and/or formed (or partially formed) as the can body 1 moves across the width. Generally, the processing/forming occurs in/at a turret 22. That is, the term "turret 22" identifies a generic turret. As discussed below, each processing station 20 includes a non vacuum starwheel 24. As used herein, a "non-vacuum starwheel" means a starwheel that does not include, or is not associated with, a vacuum assembly 480, discussed below, that is structured to apply a vacuum to the starwheel pockets 34, discussed below. Further, each processing station 20 typically includes one turret 22 and one non-vacuum, starwheel 24.

The transfer assembly 30 is structured to move the can bodies 1 between adjacent processing stations 20. The transfer assembly 30 includes a plurality of vacuum starwheels 32. As used herein, a "vacuum starwheel" means a starwheel assembly that includes, or is associated with, a vacuum assembly 480 that is structured to apply a vacuum to the starwheel pockets 34. Further, the term "vacuum starwheel 32" identifies a generic vacuum starwheel 32. Specific vacuum starwheels, e.g., "full inspection assembly first vacuum starwheel 220," are discussed below in association with specific processing stations 20. As discussed in detail bellow, a vacuum starwheel 32 includes disk-like body (or disk-like body assembly such as the vacuum starwheel body assembly 450, discussed below and shown in FIG. 11) and a plurality of pockets 34 disposed on the radial surface of the disk-like body. When used in association with generally cylindrical can bodies 1, the pockets 34 are generally semi-cylindrical. A vacuum assembly 480, discussed below, selectively applies suction to the pockets 34 and is structured to selectively couple a can body 1 to a pocket 34. It is understood, and as used herein, that "to apply a vacuum to a pocket 34" means that a vacuum (or suction) is applied to a starwheel pocket radially extending passage 470, discussed below. As such, components of the transfer assembly 30 such as, but not limited to, the vacuum starwheels 32 are also identified as parts of the processing stations 20. Conversely, the non-vacuum starwheel 24 of the processing stations 20 also move the can bodies 1 between processing stations 20 so the non-vacuum starwheels 24 are also identified as part of the transfer assembly 30. Each of these starwheel assemblies 24, 32 are discussed below.

It is, however, noted that the plurality of processing stations 20 are structured to neck different types of can bodies 1 and/or to neck can bodies in different configurations. Thus, the plurality of processing stations 20 are structured to be added and removed from the necker machine 10 depending upon the need. To accomplish this, the necker machine 10 includes a frame assembly 12 to which the plurality of processing stations 20 are removably coupled. Alternatively, the frame assembly 12 includes elements incorporated into each of the plurality of processing station 20 so that the plurality of processing stations 20 are structured to be temporarily coupled to each other. The frame assembly 12 has an upstream end 14 and a downstream end 16. Further, the frame assembly 12 includes elongated members, panel members (neither numbered), or a combination of both. As is known, panel members coupled to each other, or coupled to elongated members, form a housing. Accordingly, as used herein, a housing is also identified as a "frame assembly 12."

The infeed assembly 100 is structured to feed individual can bodies 1 into the transfer assembly 30 which moves each can body 1 from the most upstream processing station 20 to the most downstream processing station 20. In an exemplary embodiment, the infeed assembly 100 is a "high capacity" infeed assembly 100. As used herein, a "high capacity" infeed assembly 100 means an inked assembly structured to feed at least 4500, and in an exemplary embodiment 4800, can bodies 1 per minute to the transfer assembly 30.

Figure 5:
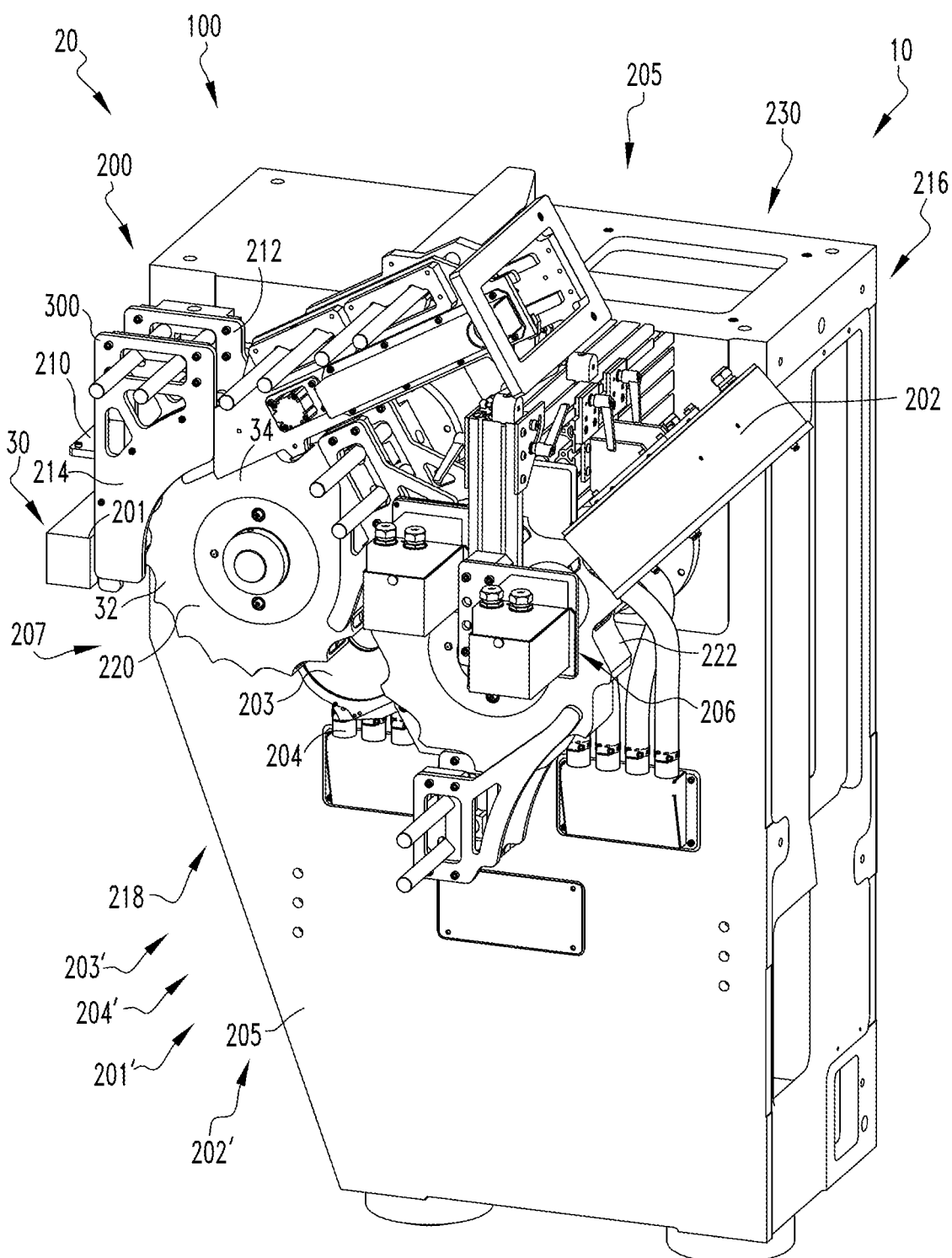
FIG. 5 is an isometric view of an infeed assembly.

As shown in FIG. 5, in an exemplary embodiment, the infeed assembly 100 includes a "full inspection assembly" 200. As used herein, a "full inspection assembly" 200 means an inspection assembly that is structured to perform inspections for label verification, un-printed can, sidewall damage, cut edge damage, bodymaker identification detection and spray dot detection. That is, the "full inspection assembly" 200 includes a number of inspection devices 210 including a label verification assembly 201 that is structured to, and does, inspect and verify that each label is properly applied to, or printed on, each can body 1, an un-printed can inspection assembly 202 that is structured to, and does, detect/identify can bodies 1 that have not had a label applied thereto, or printed thereon, a sidewall damage inspection assembly 203 that is structured to, and does, inspect each can body 1 and identify can bodies 1 with damaged sidewalls, a cut edge damage inspection assembly 204 that is structured to, and does, inspect each can body 1 and identify can bodies 1 with a damaged cut edge, a bodymaker identification detection assembly 205 that is structured to, and does, inspect each can body 1 for an indicia disposed on each can body 1 by the bodymaker of the can body 1, and a spray dot detection assembly 206 that is structured to, and does, inspect each can body 1 for an indicia disposed on each can body 1 by lacquer applicator. These components of the full inspection assembly 200 are collectively identified as "inspection devices" 210. As used herein, the "inspection device(s)" 210 means any (or all) of the inspection assemblies identified above as part of a full inspection assembly 200. Further, a full discussion of each inspection device is not required because those systems are known in the art. It is understood that an inspection device 210 is structured to, and does, inspect a can body, or portion thereof, with sensors, cameras, or similar devices. It is further understood that an inspection device 210 is structured to, and does, produce a signal or other record indicating that a can body 1 is either acceptable or unacceptable.

Further, to be a "full inspection assembly" 200, as used herein, all inspection devices 210 are disposed over a limited portion of the work path 9. As used herein, a "limited portion of the work path" means that the work path 9 along which the full inspection assembly 200 is disposed and structured to extend over no more than two adjacent vacuum starwheels 32. That is, all inspection devices 210 are disposed at no more than two adjacent vacuum starwheels 32. Further, as used herein, a "complete inspection assembly" (not shown) includes the inspection devices 210 of a full inspection assembly 200 as well as an ultraviolet (UV) coating inspection assembly 207 that is structured to, and does, inspect a UV coating on a can body 1. Use of a full inspection assembly 200 solves the problems stated above.

Further, in an exemplary embodiment, the full inspection assembly 200 is disposed at an upstream location relative to all processing stations 20. As used herein, an inspection assembly wherein all inspection devices of a full inspection assembly 200 are disposed upstream relative to all processing stations 20 is an "upstream inspection assembly." In this configuration, the full inspection assembly 200 detects any defects in the can bodies 1 before any forming operations occur in the necker machine. This solves the problem(s) stated above.

That is, the infeed assembly 100 is structured to provide sufficient mounting space adjacent the work path 9 for the number of inspection devices 210. The full inspection assembly 100 includes a mounting assembly 212 which is structured to, and does, support the inspection devices. That is, the mounting assembly 212 is structured to, and does, couple, directly couple, or fix each inspection device 210 to the necker machine frame assembly 12. In an exemplary embodiment, the full inspection assembly mounting, assembly 212 is structured to, and does, couple each inspection device 210 to the necker machine frame assembly 12. Stated alternately, the full inspection assembly mounting assembly 212 is structured to, and does, provide sufficient mounting space for enough inspection devices 210 to establish a full inspection assembly 200. In an exemplary embodiment, the mounting assembly 212 includes a number of guides 214. As used herein, a "mounting assembly guide" 214 is structured to, and does, guide a can body 1 over a path so that the can body does not contact an inspection device 210. That is, each mounting assembly guide 214 is structured to, and does, maintain a moving can body 1 away, i.e., away from, an inspection device 210. In the prior art, there was insufficient space to accommodate a mounting assembly guide 214 for each inspection device 210 of a full inspection assembly 200. Each mounting assembly guide 214 is disposed adjacent to an inspection device 210.

That is, as noted above, the prior art does not provide sufficient mounting space in the infeed assembly 100 for enough inspection devices 210 (and/or guides to protect each inspection device 210) to establish a full inspection assembly 200. The disclosed and claimed concept accomplishes this, in part, by providing an "effective distance" between adjacent vacuum starwheels 32 in the infeed assembly 100. That is, the infeed assembly 100 includes a number of vacuum starwheels 32. To be part of a full inspection assembly 200, as defined above, the number of vacuum starwheels 32 is limited to two. That is, the full inspection assembly 200 includes a first vacuum starwheel 220 and a second vacuum starwheel 222. The full inspection assembly first vacuum starwheel 220 is disposed an "effective distance" from the full inspection assembly second vacuum starwheel 222. As used herein, an "effective distance" means a distance that is structured to, and does, provide sufficient space adjacent the work path 9 so as to accommodate all the inspection devices 210 of a full inspection assembly 200 and a mounting assembly guide 214, and, provides access to 360 degrees about a can body 1 as the can body 1 moves over the work path 9.

As noted above, the full inspection assembly 200 includes a sidewall damage inspection assembly 203 that is structured to, and does, inspect each can body 1 and identify can bodies 1 with damaged sidewalls, a cut edge damage inspection assembly 204 that is structured to, and does, inspect each can body 1 and identify can bodies 1 with a damaged cut edge. It is noted that, in an exemplary embodiment, each of the sidewall damage inspection assembly 203 and the cut edge damage inspection assembly 204 include a camera 203', 204', respectively. The sidewall damage inspection assembly camera 203' is structured to, and does, focus on the can body sidewall 3. The cut edge damage inspection assembly camera 204' is structured to, and does, focus on the can body first end 6. In the prior art, there was not sufficient space to mount two such cameras on the same mounting and adjacent the work path 9. The disclosed and claimed concept provides a dual-camera mount 216 as part of the mounting assembly 212. The sidewall damage inspection assembly camera 203' and the cut edge damage inspection assembly camera 204' are each coupled, directly coupled, or fixed to the mounting assembly dual-camera mount 216.

The mounting assembly dual-camera mount 216 is positioned adjacent the work path 9 and is structured to, and does, position the sidewall damage inspection assembly camera 203' to focus on the can body sidewall 3, and, position the cut edge damage inspection assembly camera 204' to focus on the can body first end 6. That is, as is known, a camera has a focal length. Generally, prior infeed assemblies did not have sufficient space to allow a cut edge damage inspection assembly camera 204' disposed on the same mounting as a sidewall damage inspection assembly camera 203' because the cut edge damage inspection assembly camera 204' has a greater focal length compared to the sidewall damage inspection assembly camera 203'. Because the first vacuum starwheel 220 is disposed an "effective distance" from the full inspection assembly second vacuum starwheel 222, there is sufficient space for the dual-camera mount 216 to be disposed adjacent the work path 9 with sufficient space for the cut edge damage inspection assembly camera 204' focal length. As used herein, such a focal length is a "cut edge damage inspection assembly camera focal length" and means that the cut edge damage inspection assembly camera 204' is spaced so as to allow the cut edge damage inspection assembly camera 204' to focus on the can body first end 6. Stated alternately, the cut edge damage inspection assembly camera 204' is coupled to the dual-camera mount 216 with sufficient spacing between the cut edge damage inspection assembly camera 204' and the work path 9 to provide a cut edge damage inspection assembly camera focal length.

Further, in an exemplary embodiment, both the sidewall damage inspection assembly camera 203' and the cut edge damage inspection assembly camera 204' are each dual-purpose cameras. As used herein, a "dual-purpose camera" means a camera that is structured to, and does, focus, or is able to focus, on more than a single location on a work piece that is being inspected. When both the sidewall damage inspection assembly camera 203' and the cut edge damage inspection assembly camera 204' are dual-purpose cameras, each camera 203', 204' is further structured to inspect additional areas of the can body 1. In an exemplary embodiment, the sidewall damage inspection assembly camera 203' is structured to, and does, focus on both the can body sidewall 3 and the can body first end 6. Stated alternately, the sidewall damage inspection assembly camera 203' is structured to, and does, inspect both the can body sidewall 3 and the can body first end 6. Similarly, the cut edge damage inspection, assembly camera 204' is structured to, and does, focus on both the can body sidewall 3 and the can body first end 6. Stated alternately, the cut edge damage inspection assembly camera 204' is structured to and does, inspect both the can body sidewall 3 and the can body first end 6.

Also, as noted above, the full inspection assembly 200 includes a label verification assembly 201 that is structured to, and does, inspect and verify that each label is properly applied to, or printed on, each can body 1, an un-printed can inspection assembly 202 that is structured to, and does, detect/identify can bodies 1 that have not had a label applied thereto. In an exemplary embodiment, label verification assembly 201 and an un-printed can inspection assembly 202 are structured to detect color variation which is used to detect mixed label or unprinted can bodies 1. The mounting assembly 212 includes a "360° mounting" 218 which, as used herein, means a mounting structured to provide a number of inspection devices 210 access to 360° about the can body longitudinal axis 5 and/or the can body sidewall 3. It is understood that each of the label verification assembly 201 and the unprinted can inspection assembly 202 includes a plurality of sensors/cameras 201', 202'. The mounting assembly 360° mounting 218 is structured to, and does, position the label verification assembly sensors/cameras 201' and the un-printed can inspection assembly sensors/cameras 202' adjacent the work path 9 so that the plurality of label verification assembly sensors/cameras 201' and the unprinted can inspection assembly sensors/cameras 202' have an unobstructed view of 360° about the can body longitudinal axis 5 and/or the can body sidewall 3. Because the first vacuum starwheel 220 is disposed an "effective distance" from the full inspection assembly second vacuum starwheel 222, there is sufficient space for the mounting assembly 360° mounting 218 to be disposed adjacent the work path 9. The label verification assembly sensors/cameras 201' and the unprinted can inspection assembly sensors/cameras 202' are coupled, directly coupled, or fixed to the mounting assembly 360° mounting 218. In this configuration, label verification assembly 201 and the un-printed can inspection assembly 202 (or the label verification assembly sensors/cameras 201' and the un-printed can inspection assembly sensors/cameras 202') are structured to, and do, inspect 360° about a can body as the can body moves along the work path 9.

Any can body 1 that fails an inspection by the full inspection assembly 200 is ejected from the work path 9. That is, the full inspection assembly 200 includes an ejection assembly 230 that is structured to, and does, eject any deficient can body 1 from the work path 9. As used herein, a "deficient" can body 1 is a can body that fails any of the inspections performed by the full inspection assembly 200. Further, in an exemplary embodiment, the full inspection assembly ejection assembly 230 is disposed upstream of any processing station 20. As used herein, an ejection assembly disposed upstream relative to all processing stations 20 is an "upstream ejection assembly." Use of an upstream ejection assembly solves the problems stated above.

As used herein, a "starwheel guide assembly" includes a mounting assembly, a support assembly, and a number of guide rails. The starwheel guide assembly mounting assembly is structured to couple the starwheel guide assembly to a frame assembly, housing assembly, or similar construct while positioning the guide rails adjacent an associated starwheel. As used herein, a "starwheel guide assembly guide rail" is a construct including an elongated and/or extended guide surface that is disposed a guiding distance from a starwheel. As used herein, a "guiding distance" means the guiding surface of the guide rail facing an associated starwheel is spaced a distance from the starwheel so that the guiding surface will not contact a can body temporarily coupled to the starwheel and will not allow a can body to exit a starwheel pocket 34 if the can body disengages from the starwheel. As used herein, a "can body height adjustment assembly" is a sub-assembly of a starwheel guide assembly that is structured to adjust the position of the guide rails relative to an associated starwheel to accommodate a change in can body height.

As used herein, a "quick-change starwheel guide assembly" means a starwheel guide assembly wherein at least one of the can body height adjustment assembly and starwheel guide assembly mounting assembly are structured to be, and/or are, coupled to a starwheel guide assembly mounting base, or similar construct, by an "exceedingly limited number of couplings." As used herein, a "quick-change starwheel guide assembly can body height adjustment assembly" means a can body height adjustment assembly is structured to be, and/or is, coupled to a starwheel guide assembly support assembly, or similar construct, by an "exceedingly limited number of couplings." A "quick-change starwheel guide assembly mounting assembly" means a starwheel guide assembly mounting assembly that is structured to be, and/or is, coupled to a starwheel guide assembly mounting base, or similar construct, by an "exceedingly limited number of couplings."

As shown in FIGS. 6-9, and as noted above, necker machine 10, including the infeed assembly 100 and/or any of the processing stations 20, includes a number of vacuum starwheels 32 as well as a number of starwheel guide assemblies 300. Each starwheel guide assembly 300 is associated with a vacuum starwheel 32 and is structured to maintain a can body 1 in the pockets 34 of that vacuum starwheel 32 at the locations adjacent the starwheel guide assembly 300. The starwheel guide assemblies 300 are, in an exemplary embodiment, also disposed on selected processing stations 20. That is, the following discussion will address a starwheel guide assembly 300 as part of the infeed assembly 100, but it is understood that the starwheel guide assemblies 300 are also associated with the processing stations 20. The starwheel guide assemblies 300 are generally similar and only one is discussed below.

The necker machine 10 (or infeed assembly 100/processing stations 20) include a number of starwheel guide assembly mounting bases 150 that are coupled, directly coupled, fixed to, or are unitary with, the frame assembly 12. In an exemplary embodiment, each starwheel guide assembly mounting base 150 is disposed adjacent an associated vacuum starwheel 32. In an exemplary embodiment, each starwheel guide assembly mounting base 150 includes an exceedingly limited number of retained couplings 152. Use of the exceedingly limited number retained couplings 152 solves the problems stated above. Each starwheel guide assembly mounting base 150 and an exceedingly limited number retained couplings 152 is also identified as part of the associated starwheel guide assembly 300.

In an exemplary embodiment, the starwheel guide assembly mounting base retained coupling 152 is selected from the group including, consisting essentially of, or consisting of, tethered fasteners, trapped fasteners (fasteners adjustably fixed to another element so that the trapped fastener is structured to move between a tight position and a loose position, but cannot move beyond these positions), and expanding couplings (a body enclosing movable parts with cams structured to move the movable parts outwardly as the coupling is tightened such as, but not limited to, the Mitee-Bite Loc-Down® System manufactured by Mitee-Bite Products, LLC at P.O. BOX 430, Center Ossipee, N.H. 03814).

In an exemplary embodiment, the starwheel guide assembly mounting base retained coupling 152 includes a locking surface 153.

In an exemplary embodiment, each starwheel guide assembly mounting base 150 includes a positioning contour 154. As used herein, a "positioning contour" 154 means a contour on a first element that is other than generally planar, circular, cylindrical, spherical, or symmetrical and which is structured to be directly coupled to a second element with no significant gaps therebetween having a corresponding "positioning contour." For example, a mounting that includes a flat plate with a threaded bore therein does not have a "positioning contour." That is, another plate coupled by a fastener to the flat plate and the threaded bore can be in many orientations. Conversely, a mounting with a trapezoidal ridge on an otherwise flat plate with a threaded bore therein does have a "positioning contour" That is, a plate structured to be coupled thereto has a trapezoidal groove corresponding to the trapezoidal ridge. Thus, the two plates can only be coupled in a co-planar (immediately adjacent with no significant gap(s)) manner when the trapezoidal ridge/groove are aligned with each other. Thus, the contour orients the two plates relative to each other. Further, when the two "positioning contours" are directly coupled, the second element is in a selected position relative to the first element. As used in the definition of "positioning contour," a "selected position" means that the second element is only able to be in a single desired position and orientation. For example, on an automobile, a wheel hub and an axle hub have corresponding contours, typically planar, and four to six lug nut openings. In this configuration, the wheel can be coupled to the hub in multiple orientations. As such, the wheel is not limited to a single "selected position" and this configuration does not define a "positioning contour."

Figure 6:
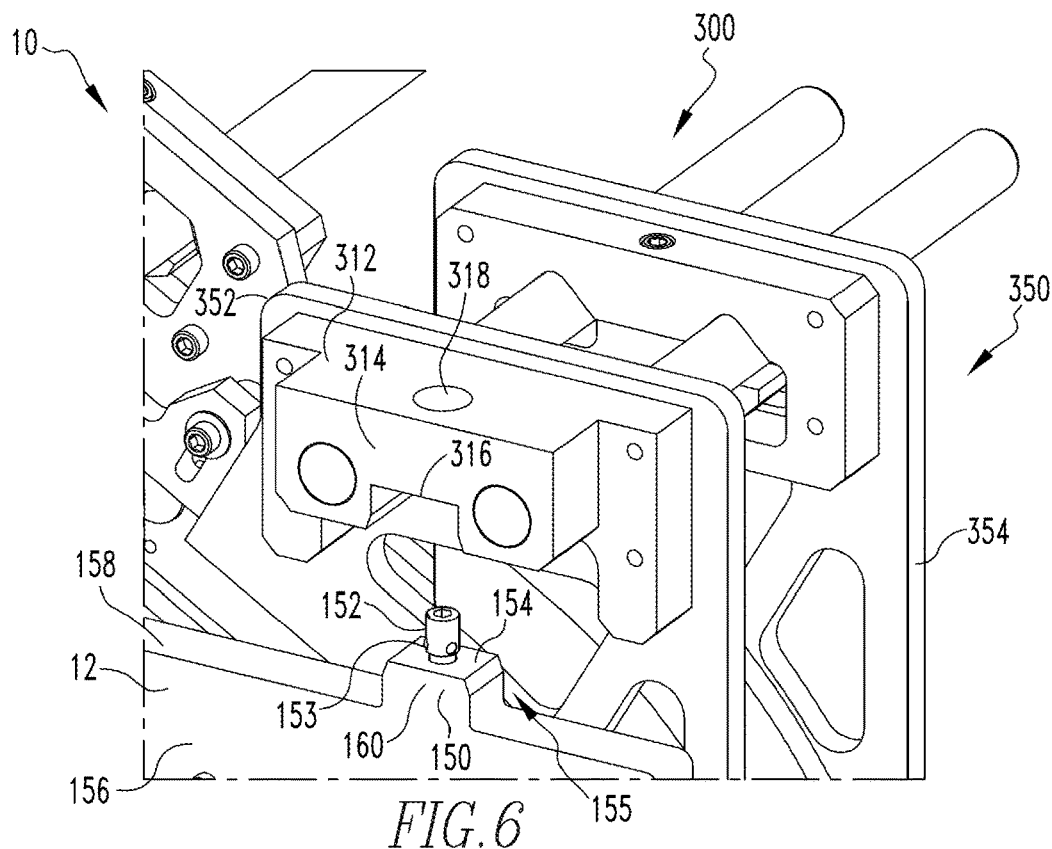
FIG. 6 is a partial isometric view of an infeed assembly.
Figure 7:
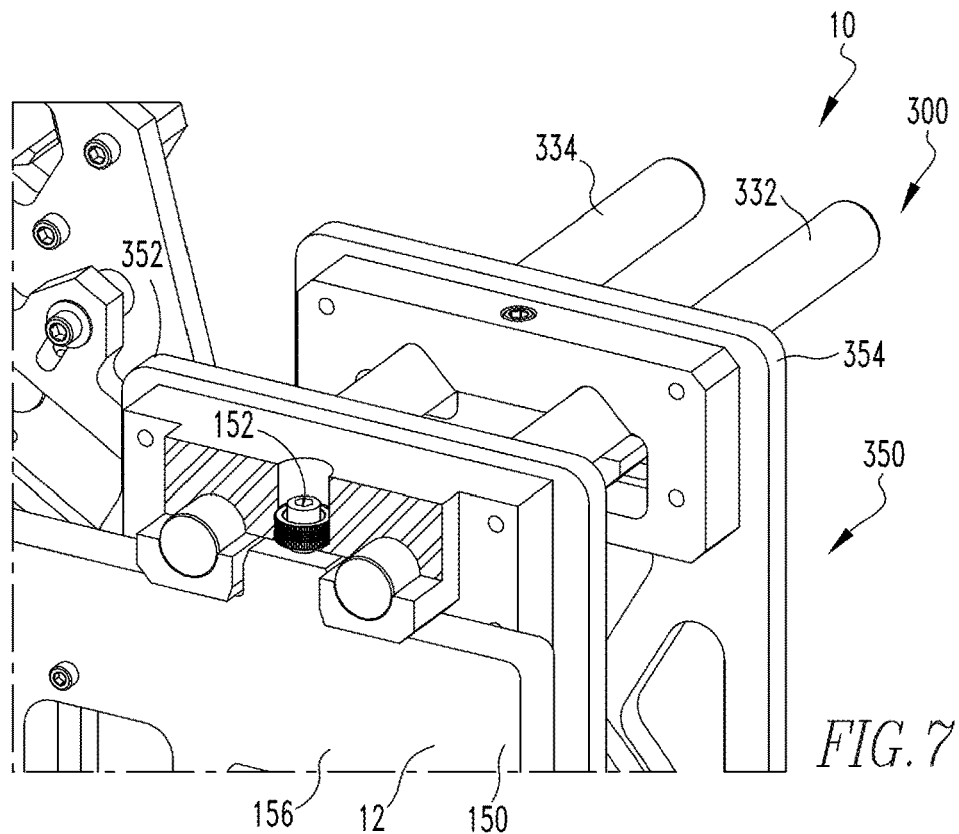
FIG. 7 is another partial isometric view of an infeed assembly.
Figure 8:
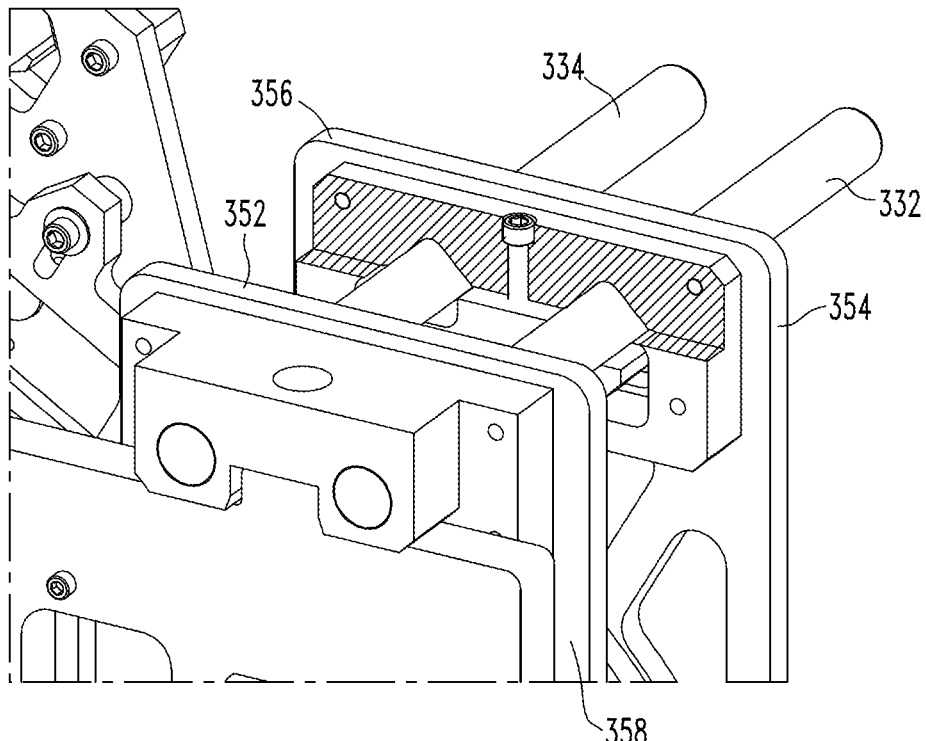
FIG. 8 is another partial isometric view of an infeed assembly.
Figure 9:
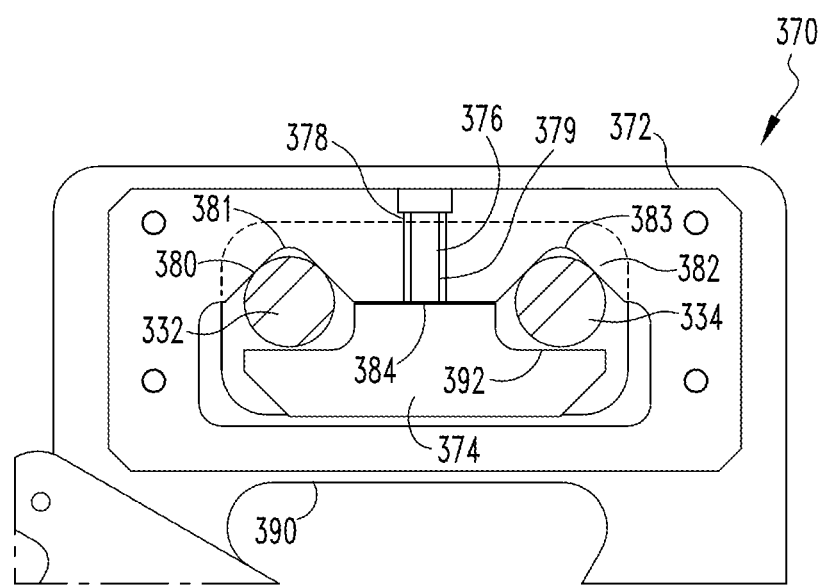
FIG. 9 is partial cross-sectional view of an infeed assembly.
Figure 10:
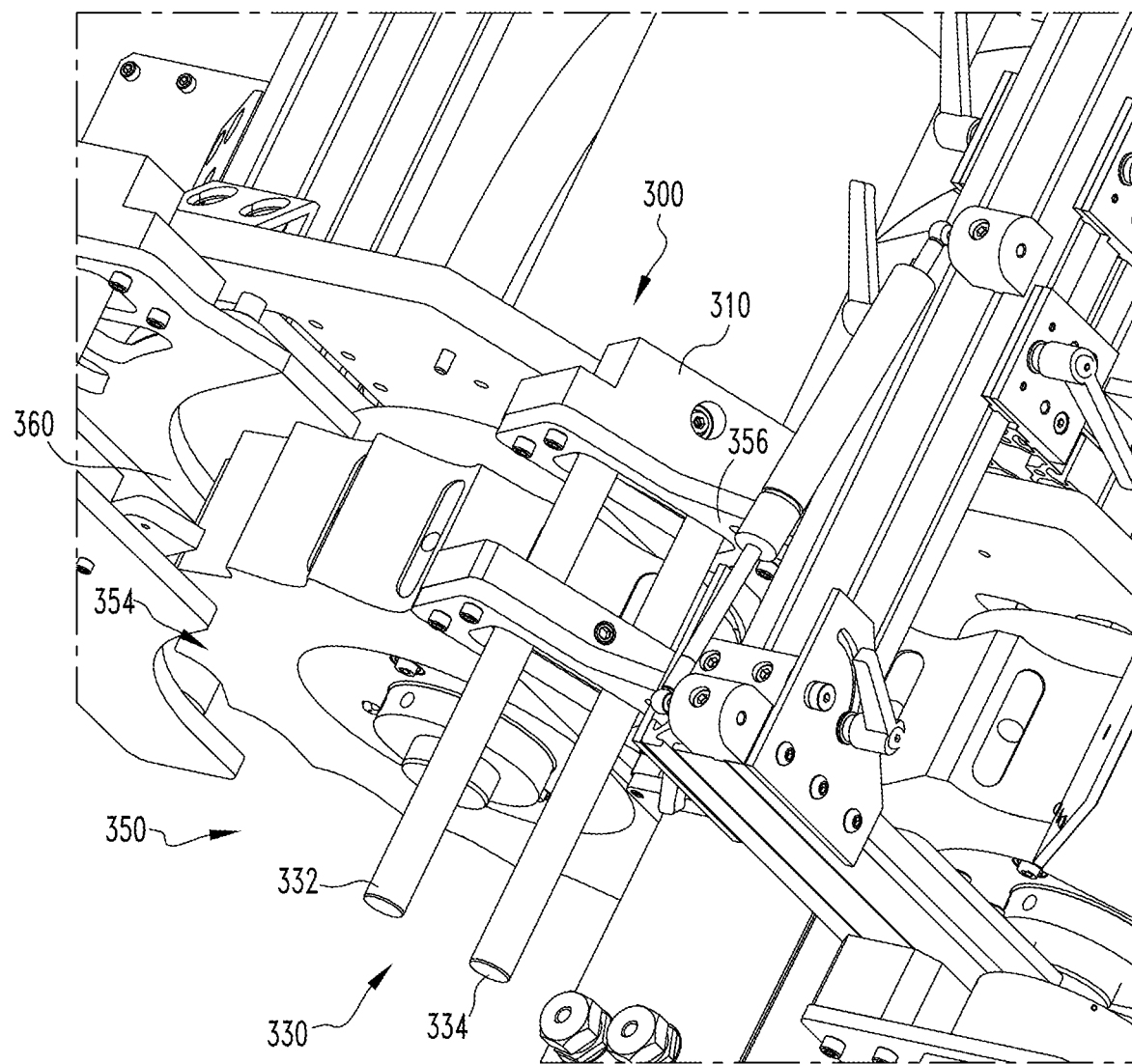
FIG. 10 is another partial isometric view of an infeed assembly.

As shown in FIG. 6, in an exemplary embodiment, each starwheel guide assembly mounting base 150 includes a plate 156 including a generally planar and generally horizontal upper surface 158 as well as a protrusion 160. The generally planar upper surface 158 and the protrusion 160 define a "positioning contour" as defined above.

Each starwheel guide assembly mounting base 150 also includes the starwheel guide assembly mounting base retained coupling 152. That is, in an exemplary embodiment, each starwheel guide assembly mounting base 150 includes an expanding, coupling 155. As shown, the upper surface of each starwheel guide assembly mounting base protrusion 160 defines a cavity (not numbered) in which an expanding coupling 155 is disposed. In an exemplary embodiment, the expanding coupling 155, or any starwheel guide assembly mounting base retained coupling 152, is elongated and extends generally vertically.

As shown in FIGS. 6-10, each starwheel guide assembly 300 includes a starwheel guide assembly mounting assembly 310, a starwheel guide assembly support assembly 330, a number of starwheel guide assembly guiderails 350, and a starwheel guide assembly can body height adjustment assembly 370. In an exemplary embodiment, at least one of the starwheel guide assembly mounting assembly 310 or the starwheel guide assembly can body height adjustment assembly 370 is a quick-change assembly. That is, as used herein, "at least one of the starwheel guide assembly mounting assembly 310 or the starwheel guide assembly can body height adjustment assembly 370 is a quick-change assembly" means that either the starwheel guide assembly mounting assembly 310 is a quick-change starwheel guide assembly mounting assembly 310, as defined above, or the starwheel guide assembly can body height adjustment assembly 370 is a quick-change starwheel guide assembly can body height adjustment assembly 370, as defined above.

The starwheel guide assembly mounting assembly 310 includes a body 312 that defines a positioning contour 314. That is, the starwheel guide assembly mounting assembly body positioning contour 314 corresponds to the starwheel guide assembly mounting base positioning contour 154. As shown, when the starwheel guide assembly mounting base positioning contour 154 is a protrusion 160, the starwheel guide assembly mounting assembly positioning contour 314 is a recess 316 that generally corresponds to the starwheel guide assembly mounting base positioning contour protrusion 160.

The starwheel guide assembly mounting assembly body 312 also defines a "single active coupling passage" 318. As used herein, a "single active coupling passage" is a coupling passage that is structured to be used exclusively to couple two elements. That is, a body with a single coupling passage has a "single active coupling passage." A body with a plurality of coupling passages includes a "single active coupling passage" when only one of those passages is structured to be used, and is used, to couple two elements together. The starwheel guide assembly mounting assembly single active coupling passage 318 corresponds to the starwheel guide assembly mounting base retained coupling 152. Thus, when the starwheel guide assembly mounting, base retained coupling 152 is disposed on the starwheel guide assembly mounting base positioning contour protrusion 160, the starwheel guide assembly mounting assembly single active coupling passage 318 extends through the starwheel guide assembly mounting assembly positioning contour recess 316. Thus, a starwheel guide assembly mounting assembly body 312 is structured to be, and is, coupled to a starwheel guide assembly mounting base 150 by a single coupling. This solves the problems identified above. Further, as the coupling is a retained coupling, this also solves the problems identified above. The starwheel guide assembly mounting assembly body 312 is also structured to, and does, support an inner guiderail 352, discussed below.

The starwheel guide assembly support assembly 330 is structured to, and does, support a number of guiderails; two shown as an inner guiderail 352 and an outer guiderail 354, discussed below. The starwheel guide assembly support assembly 330 includes an elongated first support member 332 and an elongated second support member 334. The first support member 332 and the second support member 334 are collectively identified herein as, i.e., as used herein, the "starwheel guide assembly support assembly first and second support members" 332, 334. As shown, in an exemplary embodiment, the starwheel guide assembly support assembly first and second support members 332, 334 are generally cylindrical. The starwheel guide assembly support assembly first and second support members 332, 334 extend generally horizontally from the starwheel guide assembly mounting assembly body 312 toward the front of the necker machine 10. The starwheel guide assembly support assembly first and second support members 332, 334 are spaced from each other. In an exemplary embodiment, the distal ends of the starwheel guide assembly support assembly first and second support members 332, 334 include a removable flared cap (not shown) or similar construct that increases the cross-sectional area of the distal ends of the starwheel guide assembly support assembly first and second support members 332, 334.

The number of starwheel guide assembly guiderails 350, in an exemplary embodiment, includes an inner guiderail 352 and an outer guiderail 354. Each of the starwheel guide assembly inner guiderail 352 (hereinafter, "inner guiderail" 352) and the starwheel guide assembly guiderail outer guiderail 354 (hereinafter, "outer guiderail" 354), includes a body 356, 358. Each of the inner guiderail 352 and the outer guiderail 354 includes a guide surface 360. As is known, each guide surface 360 is elongated and generally corresponds to the path of travel of a can body 1 on a vacuum starwheel 32. That is, each guide surface 360 is generally curved. The inner guide rail body 356 and the outer guiderail body 358 are structured to be, and are, coupled to the starwheel guide assembly support assembly 330. In an exemplary embodiment, wherein the starwheel guide assembly support assembly first and second support members 332, 334 are generally cylindrical, each of the inner guide rail body 356 and the outer guiderail body 358 include a pair of spaced openings (not numbered) that generally, or substantially, correspond to the starwheel guide assembly support assembly first and second support members 332, 334. That is, the pair of spaced openings are sized, shaped, and positioned to generally, or substantially, correspond to the starwheel guide assembly support assembly first and second support members 332, 334. In an exemplary embodiment, the inner guiderail 352 is coupled, directly coupled, or fixed to the starwheel guide assembly mounting assembly body 312 and moves therewith. The outer guiderail 354 is structured to be, and is, movably coupled to the starwheel guide assembly support assembly 330.

In an exemplary embodiment, the starwheel guide assembly can body height adjustment assembly 370 is coupled, directly coupled, fixed, or unitary with the starwheel guide assembly guiderail outer guiderail 'body' 358 and is identified herein as part of the outer guiderail 354. The starwheel guide assembly can body height adjustment assembly 370 includes a primary body 372, a secondary body 374, and a single retained coupling 376. The starwheel guide assembly can body height adjustment assembly primary body 372 defines a single coupling passage 378. The starwheel guide assembly can body height adjustment assembly primary body coupling passage 378 generally corresponds to the quick-change can body height adjustment assembly retained coupling 376, discussed below. The starwheel guide assembly can body height adjustment assembly primary body coupling passage 378 further defines a locking surface 379 that extends generally horizontally. In an exemplary embodiment, the starwheel guide assembly can body height adjustment assembly primary body 372 further defines a first support member channel 380 and a second support member channel 382 (collectively, the "starwheel guide assembly can body height adjustment assembly primary body first and second channels" 380, 382). In one embodiment, not shown, the starwheel guide assembly can body height adjustment assembly primary body first and second channels 380, 382 each correspond to one of the starwheel guide assembly support assembly first and second support members 332, 334. As discussed below, the starwheel guide assembly support assembly first and second support members 332, 334 extend through the starwheel guide assembly can body height adjustment assembly primary body first and second channels 380, 382. In a configuration wherein the starwheel guide assembly can body height adjustment assembly primary body first and second channels 380, 382 generally correspond to the starwheel guide assembly support assembly first and second support members 332, 334, there is a possibility that the starwheel guide assembly can body height adjustment assembly primary body 372 will bind against the starwheel guide assembly support assembly first and second support members 332, 334. As such, in another embodiment, the starwheel guide assembly can body height adjustment assembly primary body first and second channels 380, 382 each have a "reduced contact surface," As used herein, a "reduced contact surface" means two surfaces that do not have a substantially corresponding contour. In an exemplary embodiment, the starwheel guide assembly can body height adjustment assembly primary body first and second channels 380, 382 are each an inverted generally V-shaped channel 381, 383. It is understood that an inverted generally V-shaped channel is exemplary and not limiting.

The starwheel guide assembly can body height adjustment assembly secondary body 374 defines a first engagement surface 390 and a second engagement surface 392. The starwheel guide assembly can body height adjustment assembly secondary body first engagement surface 390 and the starwheel guide assembly can body height adjustment assembly secondary body second engagement surface 392 are positioned to correspond to the starwheel guide assembly support assembly first and second support members 332, 334. As used herein, "positioned to correspond" means that elements are positioned in a similar manner but do not have corresponding (as defined above) contours. In an exemplary embodiment, each of the starwheel guide assembly can body height adjustment assembly secondary body first engagement surface 390 and the starwheel guide assembly can body height adjustment assembly secondary body second engagement surface 392 are generally planar.

The starwheel guide assembly can body height adjustment assembly secondary body 374 further defines a coupling 384 for the starwheel guide assembly can body height adjustment assembly retained coupling 376. The starwheel guide assembly can body height adjustment assembly secondary body coupling 384, in an exemplary embodiment, is a threaded bore. The starwheel guide assembly can body height adjustment assembly retained coupling 376 is adjustably fixed to the starwheel guide assembly can body height adjustment assembly secondary body 374. That is, as shown, the starwheel guide assembly can body height adjustment assembly retained coupling 376 is in one embodiment (not shown) a trapped coupling at the starwheel guide assembly can body height adjustment assembly secondary body coupling 384. Further, the starwheel guide assembly can body height adjustment assembly secondary body 374 is movably coupled to the starwheel guide assembly can body height adjustment assembly primary body 372 with the starwheel guide assembly can body height adjustment assembly retained coupling 376 extending through the starwheel guide assembly can body height adjustment assembly primary body coupling passage 378 with the starwheel guide assembly can body height adjustment assembly retained coupling 376 structured to engage the starwheel guide assembly can body height adjustment assembly primary body coupling passage locking surface 379.

Each starwheel guide assembly 300 is assembled as follows. The starwheel guide assembly mounting assembly 310 and the starwheel guide assembly support assembly 330 are coupled, directly coupled, or fixed to each other, or are formed as a unitary body. The starwheel guide assembly can body height adjustment assembly 370 is coupled, directly coupled, or fixed to the outer guiderail 354. It is understood that the inner guiderail 352 and the outer guiderail 354 are oriented so that their guide surfaces 360 extend generally parallel to each other. The outer guiderail 354 is then movably coupled to the starwheel guide assembly support assembly 330 with the starwheel guide assembly support assembly first support member 332 disposed between the quick-change can body height adjustment assembly primary body first support member channel 380 and the quick-change can body height adjustment assembly secondary body first engagement surface 390, and, the starwheel guide assembly support assembly second support member 334 disposed between the quick-change can body height adjustment assembly primary body second support member channel 382 and the quick-change can body height adjustment assembly secondary body second engagement surface 392. In this configuration, each quick-change starwheel guide assembly 300 is a "unit assembly." As used herein, a "unit assembly" is an assembly of a plurality of elements that are coupled together as a unit. That is, the elements of a "unit assembly" can be collectively moved from one location to another. Thus, each starwheel guide assembly 300, with the exception of the starwheel guide assembly mounting base 150, are structured to be removed from the necker machine 10 and replaced with another starwheel guide assembly 300, as discussed below.

The starwheel guide assembly can body height adjustment assembly 370 operates as follows. Initially, it is assumed that the starwheel guide assembly can body height adjustment assembly 370 is set for a can body 1 of a first height. That is, the outer guiderail guide surfaces 360 is at a guiding distance relative to a can body 1 of a first height. In this configuration, the quick-change can body height adjustment assembly retained coupling 376 is in a second position wherein the quick-change can body height adjustment assembly secondary body first engagement surface 390 and the quick-change can body height adjustment assembly secondary body second engagement surface 392 engage an associated starwheel guide assembly support assembly support first or second member 332, 334. That is, the quick-change can body height adjustment assembly retained coupling 376 is manipulated to draw the starwheel guide assembly can body height adjustment assembly secondary body 374 toward the starwheel guide assembly can body height adjustment assembly primary body 3'72. The friction between the starwheel guide assembly can body height adjustment assembly primary body first and second channels 380, 382 and the starwheel guide assembly support assembly support first or second member 332, 334, as well as the friction between the quick-change can body height adjustment assembly secondary body first engagement surface 390, the quick-change can body height adjustment assembly secondary body second engagement surface 392 and the starwheel guide assembly support assembly support first or second member 332, 334, maintain the starwheel guide assembly can body height adjustment assembly 370, and therefore the outer guiderail 354, in a selected location.

When the position of the outer guiderail 354 needs to be adjusted to accommodate a can body 1 of a second height, the quick-change can body height adjustment assembly retained coupling 376 is moved to a first position wherein the starwheel guide assembly can body height adjustment assembly secondary body 374 moves away from the starwheel guide assembly can body height adjustment assembly primary body 372. In this configuration, the starwheel guide assembly can body height adjustment assembly 370, and therefore the outer guiderail 354, are movable longitudinally along the first and second support members 332, 334. This adjusts the position of the outer guiderail 354 so as to be at a guiding distance relative to the can body 1 of a second height.

Stated alternately, each quick-change can body height adjustment assembly secondary body 374 moves between a non-engaging first position, wherein each quick-change can body height adjustment assembly secondary body first engagement surface 390 and each quick-change can body height adjustment assembly secondary body second engagement surface 392 do not engage an associated starwheel guide assembly support assembly first and second support member 332, 334, and an engaging second position, wherein each quick-change can body height adjustment assembly secondary body first engagement surface 390 and each quick-change can body height adjustment assembly secondary body second engagement surface 392 engage an associated starwheel guide assembly support assembly first and second support member 332, 334.

The starwheel guide assembly can body height adjustment assembly 370 moves between a first and second configuration corresponding to the first and second position of the quick-change can body height adjustment assembly secondary body 374. Moreover, the starwheel guide assembly can body height adjustment assembly 370 moves between the first and second configurations via adjusting the single quick-change can body height adjustment assembly retained coupling 376. This solves the problems stated above.

The starwheel guide assembly mounting assembly 310 operates as follows. When installed, the starwheel guide assembly mounting assembly body positioning contour 314 is directly coupled to the starwheel guide assembly mounting base positioning contour 154. In this position, the starwheel guide assembly mounting base retained coupling 152 extends through the starwheel guide assembly can body height adjustment assembly primary body coupling passage 378. Further, the starwheel guide assembly mounting base retained coupling locking surface 153 engages the starwheel guide assembly can body height adjustment assembly primary body coupling passage locking surface 379. In this configuration, the starwheel guide assembly mounting assembly 310, and therefore the starwheel guide assembly 300 is fixed to the necker machine 10 and/or the frame assembly 12. Hereinafter, this configuration is identified as the "second configuration" of the starwheel guide assembly mounting assembly 310.

Each starwheel guide assembly mounting assembly 310 is structured to position the guide surfaces 360 of the inner guiderail 352 and the outer guiderail 354 at a guiding distance relative to a can body 1 of a first diameter. When the necker machine 10 needs to process a can body of a second diameter, each starwheel guide assembly 300 needs to be replaced. To do this, the starwheel guide assembly mounting base retained coupling 152 is manipulated so that the starwheel guide assembly mounting base retained coupling locking surface 153 does not engage the starwheel guide assembly can body height adjustment assembly primary body coupling passage locking surface 379. In this configuration, hereinafter, the "first configuration" of the starwheel guide assembly mounting assembly 310, the starwheel guide assembly 300 is structured to be, and is, removed from the associated starwheel guide assembly mounting base 150. The starwheel guide assembly 300 is then replaced with another, or replacement, starwheel guide assembly 300 sized to accommodate a can body 1 of a second diameter. It is noted that the starwheel guide assembly 300 is removed as a unit because the starwheel guide assembly 300 is a unit assembly.

Installation of the replacement starwheel guide assembly 300 includes positioning the replacement starwheel guide assembly mounting assembly body positioning contour 314 over the starwheel guide assembly mounting base positioning contour 154. This further positions the starwheel guide assembly mounting base retained coupling 152 in the replacement starwheel guide assembly mounting assembly single active coupling passage 318. The starwheel guide assembly mounting base retained coupling 152 is manipulated so that the starwheel guide assembly mounting base retained coupling locking surface 153 engages the starwheel guide assembly can body height adjustment assembly primary body coupling passage locking surface 379.

Accordingly, the starwheel guide assembly 300 is installed/removed as a unit because the starwheel guide assembly 300 is a unit assembly. Further, because the starwheel guide assembly mounting assembly 310 and/or the can body height adjustment assembly 370 are a quick-change assemblies (each have a single relevant coupling), and, because the couplings are retained couplings, the problems identified above are solved.

As shown in FIGS. 11-14, the quick-change starwheel guide assembly concept is, in an exemplary embodiment, also incorporated into a quick-change vacuum starwheel assembly 400. As used herein, a "quick-change vacuum starwheel assembly" 400 means a vacuum starwheel assembly that includes at least one of a quick-change height adjustment assembly 550 or a quick-change vacuum starwheel mounting assembly 800. As used herein, a "quick-change can body height adjustment assembly" 550 means a construct structured to move a vacuum starwheel 32 axially on an associated rotating shaft wherein only a very limited number of retained couplings are required to be loosened or removed so as to allow the axial movement of the starwheel. As used herein, a "quick-change vacuum starwheel mounting assembly" 800 means a mounting assembly structured to couple, directly couple, or fix the separable vacuum starwheel components to a rotating shaft via one of a limited number of couplings, a very limited number of couplings, or an exceedingly limited number of couplings. In the definition of "quick-change vacuum starwheel mounting assembly" 800, the term "couplings" means a coupling that is structured to be secured/tightened such as, but not limited to a bolt on a threaded rod, and does not include an unsecured coupling such as, but not limited to, a lug extending through a passage.

In an exemplary embodiment, the quick-change vacuum starwheel assembly 400 includes a rotating shaft assembly 410, a vacuum starwheel body assembly 450, a vacuum assembly 480, a quick-change height adjustment assembly 550 and a quick-change vacuum starwheel mounting assembly 800. The rotating shaft assembly 410 includes a housing assembly 412, a mounting disk 414 and a rotating shaft 416. The rotating shaft assembly housing assembly 412 is a housing that is structured to be, and is, disposed about the rotating shaft assembly rotating shaft 416. The rotating shaft assembly housing assembly 412 is structured to be, and is, coupled, directly coupled, or fixed to the frame assembly 12. Thus, the rotating shaft assembly housing assembly 412 is in a fixed location relative to the frame assembly 12. The rotating shaft assembly rotating shaft 416 is operatively coupled to the drive assembly 2000 and is also identified as a part thereof. The drive assembly 2000 is structured to, and does, impart a rotational motion to the rotating shaft assembly rotating shaft 416 so that the rotating shaft assembly rotating shaft 416 rotates about its longitudinal axis.

In an exemplary embodiment, the rotating shaft assembly rotating shaft 416 includes a generally cylindrical body 418 having a proximal end 420 adjacent the frame assembly 12 and a distal end 422 spaced from the frame assembly 12. The rotating shaft assembly rotating shaft body 418, as shown in the Figures, includes portions with different radii. Further, in an exemplary embodiment, selected portions of the rotating shaft assembly rotating shaft body 418 define bearing surfaces and/or surfaces structured to support a bearing, as discussed below.

The rotating shaft assembly rotating shaft body distal end 422 includes a traveler hub mounting 424 (hereinafter, "traveler hub mounting 424"). The traveler hub mounting 424 is structured to be, and is, coupled to a traveling hub assembly 570, discussed below. In an exemplary embodiment, the traveler hub mounting 424 includes a central cavity 426 and two longitudinal slots, i.e., a first longitudinal slot 428 and a second longitudinal slot 430, as well as a number of coupling components (not shown/numbered). Further, the traveler hub mounting central cavity 426 includes a rotational coupling cavity 427 disposed on the rotating shaft assembly rotating shaft 416 axis of rotation. In an exemplary embodiment, the coupling components (not shown/numbered) are threaded bores disposed on the axial surface of the rotating shaft assembly rotating shaft body distal end 422. Further, in an exemplary embodiment, the rotating shaft assembly rotating shaft distal end 422 includes a positioning key mounting 432 (hereinafter, "rotating shaft assembly positioning key mounting 432"). As shown, the rotating shaft assembly positioning key mounting 432 is, in one embodiment, a longitudinal groove 434.

The vacuum starwheel body assembly 450 generally defines a vacuum starwheel 32 as defined above. That is, a vacuum starwheel 32 includes a torus-like assembly with a plurality of pockets 34 disposed on the radial surface thereof. As is known, a vacuum starwheel body assembly 450, or the parts, thereof, are often moved, carried, and positioned, by a human without the use of a cart or similar construct. Thus, depending upon the size of the vacuum starwheel body assembly 450, the vacuum starwheel body assembly 450 includes a number of vacuum starwheel body assembly body segments 452. In an exemplary embodiment, the vacuum starwheel body assembly body segments 452 are substantially similar and define an equal portion of the vacuum starwheel 32. That is, for example, if a vacuum starwheel body assembly 450 includes two vacuum starwheel body assembly body segments 452 (not shown), each starwheel body assembly body segment 452 is generally semi-circular and defines a half of the disk-like body. That is, there are two vacuum starwheel body assembly body segments 452 each defining an outer surface that extends about 180°. In the embodiment shown in the Figures, the vacuum starwheel body assembly 450 includes font starwheel body assembly body segments 452. The four starwheel body assembly body segments 452 are generally similar and each defines, generally, a quarter of a circle. That is, in this embodiment, each starwheel body assembly body segment 452 includes an outer surface 454 that defines an arc of about 90°.

As each starwheel body assembly body segment 452 is generally similar, only one is described herein. Each starwheel body assembly body segment 452 defines, generally, a 90° generally circular arc. That is, each starwheel body assembly body segment 452 extends over an arc of about 90°. Each starwheel body assembly body segment 452 includes an axial mounting portion 462 and a peripheral pocket portion 464. In one exemplary embodiment, each starwheel body assembly body segment 452 is a unitary body. In another embodiment, as shown, the axial mounting portion 462 and the peripheral pocket portion 464 are separate bodies that are coupled, directly coupled, or fixed together by fasteners 460.

The starwheel body assembly body segment axial mounting portion 462 includes a generally planar, generally arcuate body 461. In an exemplary embodiment, the starwheel body assembly body segment axial mounting portion 462 defines three mounting passages; a retained coupling passage 466, a first lug passage 468, and a second lug passage 469 (hereinafter, and collectively "starwheel body assembly body segment axial mounting portion passages 466, 468, 469"). The starwheel body assembly body segment axial mounting portion passages 466, 468, 469 extend generally perpendicular to the plane of the starwheel body assembly body segment axial mounting portion 462. The starwheel body assembly body segment axial mounting portion 462 (and therefore the vacuum starwheel body assembly 450) is also identified herein as part of the quick-change vacuum starwheel mounting assembly 800.

The starwheel body assembly body segment peripheral pocket portion 464 defines a number of pockets 34 on the radial surface of the starwheel body assembly body segment 452. As discussed above, each starwheel body assembly body segment peripheral pocket portion pocket 34 (hereinafter, "starwheel body assembly body segment peripheral pocket 34" or "starwheel pocket 34") defines a generally semi-cylindrical cradle sized to correspond to a can body 1 or can bodies of generally similar radii. Each starwheel body assembly body segment peripheral pocket 34 includes a radially extending passage 470 that extends through the starwheel body assembly body segment peripheral pocket portion 464. Each starwheel body assembly body segment peripheral pocket passage 470 is structured to be, and is, in fluid communication with the vacuum assembly 480 and a partial vacuum (or suction) is drawn therethrough.

Further, the starwheel body assembly body segment peripheral pocket portion 464 is thicker (in a direction perpendicular to the plane of starwheel body assembly body segment axial mounting portion body 461) than the starwheel body, assembly body segment axial mounting, portion body 461. The starwheel body assembly body segment peripheral pocket portion 464 also extends a greater distance rearwardly (toward the frame assembly 12) as opposed to a greater, or equal, distance forwardly (away from the frame assembly 12). In this configuration, and when all starwheel body assembly body segments 452 are coupled to form a vacuum starwheel 32, the starwheel body assembly body segments 452 define a generally cylindrical, or disk-like, cavity 472 (hereinafter, the "starwheel body cavity" 472). The starwheel body cavity 472 is in fluid communication with the vacuum assembly 480 as discussed below.

Further, the inner side (the side generally facing the frame assembly 12) of the starwheel body assembly body segment peripheral pocket portion 464 defines a sealing surface 474 (hereinafter, the "starwheel body assembly body sealing surface" 474). In an exemplary embodiment, the starwheel body assembly body sealing surface 474 is generally circular and has the same radius (hereinafter, the "starwheel body assembly body sealing surface radius") regardless of the size of the vacuum starwheel body assembly 450. For example, a first vacuum starwheel body assembly 450 has a radius of twenty-four inches and the starwheel body assembly body sealing surface 474 has a radius of twenty-two inches. A second vacuum starwheel body assembly 450 has a radius of twenty-six inches while the starwheel body assembly body sealing surface 474 still has a radius of twenty-two inches. To ensure the second vacuum starwheel body assembly 450 has a starwheel body assembly body sealing surface radius of twenty-two inches, the radially extending thickness of the starwheel body assembly body segment peripheral pocket portion 464 is increased by about two inches.

Further, it is understood that different vacuum starwheel body assemblies 450 have different configurations. For example, a first vacuum starwheel body assembly 450, as shown, has a first radius and includes twenty starwheel pockets 34 each with a first pocket radius. A second vacuum starwheel body assembly not shown, has a similar radius, but includes sixteen starwheel pockets 34 with a larger, second pocket radius. A third vacuum starwheel body assembly, not shown, has a greater radius and twenty-four starwheel pockets 34 with a first pocket radius. Thus, the vacuum starwheel body assemblies 450 are structured to be exchanged so as to accommodate can bodies 1 of different radii and/or as needed to accommodate desired operational characteristics of the necker machine 10 such as, but not limited to, the processing speed as measured in cans per minute.

Figure 15:
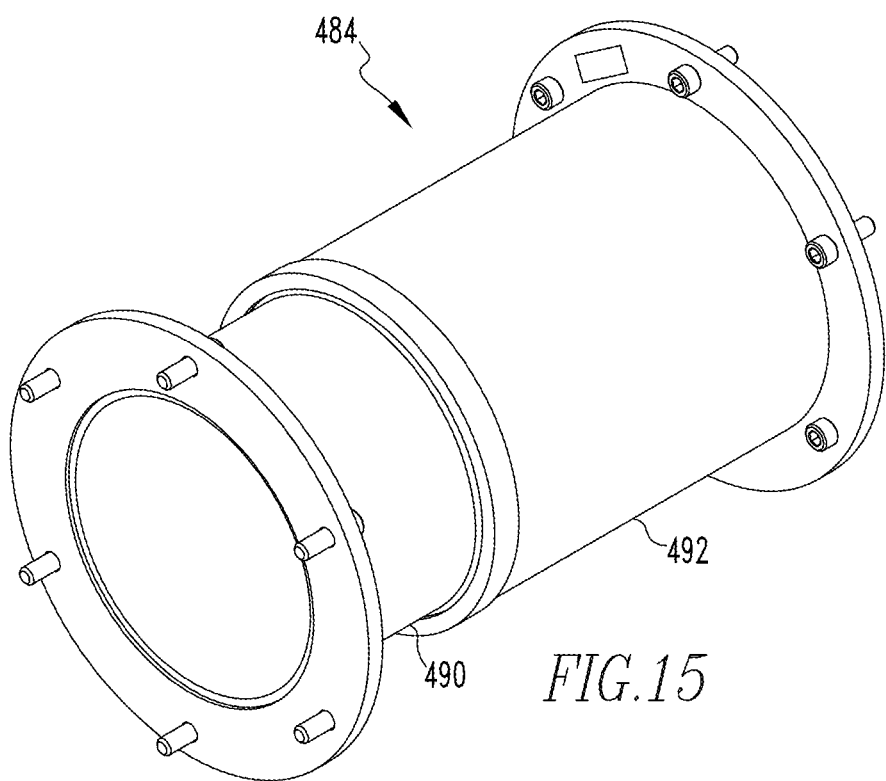
FIG. 15 is an isometric view of a vacuum assembly telescoping vacuum conduit.
Figure 16:
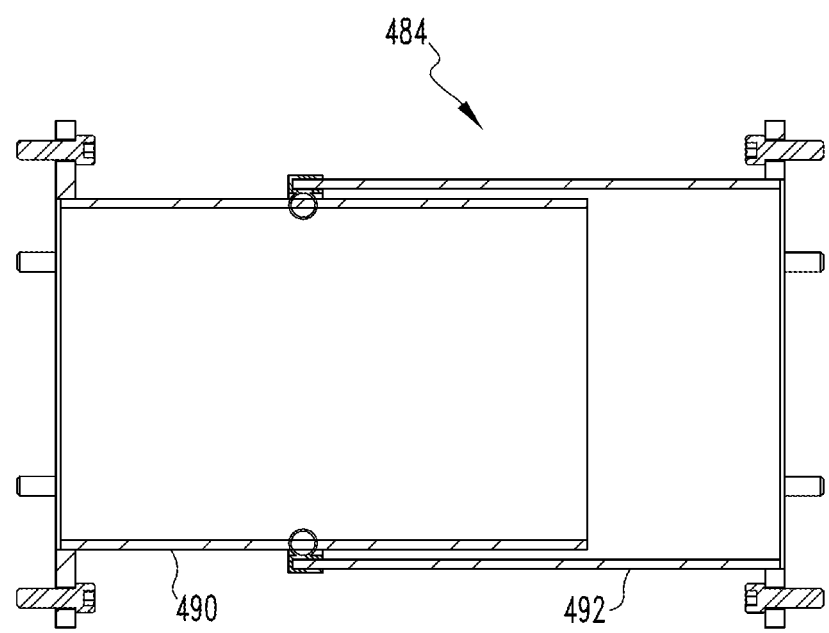
FIG. 16 is a cross-sectional side view of a vacuum assembly telescoping vacuum conduit.

As shown in FIGS. 15-16, the vacuum assembly 480 includes a telescoping vacuum conduit 484, a vacuum housing assembly 486 and a vacuum seal assembly 540. The vacuum assembly 480 is structured to be in, and is in, fluid communication with a vacuum generator 482 (shown schematically). As is known, the vacuum generator 482 is coupled to, and structured to reduce the fluid/air pressure in a plurality of vacuum starwheels 32. It is understood that the term "vacuum" is used generally to mean a substantially reduced pressure relative to the atmosphere and does not require an absolute vacuum. The vacuum generator 482 is structured to, and does, substantially reduce the fluid/air pressure in the vacuum assembly vacuum housing assembly 486 and elements in fluid communication therewith. While not specifically included in the vacuum assembly 480, the interaction of the vacuum generator 482 and the vacuum assembly 480 means that, as used herein, the vacuum assembly 480 is structured to generate a vacuum. Further, as used herein, a statement that the vacuum assembly 480 "is in fluid communication" with another element means that a fluid path exists between the vacuum assembly 480 and the element and that suction is applied to, or through, the element. For example, the vacuum assembly 480 is, selectively, in fluid communication with each starwheel body assembly body segment peripheral pocket 34. Thus, each starwheel body assembly body segment peripheral pocket 34 has a vacuum applied thereto and there is suction through each starwheel body assembly body segment peripheral pocket passage 470.

The vacuum assembly telescoping vacuum conduit 484 includes a number of telescoping bodies 490, 492 (two shown). The vacuum assembly telescoping vacuum conduit telescoping bodies 490, 492 are structured to be, and are, disposed in a telescoping configuration. As used herein, two bodies in a "telescoping configuration" means that one body has a smaller, but corresponding, cross-sectional shape relative to a larger body and the smaller body is movably disposed within the larger body and structured to move between a retracted position, wherein the smaller body is substantially disposed within the larger body, and an extended position, wherein the smaller body substantially extends from the larger body. Further, in an exemplary embodiment, the vacuum assembly telescoping vacuum conduit 484 includes a seal between the two vacuum assembly telescoping vacuum conduit telescoping bodies 490, 492.

Figure 17:
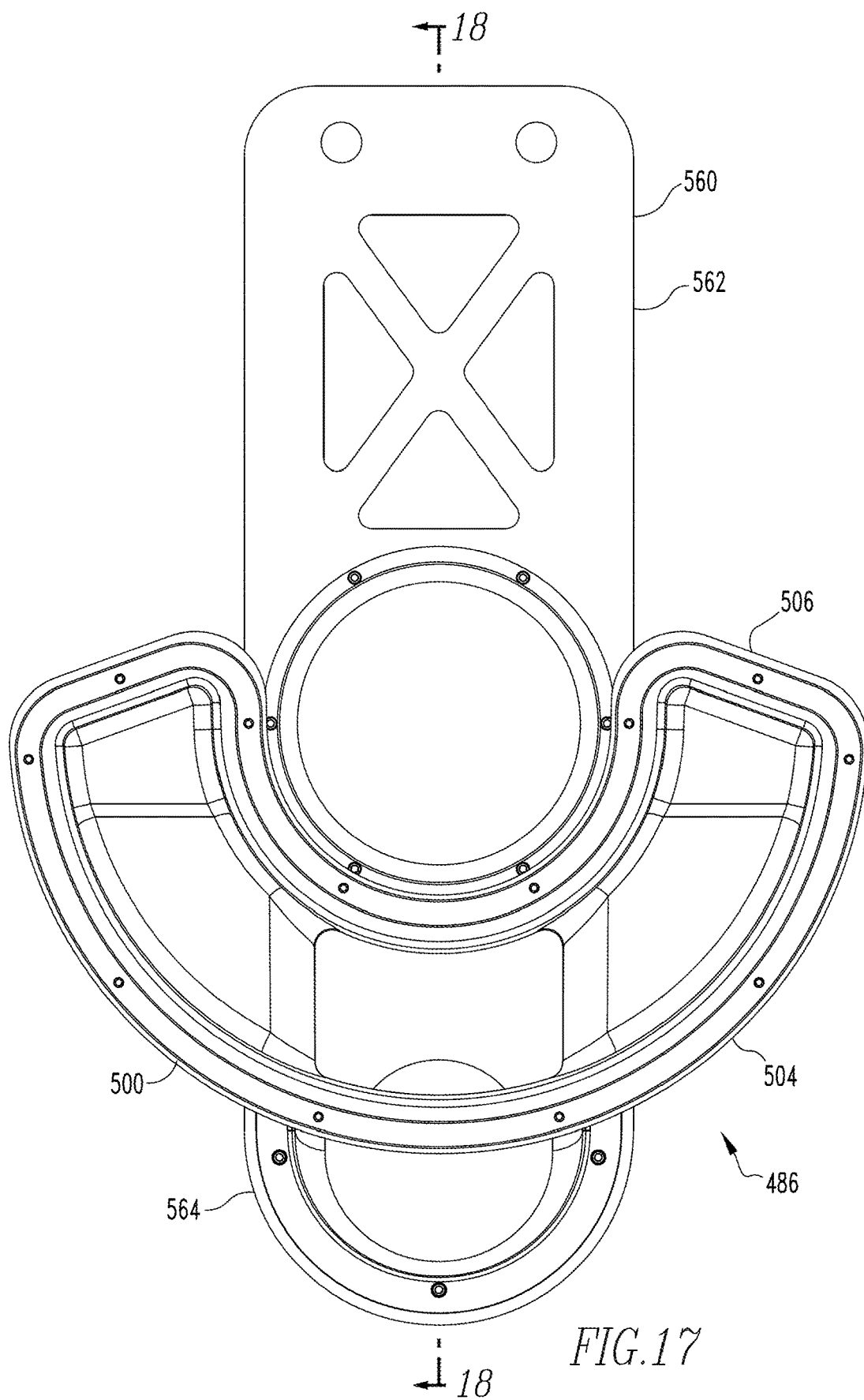
FIG. 17 is a back view of a vacuum assembly.
Figure 18:
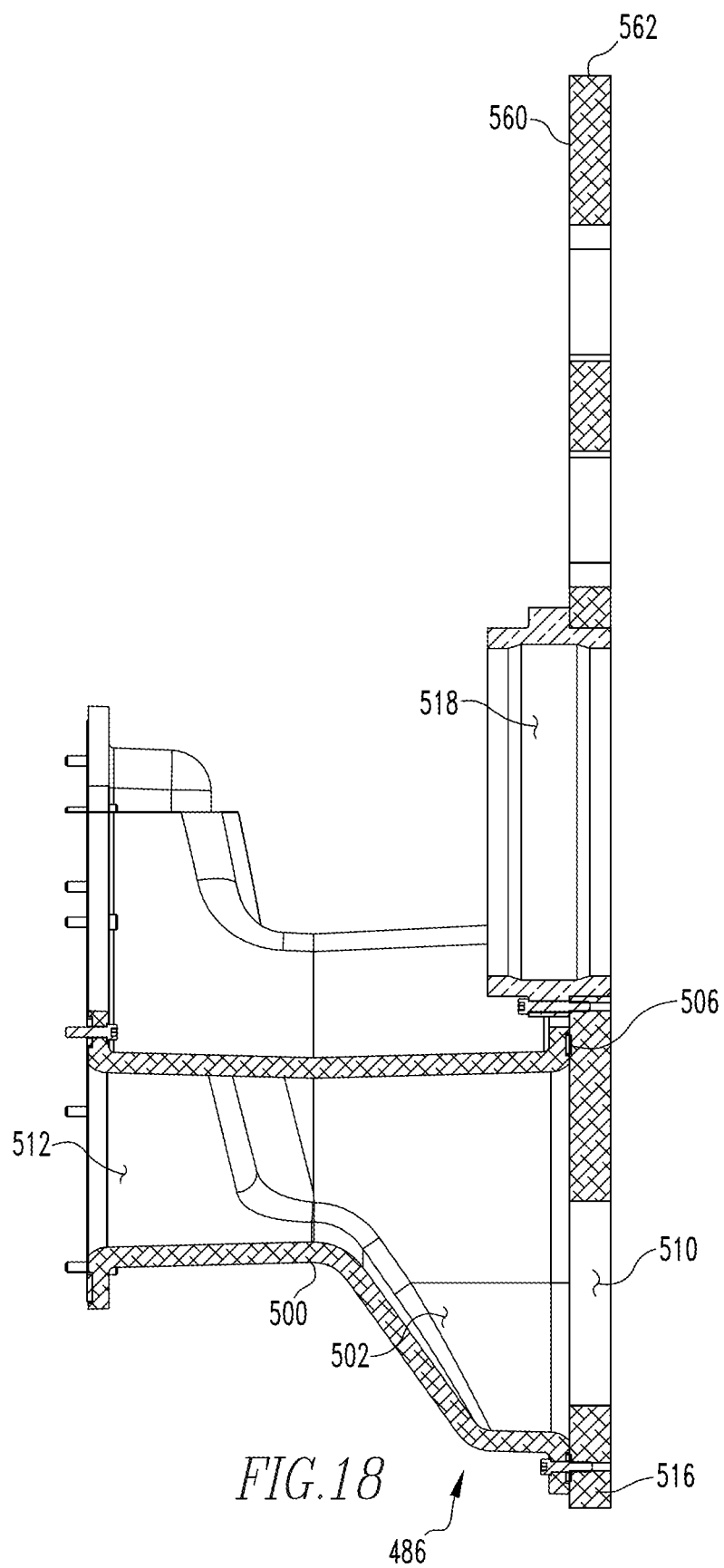
FIG. 18 is a side view of a vacuum assembly.
Figure 19:
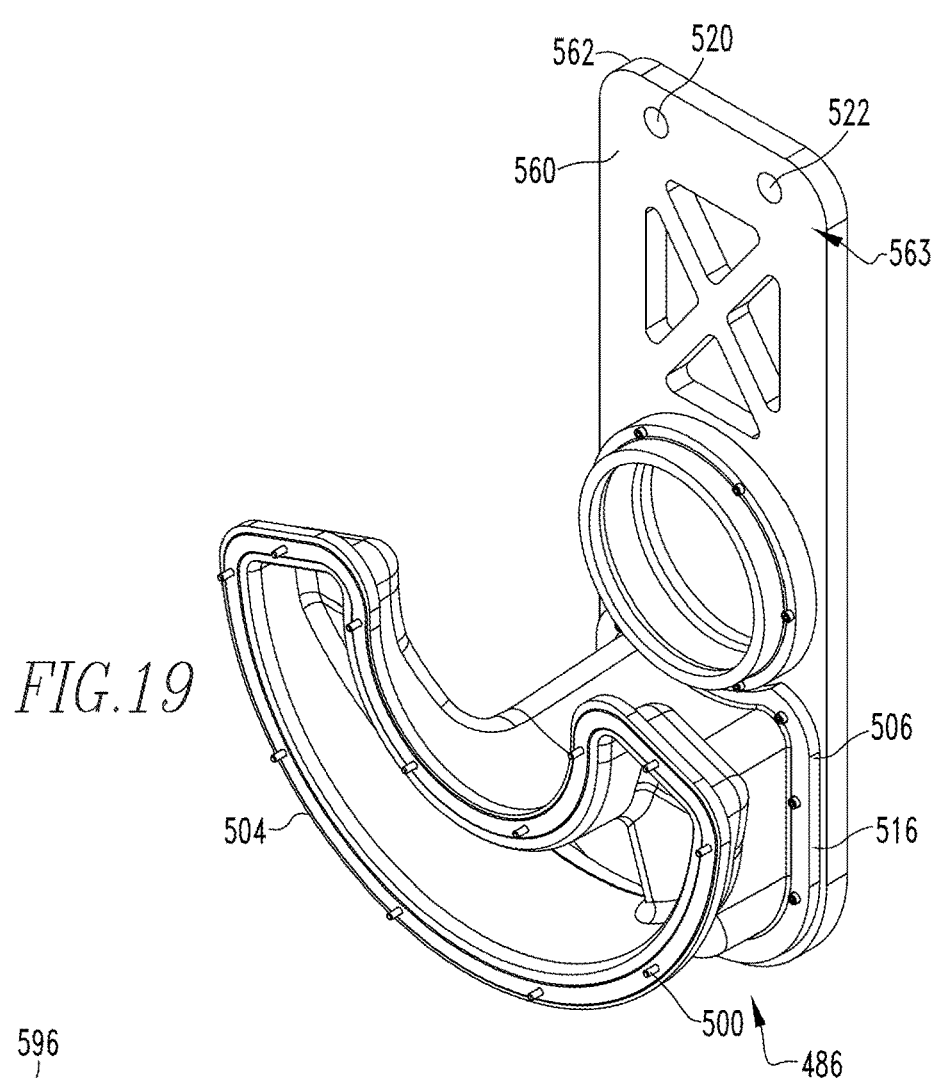
FIG. 19 is an isometric view of a vacuum assembly.
Figure 20A:
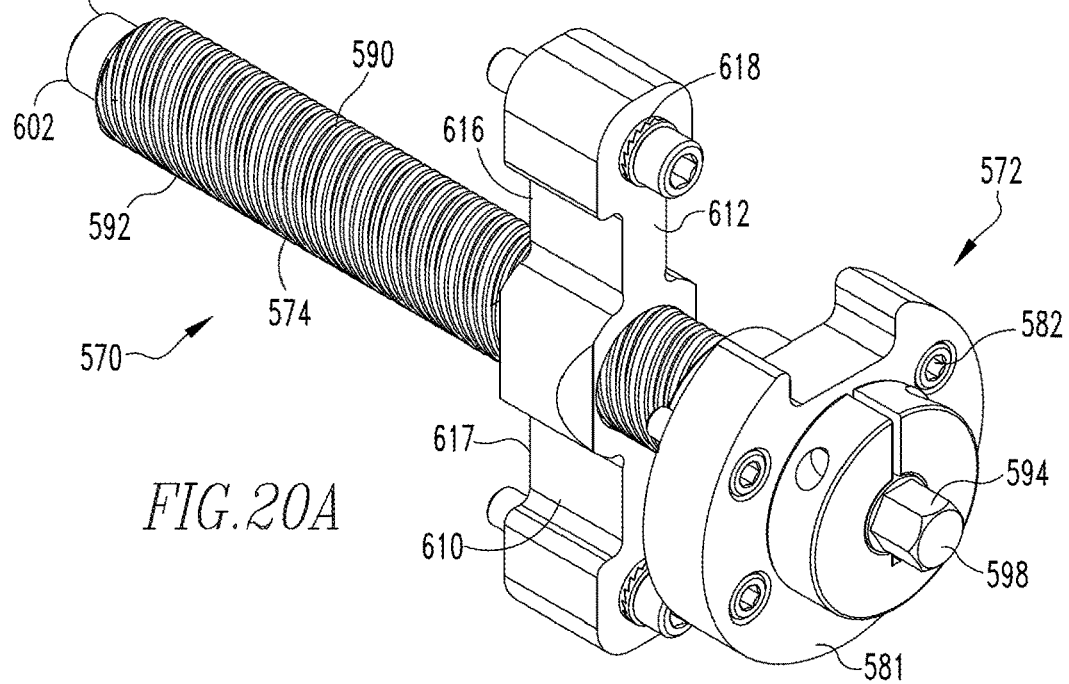
FIG. 20A is an isometric view of a quick-change height adjustment assembly traveling hub assembly.
Figure 23:
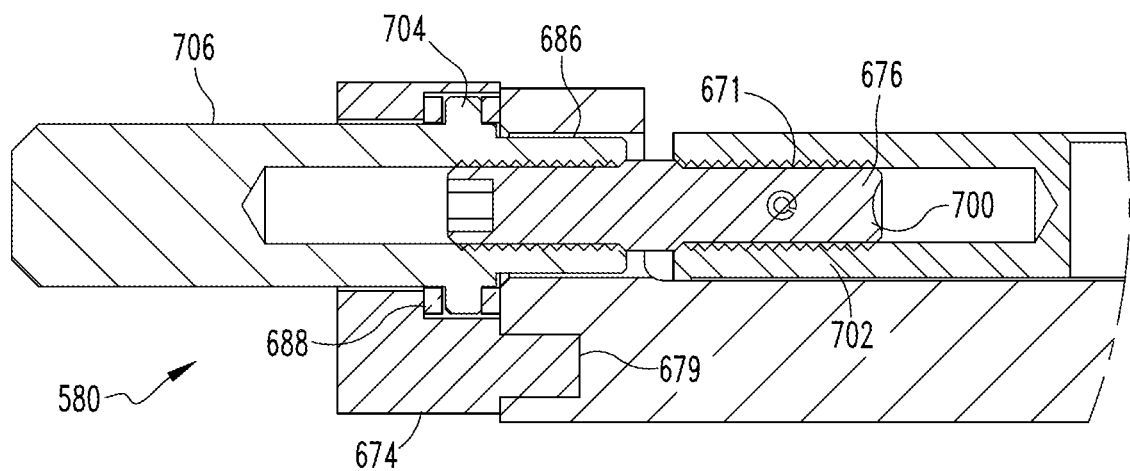
FIG. 23 is a detail cross-sectional side view of a traveling hub assembly positioning key assembly.
Figure 24:
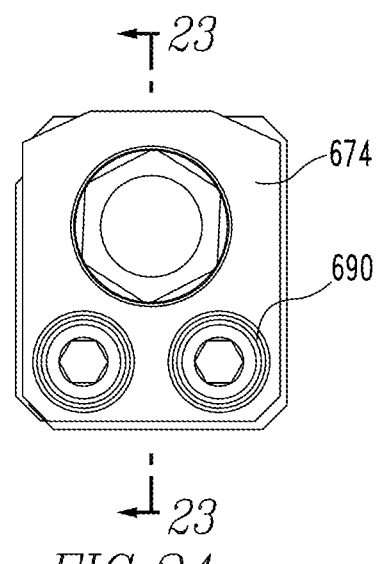
FIG. 24 is an end view of a traveling hub assembly positioning key assembly.
Figure 25:
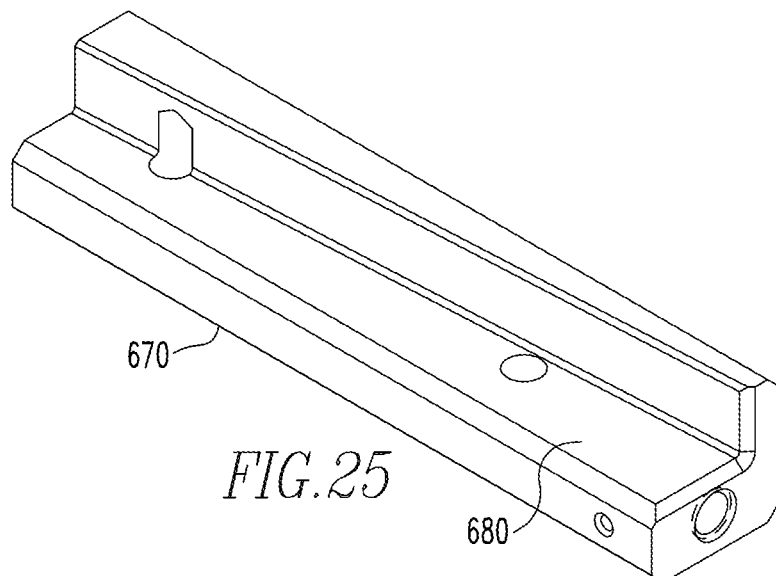
FIG. 25 is an isometric view of one traveling hub assembly positioning key assembly wedge body.
Figure 26:
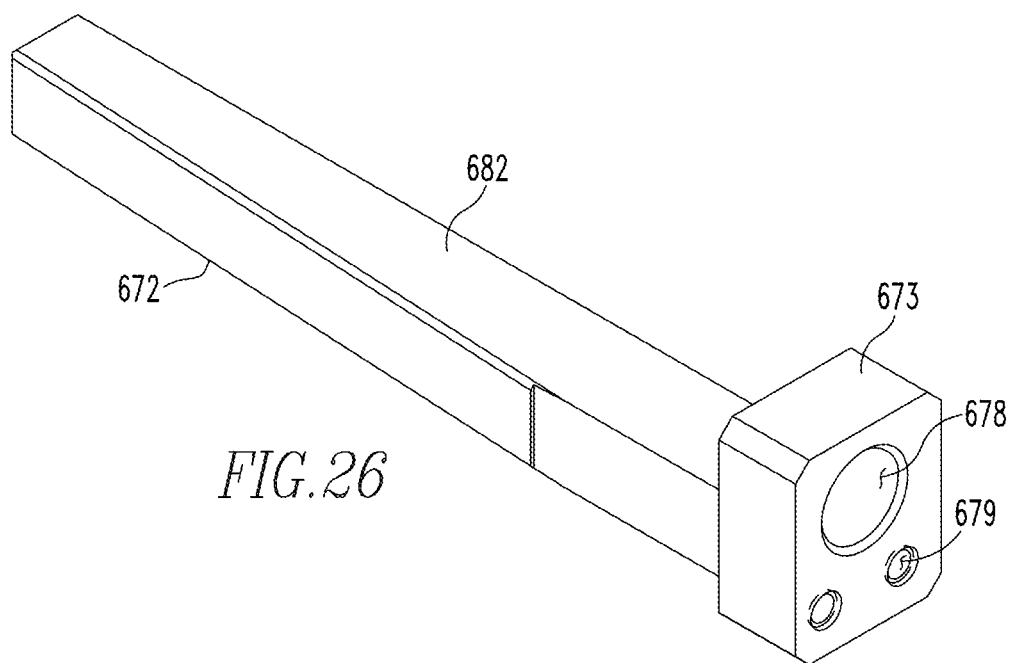
FIG. 26 is an isometric view of the other traveling hub assembly positioning key assembly wedge body.

As shown in FIGS. 17-19, the vacuum assembly vacuum housing assembly 486 includes a body 500 defining a vacuum chamber 502. In an exemplary embodiment, the vacuum assembly vacuum housing assembly body 500 includes a generally concave and generally arcuate portion 504, a movable mounting portion 506 and a front plate portion 508. The vacuum assembly vacuum housing assembly arcuate portion 504 defines an outlet passage 510. The vacuum assembly vacuum housing assembly arcuate portion outlet passage 510 is coupled, directly coupled, or fixed to the vacuum assembly telescoping vacuum conduit 484 and is in fluid communication therewith. In an exemplary embodiment, the vacuum assembly vacuum housing assembly movable mounting portion 506 is a generally planar body 516 that is coupled, directly coupled, or fixed to the vacuum assembly vacuum housing assembly arcuate portion 504. The vacuum assembly vacuum housing assembly movable mounting portion body 516 defines a rotating shaft passage 518 and two sliding mount passages 520, 522. A number of bearings 524 such as, but not limited to radial bearings 578 (hereinafter, traveling hub assembly radial bearing" 578 discussed below), are disposed about the vacuum assembly vacuum housing assembly movable mounting portion body rotating shaft passage 518 and are structured to be, and are, disposed between and coupled to both the vacuum assembly vacuum housing assembly movable mounting portion body 516 and the rotating shaft assembly rotating shaft 416.

The vacuum assembly vacuum housing, assembly front plate portion 508 includes a generally planar body 530 (or assembly of generally planar bodies) and defines an inlet passage 512 and a generally circular rotating shaft passage 532. The vacuum assembly vacuum housing assembly front plate portion planar body 530 is coupled, directly coupled, or fixed to the vacuum assembly vacuum housing assembly arcuate portion 504 and the vacuum, assembly vacuum housing assembly front plate portion inlet passage 512 is in fluid communication with the vacuum assembly vacuum housing assembly arcuate portion outlet passage 510. When coupled to the rotating shaft assembly 410, as described below, the plane of the vacuum assembly vacuum housing assembly front plate portion planar body 530 extends substantially perpendicular to the rotating shaft assembly rotating shaft 416 axis of rotation.

Further, the vacuum assembly vacuum housing assembly front plate portion 508 includes a baffle assembly 536 (hereinafter, "vacuum housing assembly baffle assembly 536"). The vacuum housing assembly baffle assembly 536 is structured to, and does, substantially obstruct fluid communication between the vacuum generator 482 and the starwheel pocket radially extending passage 470 at selected locations. That is, as described below, the vacuum starwheel 32 rotates and the starwheel pocket radially extending passage 470 moves in a circular motion about the vacuum assembly vacuum housing assembly front plate portion 508. The vacuum housing assembly baffle assembly 536 is disposed adjacent the path of travel of the starwheel pockets 34 and substantially obstruct fluid communication between the vacuum generator 482 and the starwheel pocket radially extending passage 470. This, in effect, precludes any substantial suction being applied through the starwheel pocket radially extending passage 470 adjacent the baffle assembly 536. As is known, at locations along the path of travel of the starwheel pockets 34 wherein the vacuum generator 482 is in fluid communication with the starwheel pocket radially extending passage 470, a can body 1 disposed in a starwheel pocket 34 is maintained in the starwheel pocket 34 via the suction applied to the starwheel pocket 34. At locations adjacent the vacuum housing assembly baffle assembly 536, the suction is eliminated, or substantially reduced, whereby a can body 1 disposed in a starwheel pocket 34 is not maintained in the starwheel pocket 34. That is, at the vacuum housing assembly baffle assembly 536, the can bodies 1 are released from the starwheel pocket 34 and are able to move to another vacuum starwheel 32, a non-vacuum starwheel 24, or other construct structured to support a can body 1.

The vacuum seal assembly 540 is coupled, directly coupled, or fixed to the forward face (the side away from the frame assembly 12) of the vacuum assembly vacuum housing assembly front plate portion 508. The vacuum seal assembly 540 includes a seal body 542 that is generally circular and which has about the same radius as the starwheel body assembly body sealing surface 474. In this configuration, the vacuum seal assembly body 542 is structured to, and does, sealingly engage the starwheel body assembly body sealing surface 474. As used herein, "sealingly engage" means to contact in a manner so as to resist the passage of a fluid. As noted above, the term "vacuum" means a volume with a reduced pressure relative to the atmosphere and does not require an absolute vacuum. As such, the interface of the vacuum seal assembly body 542 and the starwheel body assembly body sealing surface 474 is structured to, and does, resist the passage of air; some passage of air is, however, permitted. Accordingly, the vacuum seal assembly body 542 is not required to form a leak-proof seal and is, in an exemplary embodiment, made from a fabric such as, but not limited to felt. As felt is an inexpensive material, this solves the problems stated above.

Further, as detailed below, the vacuum seal assembly 540, i.e., the vacuum seal assembly body 542, is a "lateral scratch resistant seal" 541. In the prior art, wherein a vacuum seal is disposed adjacent the inner radial surface of a starwheel body assembly body segment peripheral pocket portion 464, removal/adjustment of the vacuum starwheel 32 caused the vacuum starwheel 32 to move longitudinally along the rotating shaft assembly rotating shaft 416 to move laterally across the seal. This could damage the seal. In the configuration disclosed above, the sealing surface of the vacuum seal assembly body 542 (the surface that seals against the starwheel body assembly 450) is an axial surface relative to the rotating shaft assembly rotating shaft 416. Thus, when the vacuum starwheel 32 is moved longitudinally along the rotating shaft assembly rotating shaft 416, the vacuum starwheel 32 moves in a direction normal to the sealing surface of the vacuum seal assembly body 542. That is, the vacuum starwheel 32 does not move across the vacuum seal assembly 540, the vacuum seal assembly body 542. As used herein, a seal that is positioned so that the element against which it seals moves in a direction normal to the sealing surface of the seal is a "lateral scratch resistant seal."

Elements of the vacuum assembly 480 are also identified herein as part of the quick-change height adjustment assembly 550 and/or the quick-change vacuum starwheel mounting assembly 800, as discussed below.

Figure 11:
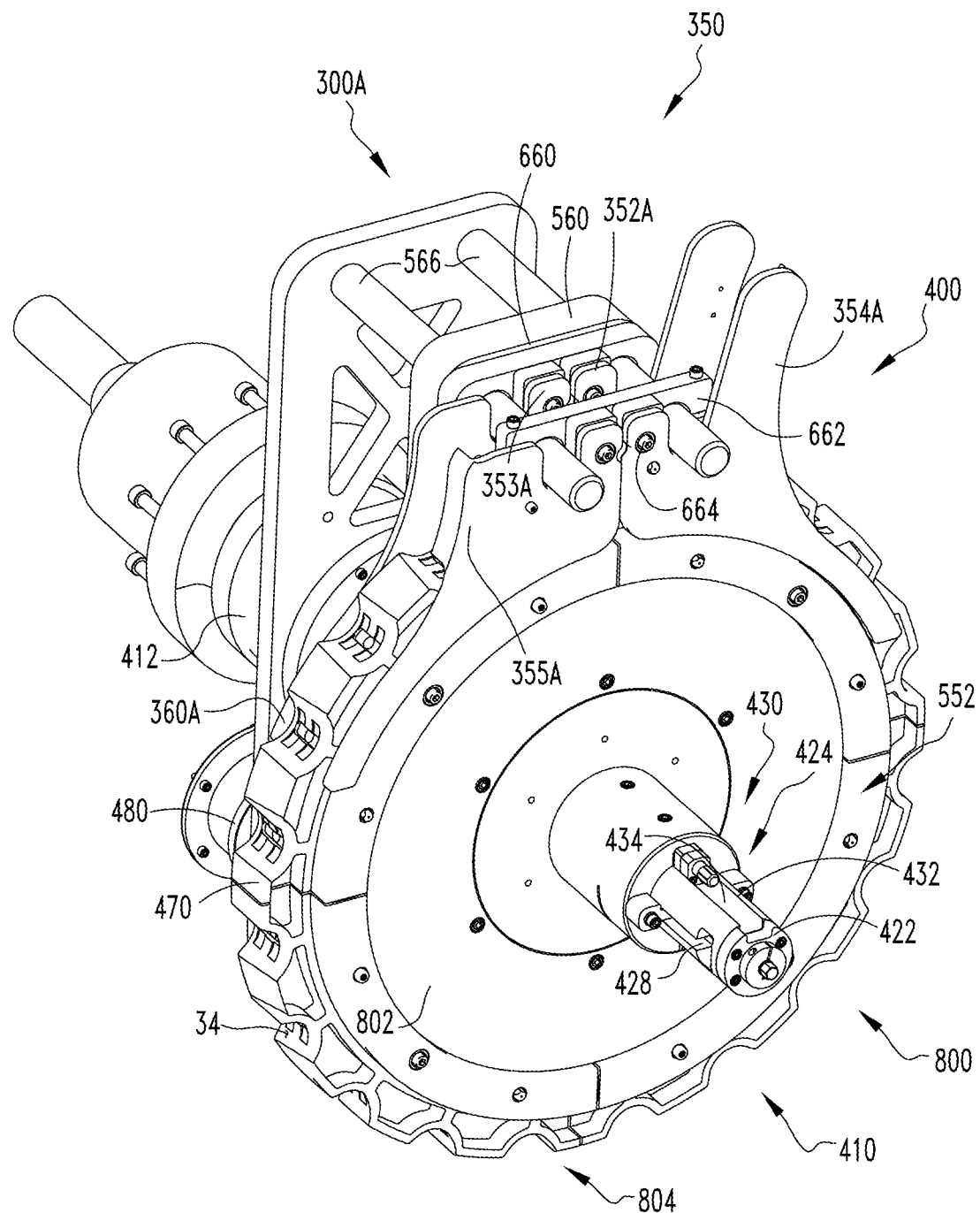
FIG. 11 is an isometric view of a quick-change vacuum starwheel assembly.
Figure 12:
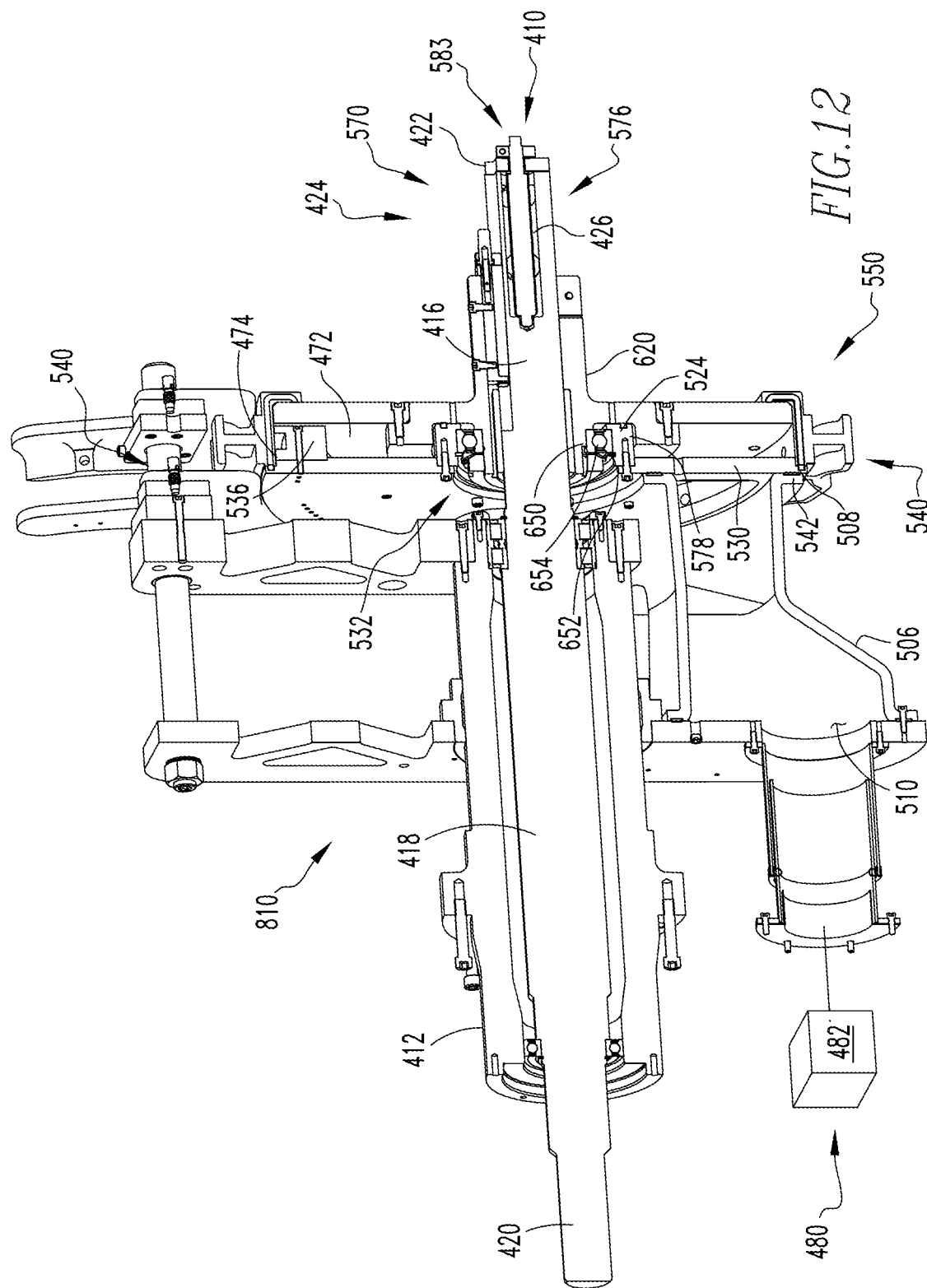
FIG. 12 is a partial cross-sectional view of a quick-change vacuum starwheel assembly.
Figure 13:
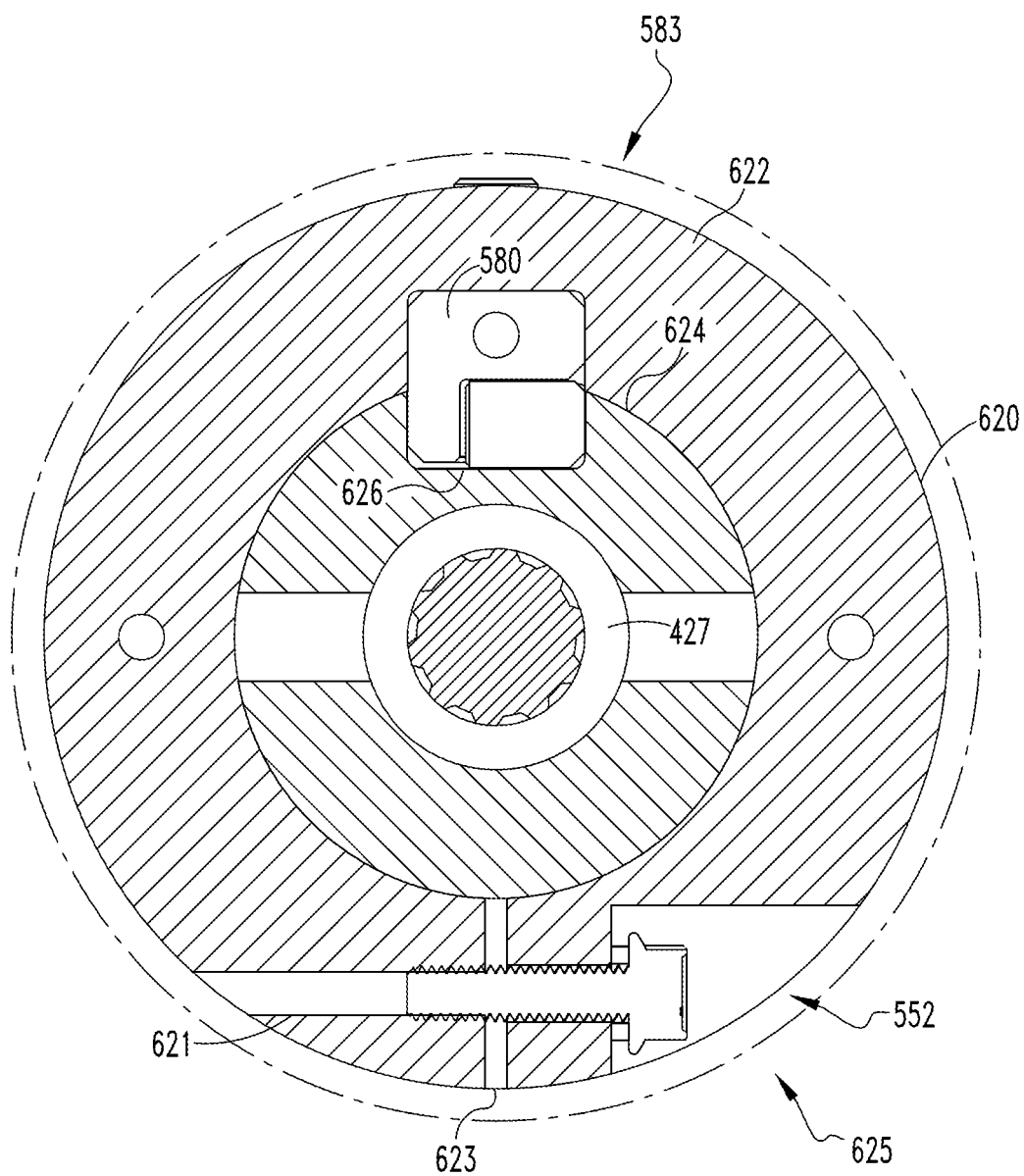
FIG. 13 is a detail, partial cross-sectional view of a traveler assembly.

As shown in FIG. 11, the quick-change vacuum starwheel assembly 400 also includes a guide assembly 300A structured to maintain a can body 1 in the pockets 34 of an associated vacuum starwheel 32 at the locations adjacent the starwheel guide assembly 300A. Similar to the starwheel guide assemblies 300 described above, a quick-change vacuum starwheel assembly guide assembly 300A includes a number of guiderails 350A (reference number 350, identifies the quick-change vacuum starwheel assembly guiderails collectively); four shown as a first inner guiderail 352A, a second inner guiderail 353A, a first outer guiderail 354A, and a second outer guiderail 355A. Each quick-change vacuum starwheel assembly guide assembly guiderails 350A includes a guide surface 360A.

Each pair of the quick-change vacuum starwheel assembly guiderails 350 includes a mounting block; an inner guiderail mounting block 660 and an outer guiderail mounting block 662. Each guiderail mounting block 660, 662 includes two retained couplings 664. The first inner guiderail 352A and second inner guiderail 353A are each coupled, directly coupled, or fixed to the inner guiderail mounting block 660 by a single retained coupling 664. The inner guiderail mounting block 660 is coupled, directly coupled, or fixed to the quick-change vacuum starwheel height adjustment assembly base assembly fixed base member 562. The first outer guiderail 354A and the second outer guiderail 355A are each coupled, directly coupled, or fixed to the outer guiderail mounting block 662 by a single retained coupling 664. The outer guiderail mounting block 662 is coupled, directly coupled, or fixed to the quick-change vacuum starwheel height adjustment assembly base assembly movable base member 564 and moves therewith. Further, the elements discussed in this paragraph are also identified as elements of the quick-change vacuum starwheel mounting assembly 800.

The quick-change vacuum starwheel assembly guide assembly 300A is also identified herein as part of the quick-change height adjustment assembly 550 and/or the quick-change vacuum starwheel mounting assembly 800, as discussed below.

As noted above, the quick-change height adjustment assembly 550 means a construct structured to move a vacuum starwheel 32 axially on an associated starwheel shaft wherein only a very limited number, or an exceedingly limited number, of retained couplings, are required to be loosened or removed so as to allow the axial movement of the starwheel. In an exemplary embodiment, the very limited number, or exceedingly limited number, of retained couplings are a very/exceedingly limited number of quick-change height adjustment assembly retained release couplings 552, discussed below.

As shown in FIGS. 17-19, in an exemplary embodiment, the quick-change height adjustment assembly 550 includes a base assembly 560 (which is also described herein as the vacuum assembly vacuum housing assembly movable mounting portion 506) and a traveling hub assembly 570. The quick-change height adjustment assembly base assembly 560 includes a fixed base member 562, a movable base member 564, and a number of elongated support members 566. The quick-change vacuum starwheel height adjustment assembly base assembly fixed base member 562 is structured to be, and is, fixed to the rotating shaft assembly housing assembly 412. The quick-change vacuum starwheel height adjustment assembly base assembly fixed base member 562 also defines two support member passages 563 that correspond to the quick-change vacuum starwheel height adjustment assembly base assembly elongated support members 566. The quick-change vacuum starwheel height adjustment assembly base assembly elongated support members 566 are movably coupled to the quick-change vacuum starwheel height adjustment assembly base assembly fixed base member 562. The quick-change vacuum starwheel height adjustment assembly base assembly elongated support members 566 extend generally horizontally.

The quick-change vacuum starwheel height adjustment assembly base assembly movable base member 564 is structured to be, and is, fixed to the quick-change vacuum starwheel height adjustment assembly base assembly elongated support members 566 and is structured to, and does, move longitudinally thereon.

The quick-change height adjustment assembly traveling hub assembly 570 (hereinafter, "traveling hub assembly 570") includes a base 572, an actuator 574, a traveler assembly 576, a radial bearing 578, and a positioning key assembly 580. The traveling hub assembly base 572 is structured to be, and is, coupled, directly coupled, or fixed to the rotating shaft assembly rotating shaft 416. That is, the traveling hub assembly base 572 rotates with the rotating shaft assembly rotating shaft 416. The traveling hub assembly base 572, as shown, includes a body 581 defining a generally circular, central opening (not shown) and a number of coupling or fastener passages. As shown, fasteners 582 extend through the traveling hub assembly base body 581 and are coupled to the threaded bores disposed on the axial surface of the rotating shaft assembly rotating shaft body distal end 422.

In an exemplary embodiment, the traveling hub assembly actuator 574 is a jackscrew 590 and has a threaded body 592 with a first end 594 and a second end 596. This single traveling hub assembly actuator, or exceedingly limited number of traveling hub assembly actuators 574, is the only actuator structured to move the quick-change height adjustment assembly 550 and associated elements on the rotating shaft assembly rotating shaft 416. The traveling hub assembly actuator body first end 594 defines a coupling such as, but not limited to, a hex-head lug 598. As is known, a hex-head lug 598 is structured to be operatively coupled to a manual actuator such as, but not limited to, a wrench. Further, the traveling hub assembly actuator body first end 594 includes a flange 600. The portion of the traveling hub assembly actuator body first end 594 between the traveling hub assembly actuator body hex-head lug 598 and the traveling hub assembly actuator body flange 600 is sized to correspond to and to be rotatably disposed in, and which is rotatably disposed in, the traveling hub assembly base 572 central opening. In this configuration, the traveling hub assembly actuator 574 is trapped in the traveling hub assembly base 572. The traveling hub assembly actuator body second end 596 defines a rotatable mounting 602 that is structured to be, and is, rotatably coupled to the traveler hub mounting central cavity rotational coupling cavity 427.

The traveling hub assembly traveler assembly 576 (hereinafter, "traveler assembly 576") includes a traveler bracket 610, a generally cylindrical traveler collar 620, and a generally disk-like traveler mounting 630. The traveling hub assembly traveler assembly traveler bracket 610 (hereinafter, "traveler bracket 610") includes a body 612 defining a threaded central passage 614 and two opposed radially extending arms 616, 617. The traveler assembly traveler bracket central passage 614 threads are structured to, and do, correspond to the threads of the traveling hub assembly actuator 574. Each of the traveler bracket body arms 616, 617 define a passage 618 for a fastener 619.

The traveler assembly collar 620 includes generally cylindrical body 622 defining a central passage 624 sized to correspond to the rotating shaft assembly rotating shaft 416 as well as a positioning key mounting 626. As shown, and in an exemplary embodiment, the traveler assembly collar is a generally hollow cylindrical body 622. The traveler assembly collar body 622 includes threaded bores (not numbered) on the front axial surface. In an exemplary embodiment, the traveler assembly collar 620 is a split body 621. That is, a "split body" means a generally hollow, cylindrical body with an axially extending, i.e., longitudinally extending, gap 623. The traveler assembly collar body 622 further includes an exceedingly limited number of retained release couplings 625 (which is one of the quick-change height adjustment assembly retained release couplings 552) extending across the traveler assembly collar body gap 623. The traveler assembly collar body retained release coupling 625 moves between two configurations, a loose, first configuration wherein the opposing sides of the traveler assembly collar body 622 are separated (and wherein the traveler assembly collar body central passage 624 loosely corresponds to the rotating shaft assembly rotating shaft 416), and, a secure/tight second configuration wherein the opposing sides of the traveler assembly collar body 622 are drawn together (and wherein the traveler assembly collar body central passage 624 snuggly corresponds to the rotating shaft assembly rotating shaft 416). Thus, when the traveler assembly collar body retained release coupling 625 is in the first configuration, the traveler assembly collar body 622 is in a corresponding first configuration wherein the traveler assembly collar body 622 is movably coupled, or not fixed, to the rotating shaft assembly rotating shaft 416, and, when the traveler assembly collar body retained release coupling 625 is in the second configuration, the traveler assembly collar body 622 is in a tight, second configuration wherein the traveler assembly collar body 622 is fixed to the rotating shaft assembly rotating shaft 416.

Figure 14:
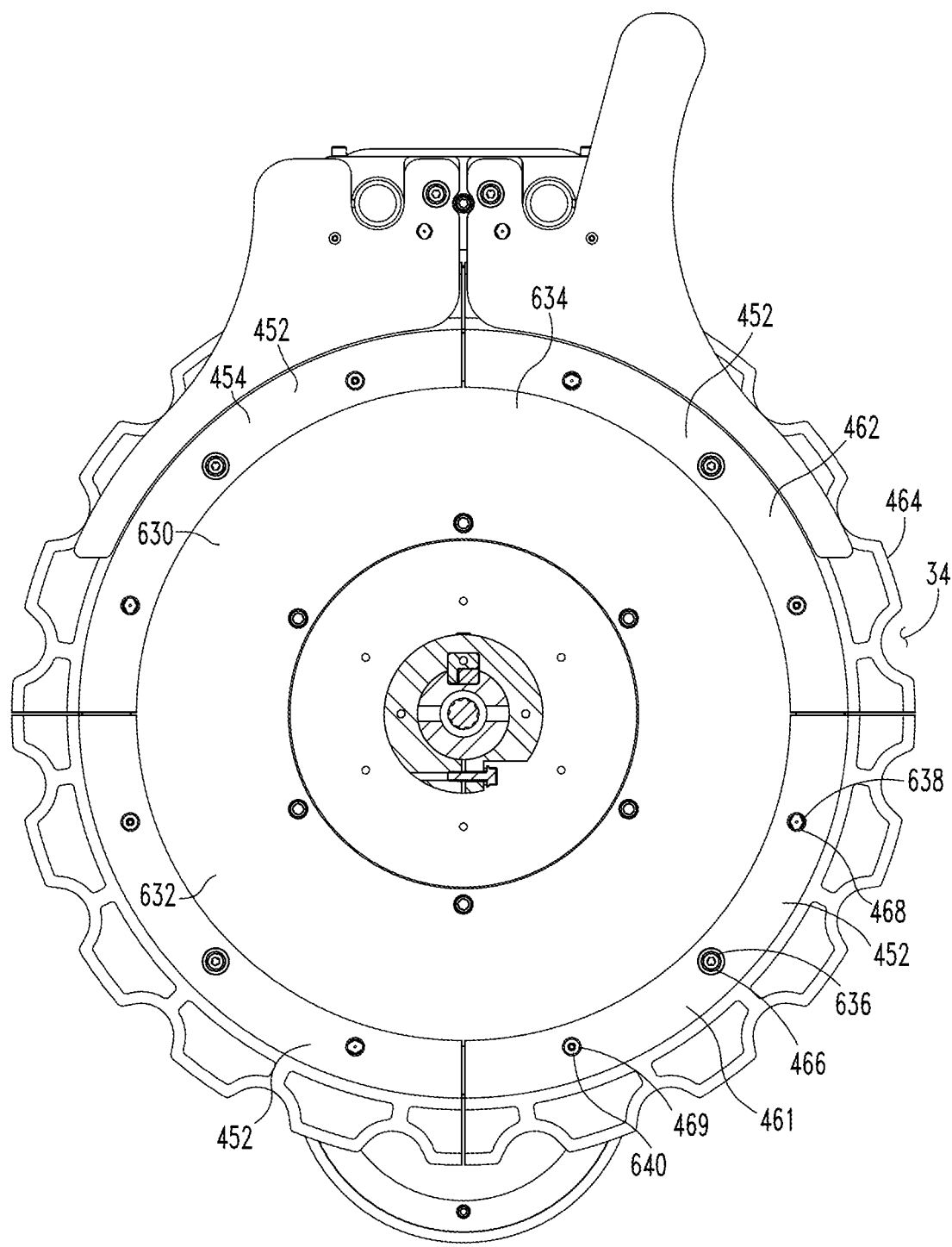
FIG. 14 is a front view of a quick-change vacuum starwheel assembly.

As shown in FIG. 14, the traveler assembly traveler mounting 630 is, in an exemplary embodiment, a generally planar disk-like body 632, or an assembly of bodies that form a disk-like body 632, disposed about, and coupled, directly coupled, or fixed to, the traveler assembly collar 620. In another embodiment, the traveler assembly collar 620 and the traveler assembly traveler mounting 630 are unitary. The traveler assembly traveler mounting body 632 includes a mounting surface 634 which, as shown, is the front surface of the traveler assembly traveler mounting body 632 (i.e., the side away from the frame assembly 12). The traveler assembly traveler mounting body mounting surface 634 includes a number of retained couplings 636 (as defined above) and a number of sets of alignment lugs (designated in the Figures as a first alignment lug 638 and a second alignment lug 640). That is, there is one group of retained couplings 636 and alignment lugs 638, 640 for each vacuum starwheel body assembly body segment 452. The traveler assembly traveler mounting body mounting surface lugs 638, 640 are not threaded or otherwise structured to couple elements and are not, as used herein, "couplings."

In an exemplary embodiment, the traveler assembly traveler mounting body mounting surface alignment lugs 638, 640 (hereinafter, "traveler assembly traveler mounting body lugs 638, 640") and the traveler assembly traveler mounting body mounting surface retained couplings 636 (hereinafter, "traveler assembly traveler mounting body retained coupling(s) 636") are disposed in a pattern corresponding to the positions of the starwheel body assembly body segment axial mounting portion passages 466, 468, 469. As shown in the Figures, and in an exemplary embodiment, the traveling hub assembly alignment lugs 638, 640 and the traveler assembly traveler mounting body retained coupling 636 are disposed in groups with one traveling hub assembly alignment lug 638, 640 disposed on each side of a traveler assembly traveler mounting body retained coupling 636. Further, the traveler assembly traveler mounting body lugs 638, 640 and the associated traveler assembly traveler mounting body retained coupling 636 are disposed along an arc. In the embodiment shown, there are four groups of a traveler assembly traveler mounting body retained coupling 636 and two traveler assembly traveler mounting body lugs 638, 640. That is, each of the four groups of a traveler assembly traveler mounting body retained coupling 636 and two traveler assembly traveler mounting, body lugs 638, 640 are structured to be, and are, coupled, directly coupled, or fixed to one of the four vacuum starwheel body assembly body segments 452. It is understood that the starwheel body assembly body segment axial mounting portion passages 466, 468, 469 are disposed in a similar pattern. That is, the starwheel body assembly body segment axial mounting portion first lug passage 468 and the starwheel body assembly body segment axial mounting portion second lug passage 469 are disposed on either side of the starwheel body assembly body segment axial mounting portion retained coupling passage 466 and along an arc.

The traveling hub assembly radial bearing 578 is structured to be, and is, coupled or fixed to both the vacuum assembly 480 and the vacuum starwheel body assembly 450. In an exemplary embodiment, shown in FIG. 12, the traveling hub assembly radial bearing 578 includes two races; an inner race 650 and an outer race 652. As is known, bearing elements 654 are movably disposed between the races 650, 652. The traveling hub assembly radial bearing inner race 650 is fixed to the vacuum assembly 480 and the traveling hub assembly radial bearing outer race 652 is fixed to the vacuum starwheel body assembly 450. More specifically, as shown, the traveling hub assembly radial bearing outer race 652 is fixed to the traveler assembly collar 620 which, as detailed below, is fixed to the vacuum starwheel body assembly 450. Thus, the traveling hub assembly radial bearing outer race 652 is also fixed to the vacuum starwheel body assembly 450.

As shown in FIGS. 21-26, the traveling hub assembly positioning key assembly 580 includes a first wedge body 670, a second wedge body 672, a retainer body 674, and an actuator 676. The traveling hub assembly positioning key assembly first wedge body 670 and traveling hub assembly positioning key assembly second wedge body 672 are movably coupled together in a configuration wherein the combined wedge bodies 670, 672 generally form a parallelepiped. That is, the combined wedge bodies 670, 672 have two generally parallel upper/lower surfaces and two generally parallel lateral surfaces. The interface between the traveling hub assembly positioning key assembly first wedge body 670 and traveling hub assembly positioning key assembly second wedge body 672 includes a number of angled surfaces 680, 682. That is, the traveling hub assembly positioning, key assembly body angled surfaces 680, 682 are not parallel to the outer surfaces.

In an exemplary embodiment, the traveling hub assembly positioning key assembly first wedge body 670 has a generally L-shaped cross-section and the traveling hub assembly positioning key assembly second wedge body 672 has a generally rectangular cross-section. The traveling hub assembly positioning key assembly second wedge body 672 is sized and shaped to correspond to the size and shape of the interior surface of the L-shaped traveling hub assembly positioning key assembly first wedge body 670. In this configuration, the traveling hub assembly positioning key assembly first wedge body 670 and traveling hub assembly positioning key assembly second wedge body 672 have two surfaces that are directly coupled to each other. As shown, at least one of these surfaces on each body are the traveling, hub assembly positioning key assembly body angled surfaces 680, 682. In this configuration, the traveling hub assembly positioning key assembly 580 includes a very limited number of operative bodies 670, 672. As used herein, an "operative body" in a positioning key means the bodies with an angled surface.

The traveling hub assembly positioning key assembly first wedge body 670 also defines a threaded actuator bore 671. The traveling hub assembly positioning key assembly second wedge body 672 further includes an offset tab 673 defining an actuator passage 678 and a number of coupling components, such as, but not limited to threaded bores 679. The traveling, hub assembly positioning key assembly retainer body 674 also defines an actuator passage 686 with a retainer plenum 688. The retainer body 674 also defines a number of fastener passages 690 that are structured to, and do, align with the traveling hub assembly positioning key assembly second wedge body threaded bores 679. The traveling, hub assembly positioning key assembly actuator 676 includes a body 700 with an elongated threaded portion 702, a radially extending flange 704, and a tool interface 706 such as, but not limited to, a six-sided lug.

The traveling hub assembly positioning key assembly 580 is, in one embodiment, assembled as follows. That is, the order in which the elements are configured is not required to be as described below, so long as the final configuration is as described below. The traveling hub assembly positioning key assembly first wedge body 670 and traveling hub assembly positioning key assembly second wedge body 672 are positioned with the traveling hub assembly positioning key assembly body angled surfaces 680, 682 in contact with each other. The traveling hub assembly positioning key assembly actuator 676 is passed through the traveling hub assembly positioning key assembly second wedge body 672 actuator passage 678 and is threaded into the traveling hub assembly positioning key assembly first wedge body actuator bore 671. The traveling hub assembly positioning key assembly actuator tool interface 706 is passed through the traveling hub assembly positioning key assembly retainer body actuator passage 686 so that the traveling hub assembly positioning key assembly retainer body 674 abuts the traveling hub assembly positioning key assembly second wedge body offset tab 673. In this configuration, the traveling hub assembly positioning key assembly retainer body 674 is coupled, directly coupled, or fixed to the traveling hub assembly positioning key assembly second wedge body 672 by fasteners extending through the traveling hub assembly positioning key assembly retainer body fastener passages 690 and into the traveling hub assembly positioning key assembly second wedge body threaded bores 679. In this configuration, the traveling hub assembly positioning key assembly actuator flange 704 is trapped in the traveling hub assembly positioning key assembly retainer body retainer plenum 688. Thus, the traveling hub assembly positioning key assembly 580 is a "unit assembly" as defined above.

Further, the traveling hub assembly positioning key assembly actuator tool interface 706 is exposed and is structured to be manipulated. That is, the traveling hub assembly positioning key assembly actuator tool interface 706 is structured to be rotated. Rotation of the traveling hub assembly positioning key assembly actuator tool interface 706 causes the traveling hub assembly positioning key assembly first wedge body 670 and traveling hub assembly positioning key assembly second wedge body 672 to move longitudinally relative to each other. Moreover, because the traveling hub assembly positioning key assembly first wedge body 670 and traveling hub assembly positioning key assembly second wedge body 672 interface at the traveling hub assembly positioning key assembly body angled surfaces 680, 682, this motion causes the traveling hub assembly positioning key assembly 580 to increase (or decrease, depending, upon the direction the traveling hub assembly positioning key assembly actuator 676 is rotated) in the cross-sectional area. That is, the traveling hub assembly positioning key assembly 580 moves between two configurations; a smaller, first configuration, wherein the cross-sectional area of the traveling hub assembly positioning key assembly 580 is relatively smaller (which, as used herein, means relative to the second configuration of the positioning key assembly), and a larger, second configuration, wherein the cross-sectional area of the traveling hub assembly positioning key assembly 580 is relatively larger (which, as used herein, means relative to the first configuration of the positioning key assembly). As described below, the positioning key assembly 580 is structured to align the vacuum starwheel body assembly 450/traveler assembly collar 620 with the rotating shaft assembly rotating shaft 416 axis of rotation. Thus, these configurations are alternately described as the positioning key assembly 580 being structured to move between a smaller, first configuration, wherein the positioning key assembly 580 does not align the vacuum starwheel body assembly 450/traveler assembly collar 620 with the rotating shaft assembly rotating shaft 416 axis of rotation, and, a larger, second configuration, wherein the positioning key assembly 580 aligns the vacuum starwheel body assembly 450/traveler assembly collar 620 with the rotating shaft assembly rotating shaft 416 axis of rotation. It is noted that the outer surfaces of the traveling hub assembly positioning key assembly 580 remain generally parallel as the traveling hub assembly positioning key assembly first wedge body 670 and traveling hub assembly positioning key assembly second wedge body 672 move relative to each other.

The quick-change vacuum starwheel assembly 400 is in one embodiment, assembled as follows. That is, the order in which the elements are configured is not required to be as described below, so long as the final configuration is as described below. It is understood that the quick-change vacuum starwheel assembly 400 is coupled to a processing station 20 with the rotating shaft assembly housing assembly 412 coupled, directly coupled, or fixed to the frame assembly 12. The rotating shaft assembly rotating shaft 416 extends through the rotating shaft assembly housing assembly 412. As noted above, the rotating shaft assembly rotating shaft 416 is operatively coupled to the drive assembly 2000 and is structured to, and does, rotate. The quick-change vacuum starwheel height adjustment assembly base assembly fixed base member 562 is fixed to the rotating shaft assembly housing assembly 412. The first inner guiderail 352A and the second inner guiderail 353A are coupled, directly coupled, or fixed to the quick-change vacuum starwheel height adjustment assembly base assembly fixed base member 562 by a single retained coupling 664.

The rotating shaft assembly housing assembly 412, the rotating shaft assembly rotating shaft 416, the quick-change vacuum starwheel height adjustment assembly base assembly fixed base member 562, the first inner guiderail 352, and the second inner guiderail 353A are structured to remain in the same position relative to the frame assembly 12. That is, other than rotating about the axis of rotation, the rotating shaft assembly rotating shaft 416 does not move relative to the frame assembly 12.

The quick-change vacuum starwheel height adjustment assembly base assembly elongated support members 566 are movably coupled to the quick-change vacuum starwheel height adjustment assembly base assembly fixed base member 562. That is, the quick-change vacuum starwheel height adjustment assembly base assembly elongated support members 566 are slidably disposed in the quick-change vacuum starwheel height adjustment assembly base assembly fixed base member support member passages 563. The quick-change vacuum starwheel height adjustment assembly base assembly movable base member 564 is fixed to the quick-change vacuum starwheel height adjustment assembly base assembly elongated support members 566 and move therewith. The vacuum assembly telescoping vacuum conduit 484 is coupled to the quick-change vacuum starwheel height adjustment assembly base assembly movable base member 564 and extends and retracts telescopically therewith.

The vacuum assembly vacuum housing assembly 486 is also coupled, directly coupled, or fixed to the quick-change vacuum starwheel height adjustment assembly base assembly movable base member 564 with the rotating shaft assembly rotating shaft 416 extending through the vacuum assembly vacuum housing assembly movable mounting portion body rotating shaft passage 518. The traveling hub assembly radial bearing 578 is coupled, directly coupled, or fixed to the vacuum assembly vacuum housing assembly 486 and extends about the rotating shaft assembly rotating shaft 416. That is, the traveling hub assembly radial bearing 578 separates the vacuum assembly vacuum housing assembly 486 and the rotating shaft assembly rotating shaft 416.

The traveler assembly 576 is assembled with the traveler assembly traveler mounting 630 fixed to the traveler assembly collar 620. As noted above, in the embodiment shown, wherein there are four starwheel body assembly body segments 452, the traveler assembly traveler mounting 630 includes four groups of a traveler assembly traveler mounting body retained coupling 636 and two traveler assembly traveler mounting body lugs 638, 640. The traveler assembly traveler mounting 630 is fixed to the traveler assembly collar 620. As rioted above, the traveler assembly traveler mounting 630 and the traveler assembly collar 620 are, in one embodiment, coupled by fasteners, or, in another embodiment, are a unitary body. Thus, the traveler assembly traveler mounting 630 is structured to, and does, rotate with the traveler assembly collar 620.

The traveling hub assembly 570 is coupled and, as discussed below, fixed to the rotating shaft assembly rotating shaft distal end 422. That is, as noted above, the traveling hub assembly radial bearings 578 are disposed about the rotating shaft assembly rotating shaft 416. The traveler assembly collar 620 is also disposed about the rotating shaft assembly rotating shaft 416 and the traveling hub assembly radial bearings 578 are coupled, directly coupled, or fixed to the traveler assembly collar 620. That is, the traveler assembly collar body retained release coupling 625 is disposed in the first position and the traveler assembly collar body 622 is moved over the rotating shaft assembly rotating shaft 416 until the traveler assembly collar body 622 is disposed immediately adjacent to the traveling hub assembly radial bearing 578. The traveler assembly collar body 622 and the traveling hub assembly radial bearing 578 are fixed together. The traveler assembly collar body retained release coupling 625 is moved to the second position wherein the traveler assembly collar body 622 is fixed to the rotating shaft assembly rotating shaft 416. The traveler assembly collar body 622 is oriented so that the four groups of a traveler assembly traveler mounting body retained coupling 636 and two traveler assembly traveler mounting body lugs 638, 640 are disposed on the front surface of traveler assembly traveler mounting body 632, i.e., the surface disposed away from the frame assembly 12.

The traveling hub assembly actuator 574 and the traveler bracket 610 are operatively coupled with the traveling hub assembly actuator 574 disposed through, and threadably coupled to, the traveler assembly traveler bracket central passage 614. The traveling hub assembly actuator 574 is disposed in the traveler hub mounting central cavity 426 with the traveler bracket body arms 616, 617 each disposed in separate traveler hub mounting slots 428, 430. Further, the traveling hub assembly actuator body second end rotatable mounting 602 is rotatably coupled to the traveler hub mounting central cavity rotational coupling cavity 427. The traveler bracket 610 is coupled, directly coupled, or fixed to the traveler assembly collar 620 by fasteners 619 extending through each of the traveler bracket body arm passages 618 and into the threaded bores on the front axial surface of the traveler assembly collar body 622. In this configuration, the traveler bracket 610 is fixed to the traveler assembly collar body 622.

The traveling hub assembly base 572 is fixed to the rotating shaft assembly rotating shaft body distal end 422 with the traveling hub assembly actuator body first end 594, the hex-head lug 598, extending through the traveling hub assembly base body central opening. That is, fasteners 532 extending through the traveling hub assembly base body 581 are coupled to the threaded bores disposed on the axial surface of the rotating shaft assembly rotating shaft body distal end 422. In this configuration, the traveling hub assembly base 572 is fixed to the rotating shaft assembly rotating shaft body 418.

Further, the traveling hub assembly positioning key assembly 580, and more specifically the traveling hub assembly positioning key assembly first wedge body 670, is fixed to the traveler assembly collar body positioning key mounting 626. In this configuration, the traveling hub assembly positioning key assembly 580 is, as used herein, a retained coupling and/or a retained release coupling. Moreover, the positioning key assembly 580 is one of the quick-change height adjustment assembly retained release couplings 552. In this configuration, the traveling hub assembly positioning key assembly 580 is disposed between the rotating shaft assembly positioning key mounting 432 and the traveler assembly collar body positioning key mounting 626. Stated alternately, when the rotating shaft assembly positioning key mounting 432 and the traveler assembly collar body positioning key mounting 626 are aligned and disposed generally opposite each other, the rotating shaft assembly positioning key mounting 432 and the traveler assembly collar body positioning key mounting 626 define, as used herein, a "quick-change vacuum starwheel assembly positioning key cavity" 583. The traveling hub assembly positioning key assembly 580 is structured to correspond to the quick-change vacuum starwheel assembly positioning key cavity 583. That is, in the first configuration, the traveling hub assembly positioning key assembly 580 loosely fits within the quick-change vacuum starwheel assembly positioning key cavity 583. When the traveling hub assembly positioning key assembly 580 is in the second configuration, i.e., the configuration with the greater cross-sectional area, the traveling hub assembly positioning key assembly 580 moves the traveler assembly collar 620 into alignment with the rotating shaft assembly rotating shaft 416 axis of rotation. That is, as the traveling hub assembly positioning key assembly 580 moves into the second configuration, i.e., as the cross-sectional area of the quick-change vacuum starwheel assembly positioning key assembly 580 increases, the quick-change vacuum starwheel assembly positioning key assembly 580 operatively engages the rotating shaft assembly rotating shaft 416 and the traveler assembly collar 620 and moves these elements into alignment with each other. As used in this context, "into alignment" means that the axis of rotation for the rotating shaft assembly rotating shaft 416 and the traveler assembly collar 620 are substantially aligned, coextensive with each other.

The vacuum starwheel body assembly body segments 452 are coupled, directly coupled, or fixed to the traveler assembly traveler mounting 630. That is, each vacuum starwheel body assembly body segment 452 is coupled to the traveler assembly traveler mounting 630 by coupling the starwheel body assembly body segment axial mounting portion passages 466, 468, 469 with their associated traveler assembly traveler mounting body retained coupling 636 and alignment lugs 638, 640. It is noted that each starwheel body assembly body segment 452 is coupled to the traveler assembly traveler mounting 630 by a single retained traveler assembly traveler mounting body retained coupling 636.

In this configuration, the starwheel body assembly body sealing surface 474 sealingly engages the vacuum seal assembly body 542. Thus, the starwheel body cavity 472 is substantially sealed and resists the flow of air through openings other than the starwheel body assembly body segment peripheral pocket passages 470. Further, in this configuration, the vacuum assembly 480 is in fluid communication with the non-baffled starwheel body assembly body segment peripheral pocket passages 470.

Further, as noted above, the first inner guiderail 352, and second inner guiderail 353A are each coupled, directly coupled, or fixed to the inner guiderail mounting block 660 by a single retained coupling 664. The inner guiderail mounting block 660 is coupled, directly coupled, or fixed to the quick-change vacuum starwheel height adjustment assembly base assembly fixed base member 562. The first outer guiderail 354A and the second outer guiderail 355A are each coupled, directly coupled, or fixed to the outer guiderail mounting block 662 by a single retained coupling 664. The outer guiderail mounting block 662 is coupled, directly coupled, or fixed to the quick-change vacuum starwheel height adjustment assembly base assembly movable base member 564 and moves therewith. It is understood that the quick-change, vacuum starwheel assembly guide assembly guiderails 350A are positioned and oriented so that the guide surfaces 360A are disposed a guiding distance from the associated starwheel 32. That is, the inner and outer guiderail mounting blocks 660, 662 include an orientation lug (not shown) that is structured to be, and is, coupled to an orientation notch (not shown) on, the inner guiderail 352 and/or the outer guiderail 354. The orienting lug and the orientation notch are structured to, and do, position the guiderail guide surfaces 360 at a guiding distance relative to a can body 1.

In this configuration, the rotating shaft assembly housing assembly 412, the quick-change vacuum starwheel height adjustment assembly base assembly fixed base member 562, the first inner guiderail 352A and the second inner guiderail 353A are structured to remain in the same position relative to the frame assembly 12. Further, with the traveling hub assembly positioning key assembly 580 in the second configuration and the traveler assembly collar body retained release coupling 625 in the second configuration, the traveling hub assembly 570 and the vacuum starwheel body assembly 450 are fixed to the rotating shaft assembly rotating shaft 416 and rotates therewith. Further, the vacuum assembly 480 is in fluid communication with the starwheel body cavity 472. This is the operational configuration for the quick-change vacuum starwheel assembly 400.

To adjust the quick-change vacuum starwheel assembly 400 for can bodies having different heights, only two couplings need to be actuated; the traveling hub assembly positioning key assembly 580 and the traveler assembly collar body retained release coupling 625. That is, when the traveling hub assembly positioning key assembly 580 is moved to the first configuration, the bias created by the positioning key assembly 580 being in the second configuration is reduced. When the traveler assembly collar body retained release coupling 625 is in the first position, the traveler assembly collar 620 is no longer fixed to the rotating shaft assembly rotating shaft 416. Thus, the traveler assembly collar 620, as well as all elements fixed thereto, are free to move longitudinally along the rotating shaft assembly rotating shaft 416. Thus, the disclosed configuration is a quick-change height adjustment assembly 550 as defined above.

The elements fixed to the traveler assembly collar 620 include: the traveler assembly traveler mounting 630, the vacuum starwheel body assembly 450 (which is fixed to the traveler assembly traveler mounting 630), the traveling hub assembly radial bearing 578 (which is fixed to the traveler assembly collar 620 and the vacuum assembly 480), the vacuum assembly 480, the quick-change vacuum starwheel height adjustment assembly base assembly movable base member 564 (which is fixed to the vacuum assembly 480), the quick-change vacuum starwheel height adjustment assembly base assembly elongated support members 566 (which are fixed to the quick-change vacuum starwheel height adjustment assembly base assembly movable base member 564), and the outer guiderail mounting block 662 with the first outer guiderail 354A and the second outer guiderail 355A (which are fixed to the quick-change vacuum starwheel height adjustment assembly base assembly movable base member 564). It is understood that the vacuum assembly telescoping vacuum conduit 484 allows the other vacuum assembly 480 components to move relative to the vacuum generator 482.

Movement of the traveler assembly collar 620, and elements fixed thereto, is accomplished by rotating the traveling hub assembly actuator 574. In an exemplary embodiment, a tool (not shown) is operatively coupled to the traveling hub assembly actuator body first end hex-head lug 598. The traveling hub assembly actuator 574 is then rotated. As the traveling hub assembly actuator body first end 594 is in a fixed location relative to the rotating shaft assembly rotating shaft distal end 422, and because the traveling hub assembly actuator 574 is threadably coupled to the traveler assembly traveler bracket central passage 614, rotation of the traveling hub assembly actuator 574 causes the traveler bracket 610 to move along the rotating shaft assembly rotating shaft 416 axis of rotation. Because the traveler bracket 610 is fixed to the traveler assembly collar 620, the traveler assembly collar 620 and elements fixed thereto, also move along the rotating shaft assembly rotating shaft 416 axis of rotation. Stated alternately, actuation of the traveling, hub assembly actuator 574 moves the vacuum starwheel body assembly 450 and the vacuum assembly 480 between a first longitudinal position on the rotating shaft assembly rotating shaft 416 and a second longitudinal position on the rotating shaft assembly rotating shaft 416. Stated in a further alternate form, the quick-change vacuum starwheel height adjustment assembly 550 is structured to be, and is, actuated after only the two retained release couplings 552 are configured in a first configuration. Thus, the position of the vacuum starwheel body assembly 450 is adjusted to accommodate can bodies of a different height. Further, the disclosed quick-change vacuum starwheel height adjustment assembly 550 is structured to, and does, allow the starwheel 32 to move between two configurations, a first configuration for a can body 1 of a first height and a second configuration for a can body 1 of a second height, without the use of a spacer. Further, the disclosed quick-change vacuum starwheel height adjustment assembly 550 is structured to, and does, allow the vacuum starwheel 32 to move between two configurations, a first configuration for a can body 1 of a first height and a second configuration for a can body 1 of a second height, without altering the configuration of the vacuum starwheel 32. That is, the quick-change vacuum starwheel height adjustment assembly 550 is structured to, and does, move relative to a fixed location, such as, but not limited to, the frame assembly 12, but the vacuum starwheel body assembly 450 does not change configuration.

The quick-change vacuum starwheel mounting assembly 800 is structured to allow a first vacuum starwheel 32 to be swapped for a second vacuum starwheel 32 having different characteristics. Generally, the different characteristics will be pockets 34 having a different radius, but vacuum starwheels 32 are swapped out for other reasons as well. It is understood that to swap vacuum starwheels 32 the first vacuum starwheel 32 and the components associated with a starwheel of that size must be removed and replaced. Moreover, as noted above, a "quick-change vacuum starwheel mounting assembly" 800 means a mounting assembly structured to couple, directly couple, or fix the separable vacuum starwheel components to a rotating shaft via one of a limited number of couplings, a significantly limited number of couplings, a very limited number of couplings, or an exceedingly limited number of couplings. The "separable vacuum starwheel components," as used herein, are the individual elements of vacuum starwheel 32 (also identified as the vacuum starwheel body assembly 450) which are identified herein as the separate vacuum starwheel body assembly body segments 452 as well as the quick-change vacuum starwheel assembly guide assembly 300A associated with a vacuum starwheel 32 of a specific size which are identified herein as the first inner guiderail 352A, the second inner guiderail 353A, the first outer guiderail 354A, and the second outer guiderail 355A. These elements have been described above.

As shown in FIG. 11, the quick-change vacuum starwheel mounting assembly 800 includes a number of separable vacuum starwheel components 802 (identified above and collectively by reference number 810) and one of a limited number of retained couplings 804, a significantly limited number of retained couplings 804, a very limited number of retained couplings 804, or an exceedingly limited number of retained couplings 804 (discussed above and collectively by reference number 804) as well as the construct(s) to which the retained couplings 804 are coupled (discussed below). Each quick-change vacuum starwheel mounting assembly separable vacuum starwheel component 802 (hereinafter, "separable vacuum starwheel component(s)" 802) is coupled, directly coupled, or fixed to the rotating shaft assembly housing assembly 412 (or any fixed location on a processing station 20 or the transfer assembly 30) by one of a significantly limited number of retained couplings 804, a very limited number of retained couplings 804 or an exceedingly limited number of retained couplings 804.

In an exemplary embodiment, and as discussed above, the vacuum starwheel body assembly 450 includes a number of vacuum starwheel body assembly body segments 452. Each vacuum starwheel body assembly body segment 452 is removed when exchanging a vacuum starwheel body assembly 450, so each vacuum starwheel body assembly body segment 452 is also a "separable vacuum starwheel component" 802. Each vacuum starwheel body assembly body segment 452 is structured to be, and is, coupled to the traveler assembly traveler mounting 630. As discussed above, each vacuum starwheel body assembly body segment 452 includes a group of a single, or an exceedingly limited number of, retained coupling passage 466, a first lug passage 468, and a second lug passage 469 disposed along an arc. Thus, for each vacuum starwheel body assembly body segment 452 to be coupled to the traveler assembly traveler mounting 630, the traveler assembly traveler mounting 630 includes a group including a traveler assembly traveler mounting body retained coupling 636, a first alignment lug 638 and a second alignment lug 640 disposed along, an arc corresponding to the starwheel body assembly body segment axial mounting portion passages 466, 468, 469. Thus, each vacuum starwheel body assembly body segment 452 is coupled to the traveler assembly traveler mounting 630 by an exceedingly limited number of traveler assembly traveler mounting body retained couplings 636.

As defined above, the quick-change vacuum starwheel assembly guiderails 350 are included as "separable vacuum starwheel components 802." That is, each quick-change vacuum starwheel assembly guiderail 350 has a guide surface 360A that is structured to be, and is, disposed a guiding distance from a vacuum starwheel body assembly 450 of a specific size. Thus, when the vacuum starwheel body assembly 450 is exchanged, the quick-change vacuum starwheel assembly guiderails 350 are exchanged as well. As discussed above, the quick-change vacuum starwheel assembly guide assembly 300A includes a number of guiderails 350A. Each guiderail 350A is coupled (via a number of other elements) to the rotating shaft assembly housing assembly 412. That is, the quick-change vacuum starwheel assembly guiderails 350 include an inner guiderail mounting block 660 and an outer guiderail mounting block 662. The inner guiderail mounting block 660 and the outer guiderail mounting block 662 are coupled (via a number of other elements) to the rotating shaft assembly housing assembly 412. Each guiderail 350A is coupled to one of the guiderail mounting blocks 660, 662 by an exceedingly limited number of retained couplings 664.

Generally, each processing station 20 is structured to partially form the can body 1 so as to reduce the cross-sectional area of the can body first end 6. The processing stations 20 include some elements that are unique to a single processing station 20, such as, but not limited to, a specific die. Other elements of the processing stations 20 are common to all, or most, of the processing stations 20. The following discussion is related to the common elements and, as such, the discussion is directed to a single generic processing (forming) station 20 (hereinafter, a "forming station" 20'). It is understood, however, that any processing station 20 can include the elements discussed below.

Figure 27:
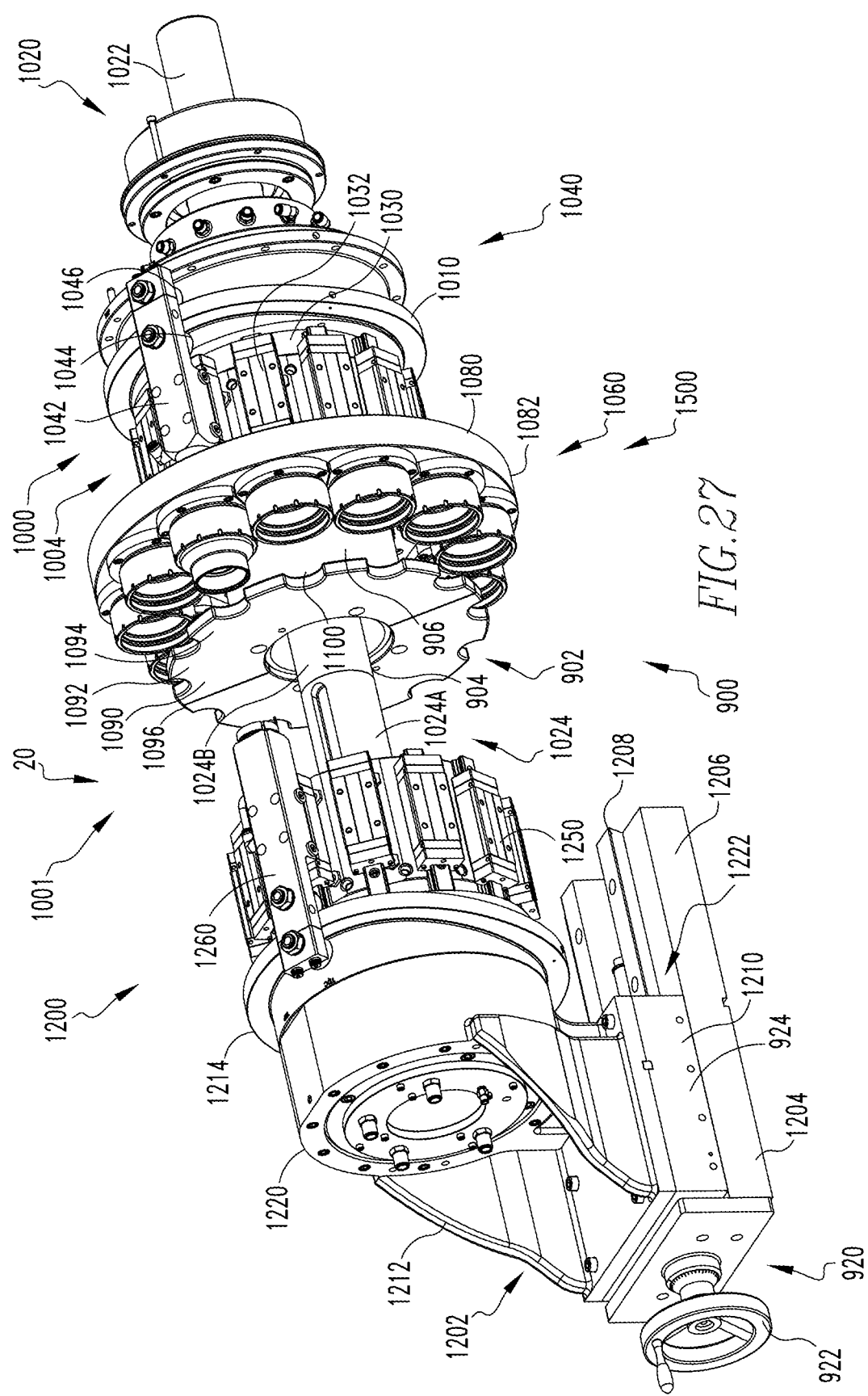
FIG. 27 is an isometric view of a forming station.

As shown in FIG. 27, each forming station 20' includes a quick-change assembly 900, an inboard turret assembly 1000 and an outboard turret assembly 1200. Further, as is known, elements of the inboard turret assembly 1000 and the outboard turret assembly 1200 are generally separated by a gap 1001 and the can bodies 1 move in between the inboard turret assembly 1000 and the outboard turret assembly 1200, i.e., in the gap 1001. The quick-change assembly 900 is structured to, and does, couple selected elements of the inboard turret assembly 1000 and the outboard turret assembly 1200 to at least one of the frame assembly, the inboard turret assembly or the outboard turret assembly by one of a limited number of couplings, a significantly limited number of couplings, a very limited number of couplings, or an exceedingly limited number of couplings.

That is, the forming station quick-change assembly 900 is structured to, and does, allow for rapid replacement of elements in a forming station 20'. As used herein, a "forming station quick-change assembly 900" includes, for a number of elements (or sub-components) coupled to the forming station 20', couplings having one of a limited number of retained couplings, a significantly limited number of retained couplings, a very limited number of retained couplings, an exceedingly limited number of retained couplings, and/or, a limited number of retained release couplings, a significantly limited number of release couplings, a very limited number of retained release couplings, and/or an exceedingly limited number of retained release couplings. The elements of the forming station quick-change assembly 900 are discussed below.

Generally, the inboard turret assembly 1000 includes a frame assembly 12 (which is part of the larger frame assembly 12, discussed above), a number of fixed elements 1002 and a number of movable elements 1004. The inboard turret assembly fixed elements 1002 are coupled, directly coupled, or fixed to the frame assembly 12 and generally do not move relative thereto. The fixed elements include a cam ring 1010. The inboard turret assembly movable elements 1004 include a vacuum starwheel 32 (as discussed above) and an elongated process shaft assembly 1020 that is rotatably coupled to the frame assembly 12. The vacuum starwheel 32 is generally disposed at the gap 1001. Other known elements of the inboard turret assembly 1000 are known but are not relevant to this discussion. The inboard turret assembly cam ring 1010 (as well as the outboard turret assembly cam ring) is generally circular with an offset portion that is offset toward the gap 1001.

The inboard turret assembly process shaft assembly 1020 (hereinafter, the "process shaft assembly 1020") includes an elongated shaft 1022 (also identified herein as "process shaft assembly body" 1022). The process shaft assembly shaft 1022 is, in one embodiment, a unitary body (not shown), or, in another embodiment an assembly of shaft segments 1024A, 1024B, etc. It is understood that the shaft segments 1024A, 1024B are fixed together and rotate as a single body 1024. The process shaft assembly shaft 1022 is operatively coupled to the drive assembly 2000 and is structured to, and does, rotate relative to the frame assembly 12. As discussed below, the outboard turret assembly 1200 also includes a number of rotating elements, i.e., the outboard turret assembly upper portion pusher assemblies 1260, discussed below. The outboard turret assembly 1200 rotating elements are coupled, directly coupled, or fixed to the process shaft assembly 1020 and rotate therewith.

In an exemplary embodiment, the process shaft assembly 1020 includes a knockout ram mounting 1030, a plurality of knockout ram assemblies 1040, a number of die assemblies 1060, a die assembly support 1080, and a starwheel assembly 1090. The starwheel assembly 1090 is not a vacuum starwheel 32 as discussed above, but rather a guide starwheel 1092 that includes a generally planar, generally toroid body assembly 1094 including a number of segments 1096 (two shown, each extending over an arc of about) 180°. As is known, the radial surface of the guide starwheel body assembly 1094 defines a number of pockets 1100 sized to generally correspond to the radius of a can body 1. It is understood that for can bodies having different radii, different guide starwheels 1092 are needed.

The forming station quick-change assembly 900 includes a starwheel mounting 902 and a number of starwheel retained couplings 904. The forming station quick-change assembly starwheel mounting 902 includes a toroid body 906 that is coupled, directly coupled, or fixed to the process shaft assembly shaft 1022. The starwheel retained couplings 904 are coupled to the exposed (away from the frame assembly 12) axial surface of the forming station quick-change assembly starwheel mounting 902. In an exemplary embodiment, there is one of a very limited number of starwheel retained couplings 904 or an exceedingly limited number of starwheel retained couplings 904 associated with each guide starwheel body assembly segment 1096. It is understood that each guide starwheel body assembly segment 1096 includes a number of passages 1098 disposed in a pattern corresponding to the pattern of starwheel retained couplings 904. In an exemplary embodiment, wherein each guide starwheel body assembly segment 1096 includes an exceedingly limited number of passages 1098, there are also a number of lug passages (which are not couplings as used herein) (not shown). In this embodiment, not shown, the forming station quick-change assembly starwheel mounting 902 includes a number of lugs (not shown) on the exposed (away from the frame assembly 12) axial surface of the forming station quick-change assembly starwheel mounting 902. Thus, each guide starwheel body assembly segment 1096 is coupled to the forming station quick-change assembly starwheel mounting 902. Moreover, when the necker machine 10 needs to be changed to accommodate can bodies with a different radii, the guide starwheel body assembly 1094 is swapped using the forming station quick-change assembly 900 elements discussed herein. This solves the problem stated above.

The outboard turret assembly 1200 includes an upper portion 1202 and a lower portion 1204. The outboard turret assembly lower portion 1204 includes a base 1206 that is disposed in a fixed location relative to the inboard turret assembly 1000. That is, the outboard turret assembly lower portion 1204 is fixed to the frame assembly 12, or, fixed to a substrate (not numbered). In this configuration, the outboard turret assembly lower portion 1204 is structured to not move, and does not move, relative to the inboard turret assembly 1000. The outboard turret assembly lower portion base 1206 includes a number of guide elements which are, as shown, elongated, substantially straight rails 1208.

The outboard turret assembly upper portion 1202 includes a base assembly 1210, a support assembly 1212, a cam ring 1214, and pusher assembly 1260. The outboard turret assembly upper portion base assembly 1210, the outboard turret assembly upper portion support assembly 1212, and the outboard turret assembly upper portion cam ring 1214 are, in an exemplary embodiment, coupled, directly coupled, or fixed to each other and do not move relative to each other. The outboard turret assembly upper portion base assembly 1210 includes a housing 1220 including a number of guide followers which are, as shown, rail passages 1222.

The outboard turret assembly upper portion 1202 is movably coupled to the outboard turret assembly lower portion base 1206. That is, the outboard turret assembly upper portion base assembly housing rail passages 1222 are disposed over the outboard turret assembly lower portion base rails 1208. Further, as noted above, the process shaft assembly shaft 1022 extends into, or through, the outboard turret assembly upper portion pusher assembly 1260 and is movably coupled thereto. Thus, the outboard turret assembly upper portion pusher assembly 1260 is structured to, and does, rotate with the process shaft assembly shaft 1022.

In this configuration, the outboard turret assembly upper portion 1202 is structured to, and does, move axially, i.e., longitudinally, over the process shaft assembly shaft 1022. That is, the outboard turret assembly upper portion 1202 is structured to, and does, move between a first position, wherein the outboard turret assembly upper portion 1202 is disposed closer to the inboard turret assembly 1000 (closer being, a relative term that is relative to the second position), and a second position, wherein the outboard turret assembly upper portion 1202 is disposed further from the inboard turret assembly 1000 (further being a relative term that is relative to the first position). It is understood that this motion allows the forming station 20' to be configured to process can bodies 1 of different heights. That is, for relatively short can bodies, the outboard turret assembly upper portion 1202 is in the first position and for relatively longer can bodies, the outboard turret assembly upper portion 1202 is in the second position.

The forming station quick-change assembly 900 includes a "single point movement assembly" 920 that is structured to, and does, move the outboard turret assembly upper portion 1202 between the first and second positions. As used herein, a "single point movement assembly" 920 is a construct having a single actuator for a movement assembly, or, a single actuator for a movement assembly and a single actuator for a locking assembly. The single point movement assembly 920 is disposed at the outboard turret assembly 1200. In an exemplary embodiment, the single point movement assembly 920 includes a jackscrew (not shown) having a rotary actuator 922, a jackscrew retainer (not shown), a locking assembly (generally not shown) with a single locking assembly actuator 924. The jackscrew retainer is a threaded collar that is structured to, and does, operatively engage the jackscrew threads. The jackscrew retainer is coupled, directly coupled, or fixed to the outboard turret assembly upper portion 1202. The jackscrew is rotatably coupled to the outboard turret assembly lower portion base 1206. As is known, the longitudinal axis (axis of rotation) of the jackscrew extends generally parallel to the outboard turret assembly lower portion base rails 1208. In this configuration, actuation of the single point movement assembly rotary actuator 922 causes the outboard turret assembly upper portion 1202 to move between the first and second positions. This solves the problem noted above. The single point movement assembly single locking assembly actuator 924 is coupled to a cam assembly (not shown). The cam assembly is coupled, directly coupled, or fixed to the outboard turret assembly upper portion 1202. The cam is structured to, and does, move between an unlocked, first configuration, wherein the earn does not engage a portion of the outboard turret assembly lower portion 1204 and the outboard turret assembly upper portion 1202 is free to move relative to the outboard turret assembly lower portion 1204, and, a locked, second position, wherein the cam engages a portion of the outboard turret assembly lower portion 1204 and the outboard turret assembly upper portion 1202 is not free to move relative to the outboard turret assembly lower portion 1204.

The single point movement assembly 920, and in an exemplary embodiment, the jackscrew/jackscrew retainer as well as the cam assembly, are each a retained coupling assembly and/or a retained release coupling, assembly. Moreover, the single point movement assembly 920 includes a limited number of retained couplings. Thus, the outboard turret assembly upper portion 1202 is structured to be moved between the first position and the second position via the actuation of a limited number of retained couplings or retained release couplings.

The outboard turret assembly 1200, and in an exemplary embodiment the outboard turret assembly upper portion 1202, further includes a pusher ram block 1250 and a number of pusher assemblies 1260. In an exemplary embodiment, the pusher ram block 1250 includes a toroid body that is coupled, directly coupled, or fixed to the process shaft assembly shaft 1022 and rotates therewith. As is known, each pusher assembly 1260 is structured to temporarily support a can body 1 and move the can body toward an associated die assembly 1060. For the can body 1 supported by the pusher assemblies 1260 to properly engage the associated die assemblies 1060, the pusher assemblies 1260 must be aligned with the associated die assemblies 1060. This is accomplished using a positioning key.

Figure 28:
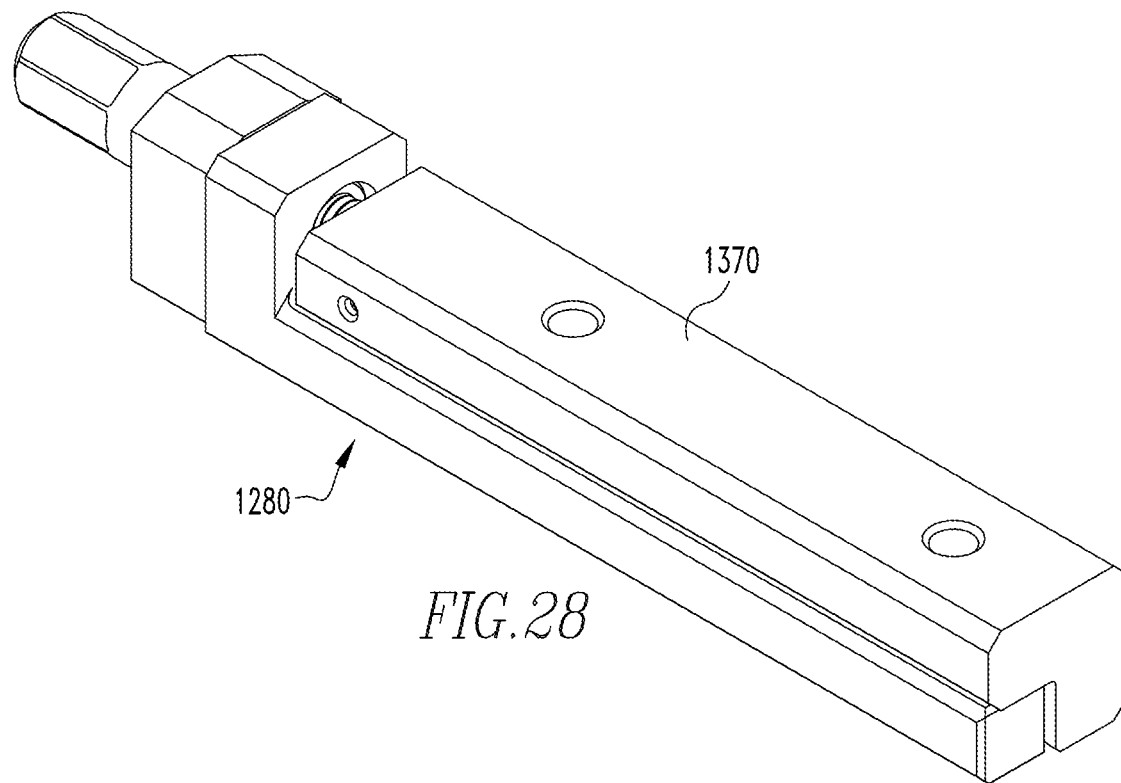
FIG. 28 is an isometric view of an outboard turret assembly positioning key.

As shown in FIG. 28, the outboard turret assembly 1200 includes a positioning key assembly 1280. The outboard turret assembly positioning key assembly 1280 is substantially similar to the traveling hub assembly positioning key assembly 580 discussed above. As the outboard turret assembly positioning key assembly 1280 is substantially similar to the traveling hub assembly positioning key assembly 580, details of the outboard turret assembly positioning key assembly 1280 are not discussed herein but it is understood that similar elements exist and are identified by the collective adjective "outboard turret assembly positioning key assembly [X]" and the reference numbers for those elements are +700 relative to the elements of the traveling hub assembly positioning key assembly 580. For example, the traveling hub assembly positioning key assembly 580 includes a first wedge body 670; thus, the outboard turret assembly positioning key assembly 1280 includes a first wedge body 1370.

Figure 29:
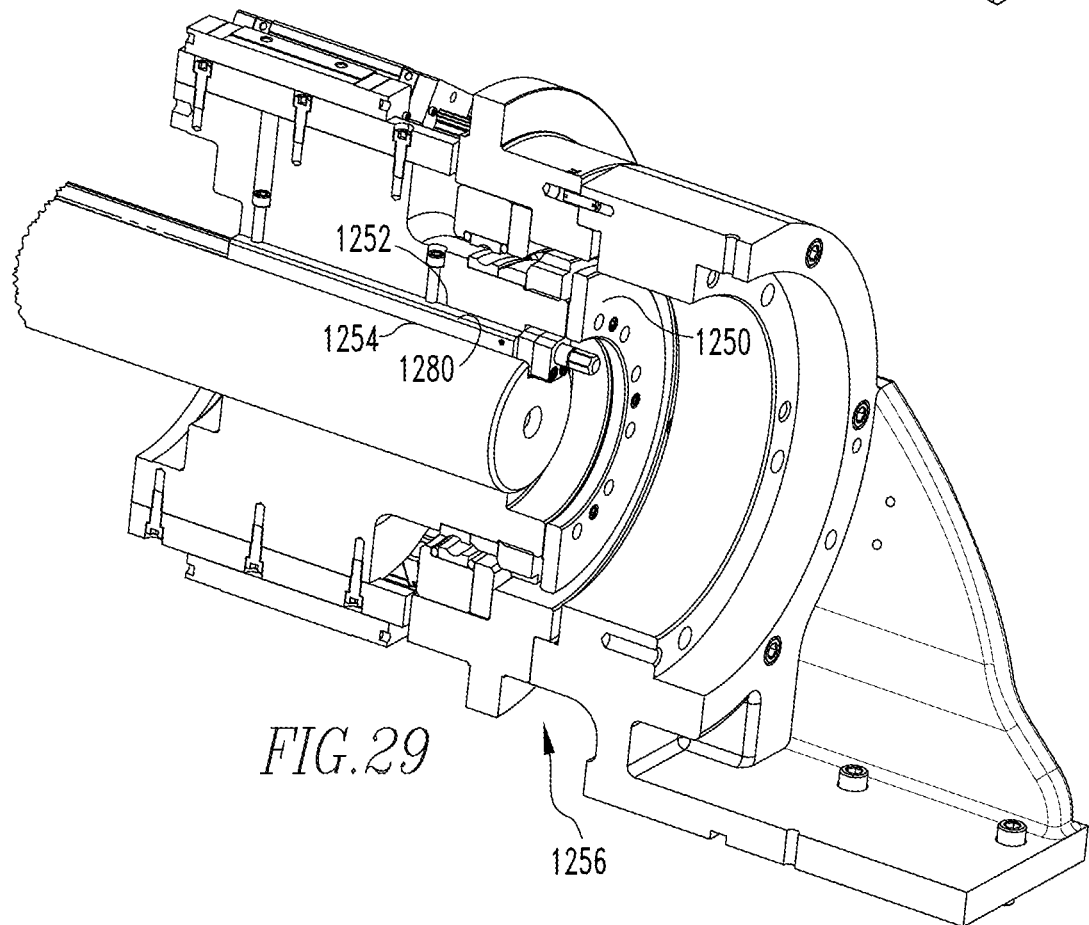
FIG. 29 is an isometric view of an outboard turret assembly pusher ram block positioning key mounting.
Figure 30:
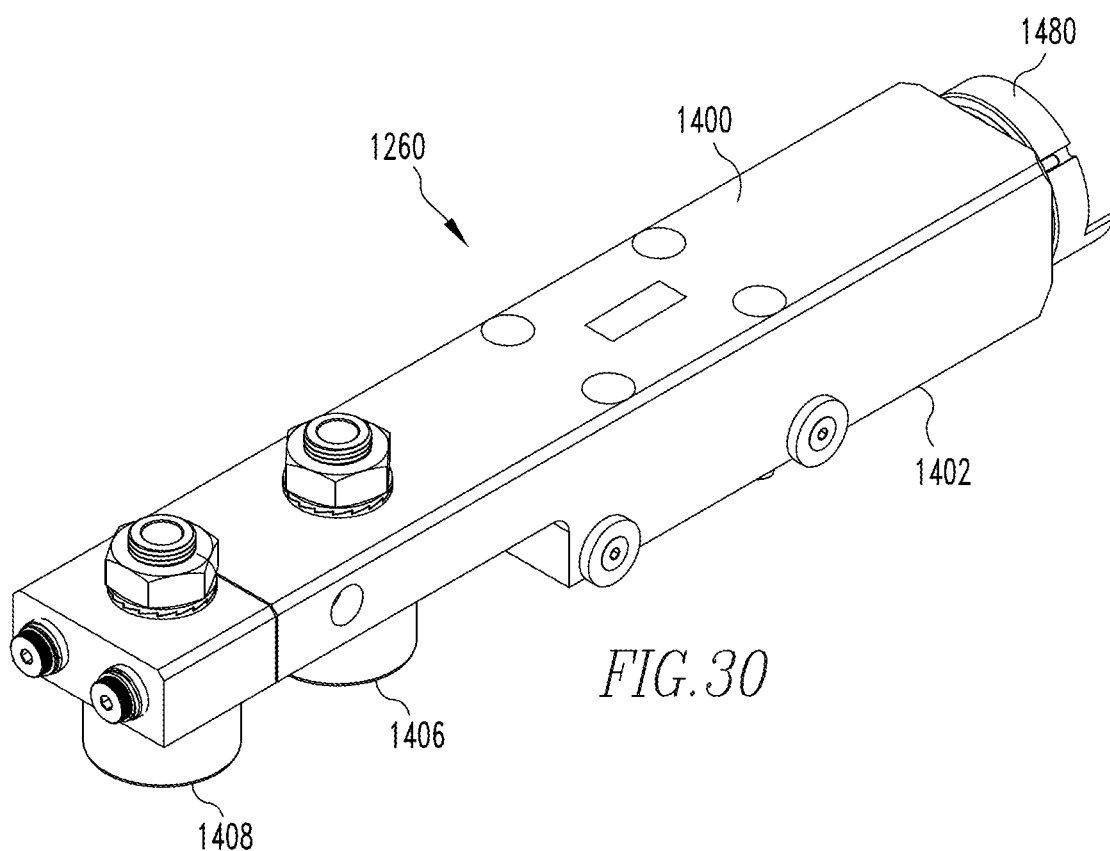
FIG. 30 is an isometric view of a pusher assembly.
Figure 31:
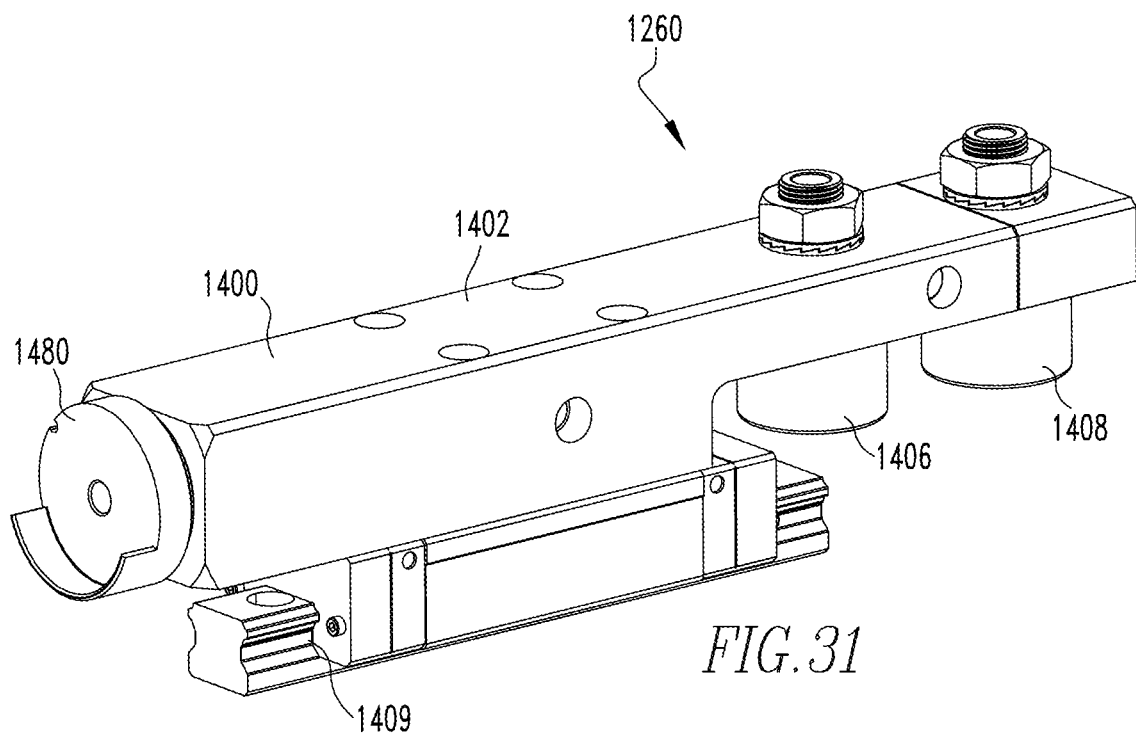
FIG. 31 is another isometric view of a pusher assembly.
Figure 32:
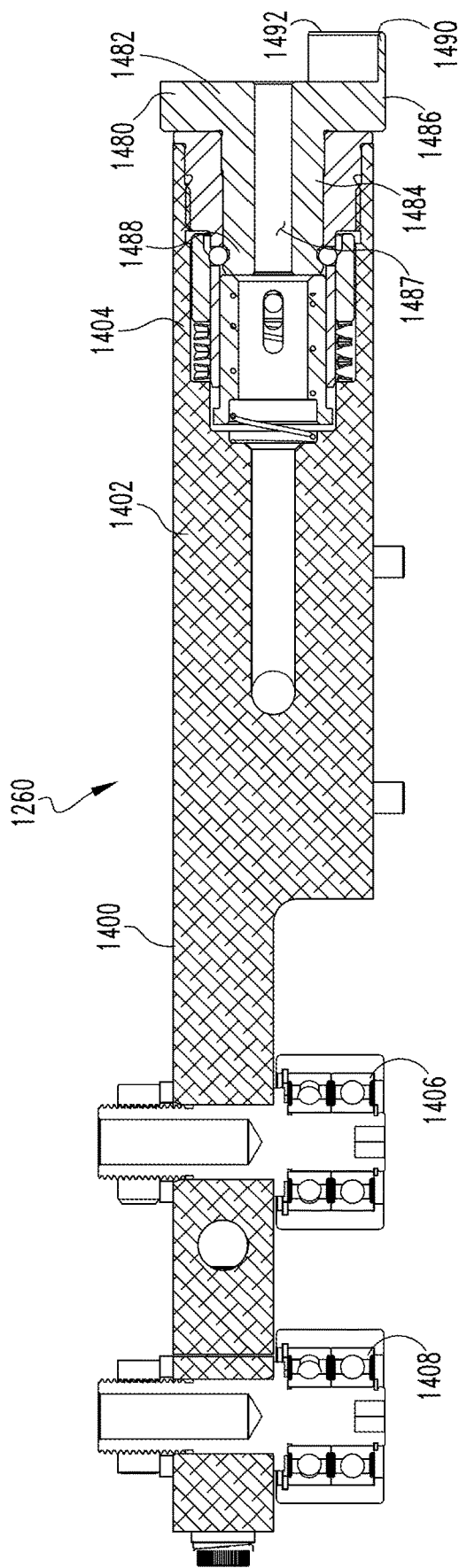
FIG. 32 is a cross-sectional view of a pusher assembly.
Figure 33:
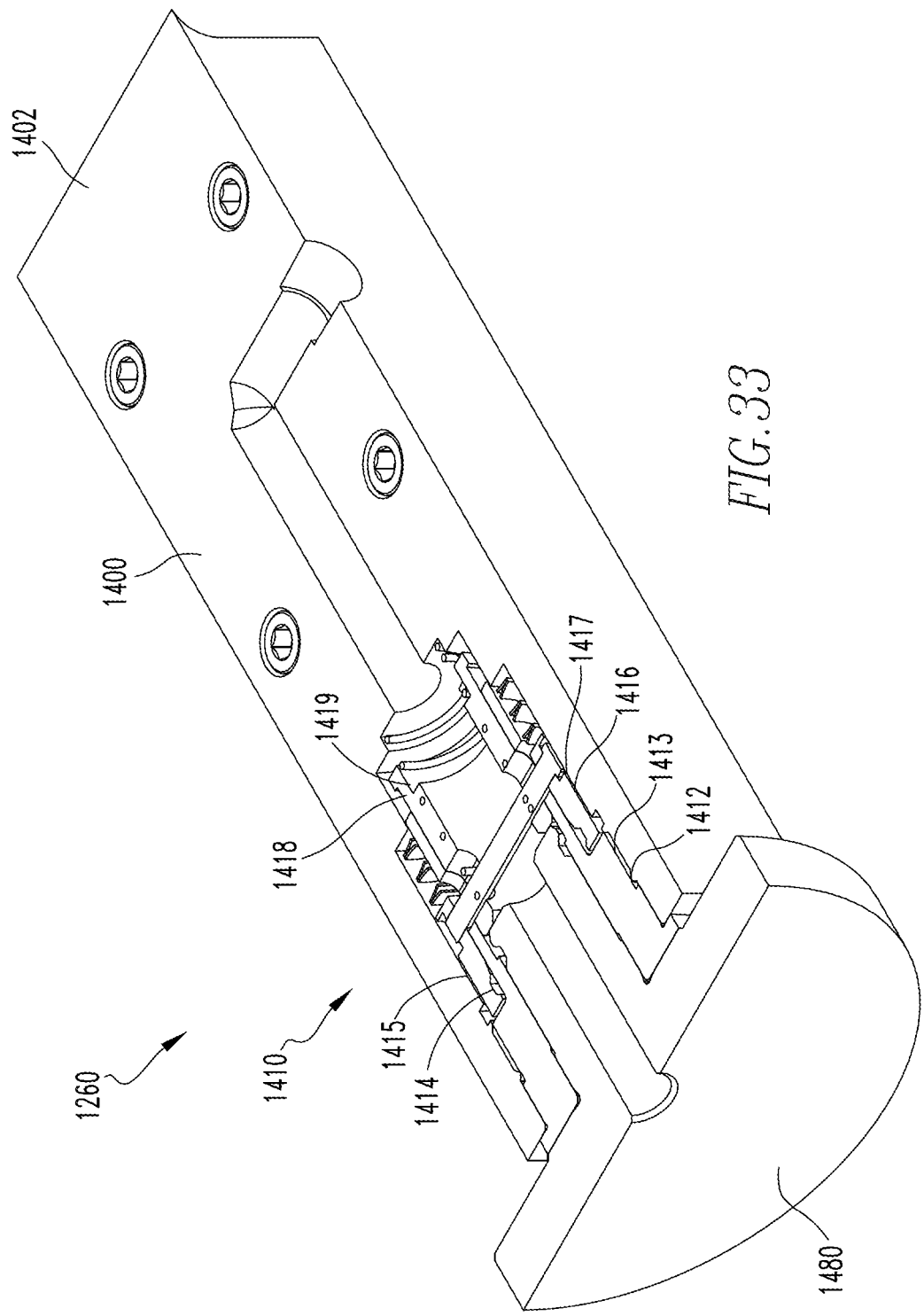
FIG. 33 is an isometric cross-sectional view of a portion of a pusher assembly.
Figure 34:
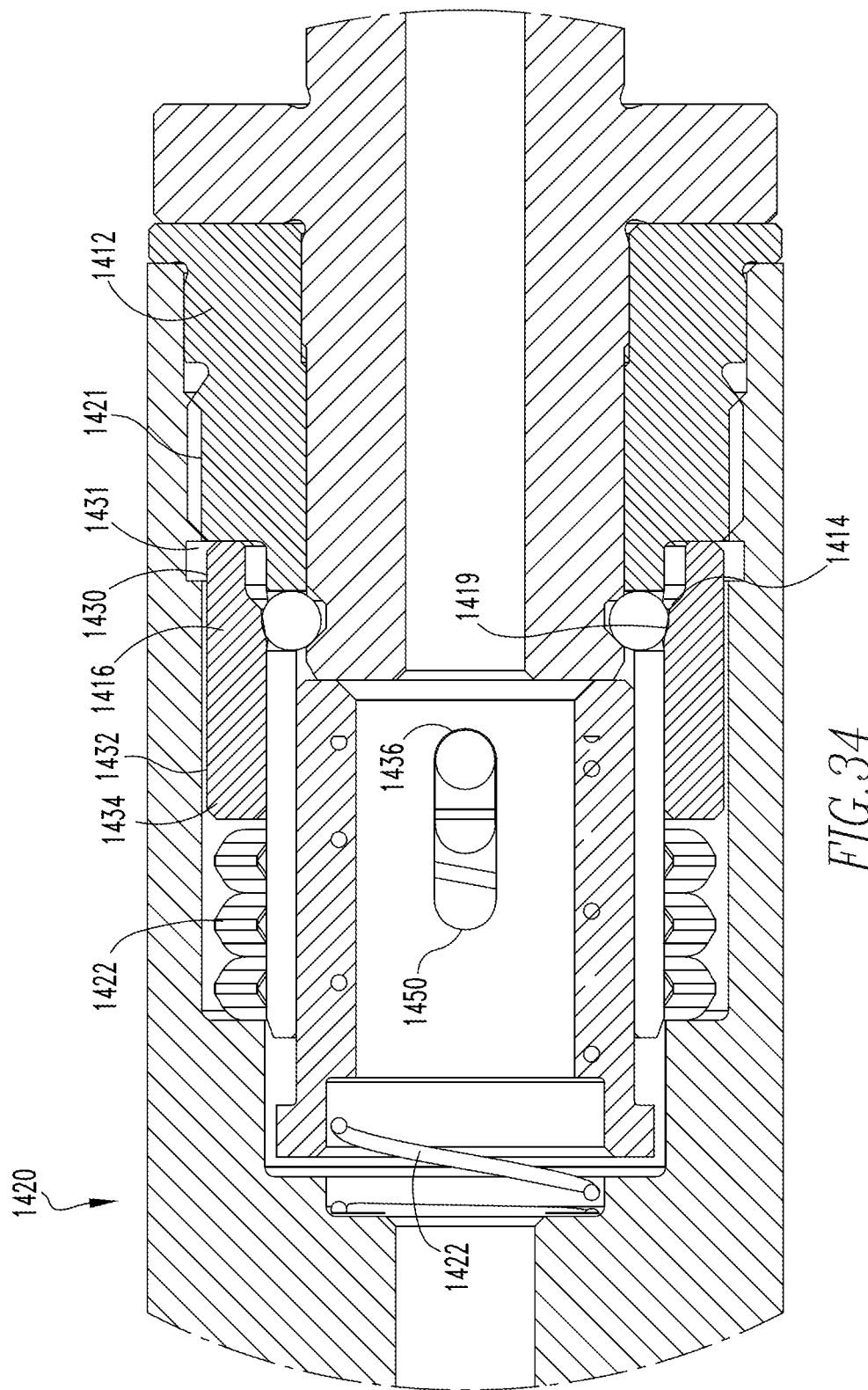
FIG. 34 is a detail cross-sectional view of a pusher assembly.
Figure 35A:
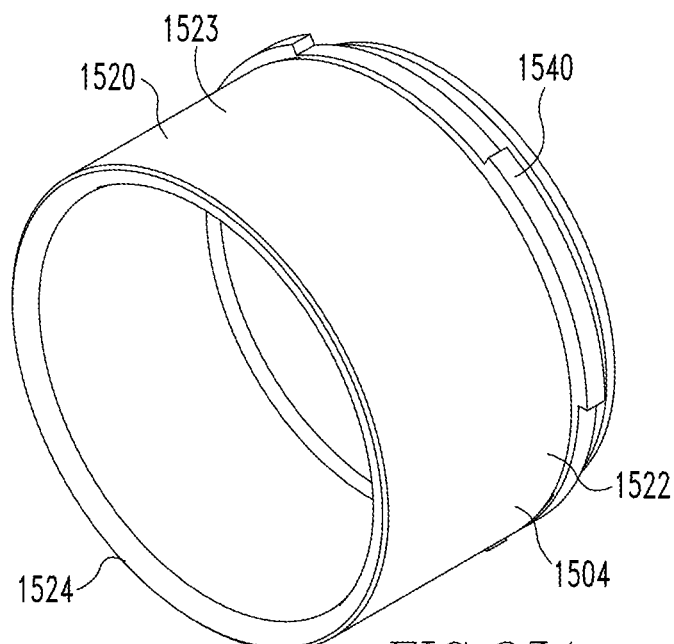
FIGS. 35A-35E are isometric views of an outer die assembly quick-change die assembly with the elements in different configurations.
Figure 35B:
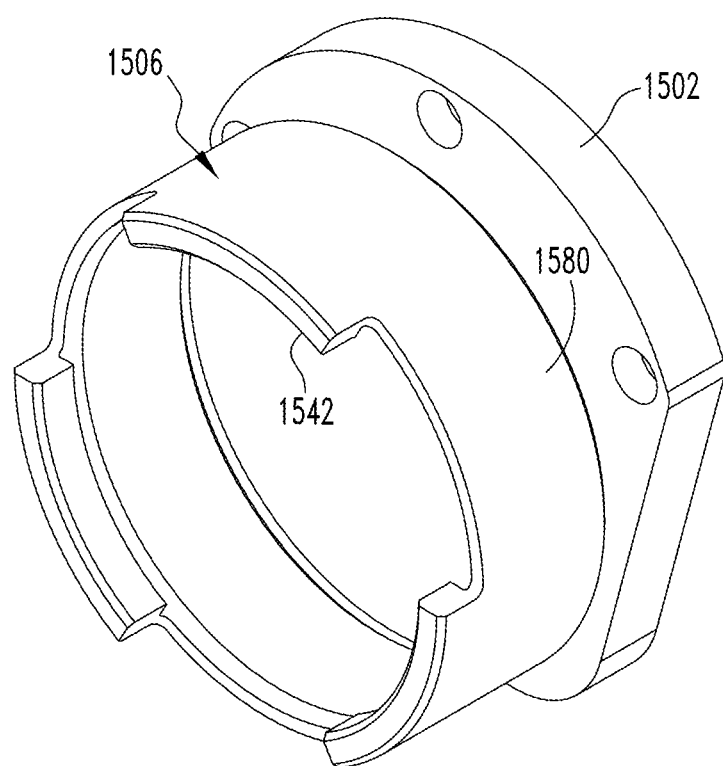
Figure 35C:
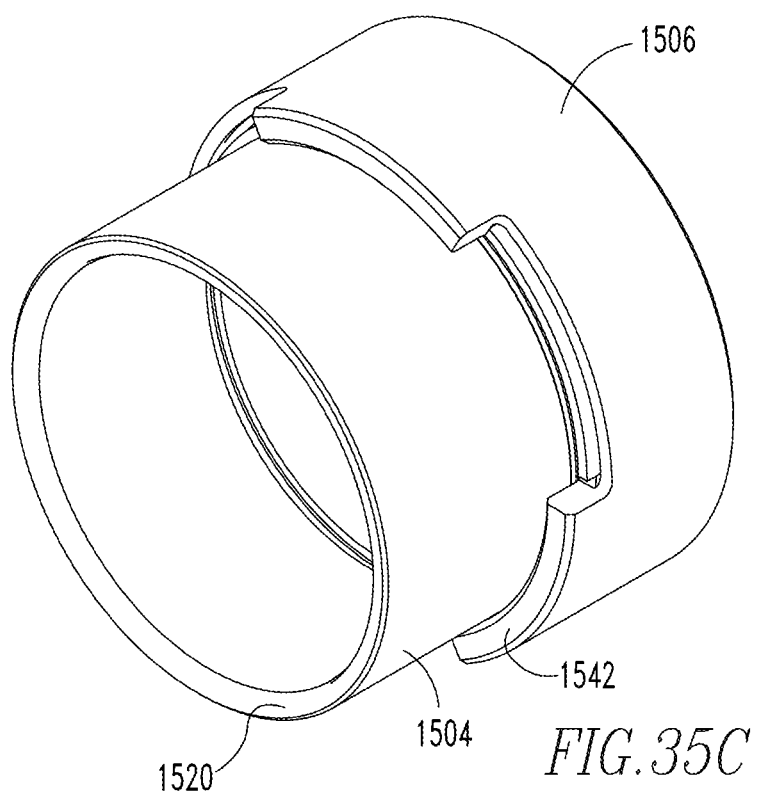
Figure 35D:
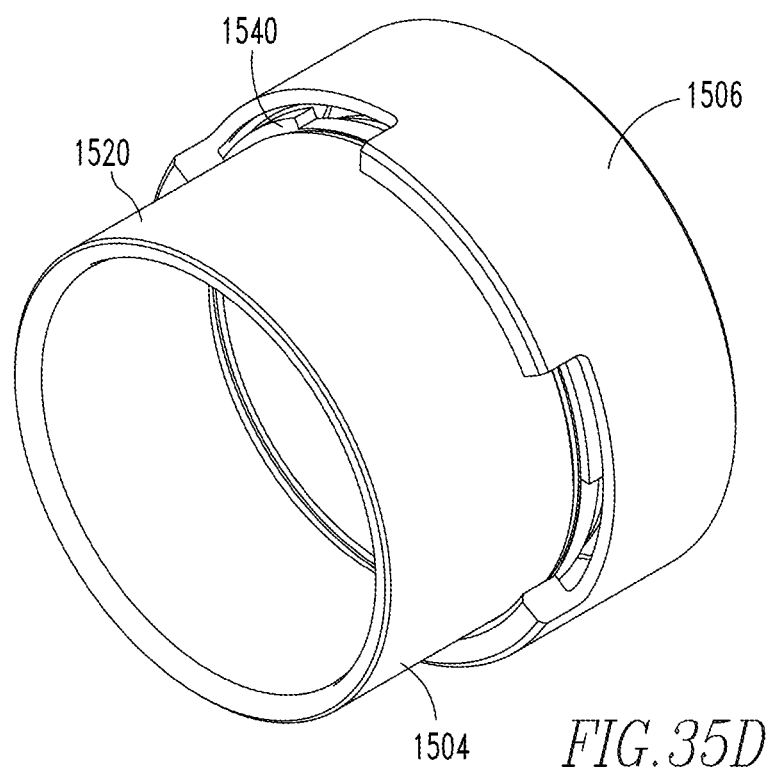
Figure 35E:
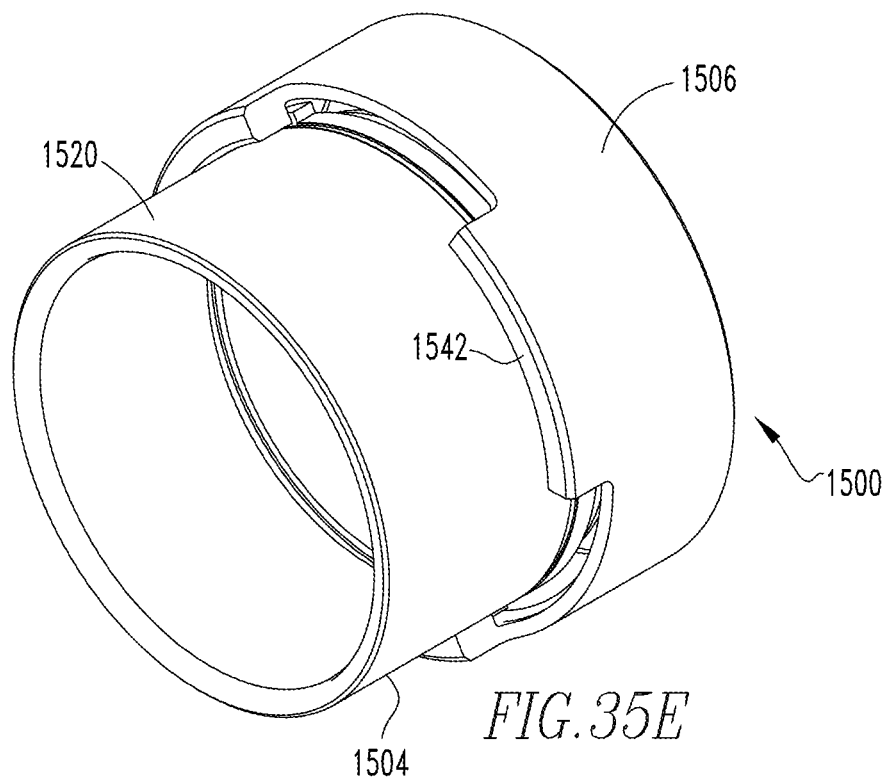
Figure 36:
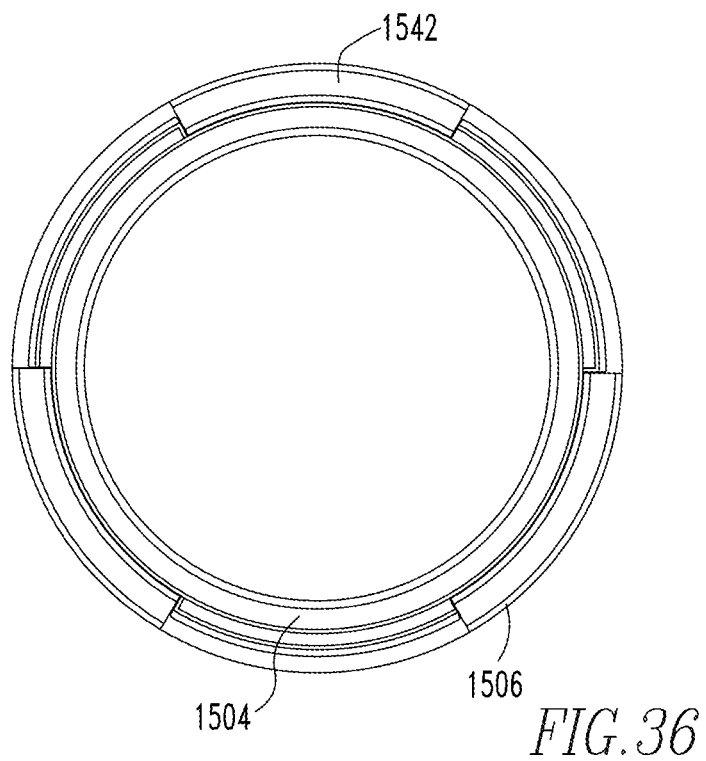
FIG. 36 is an end view of an outer die assembly quick-change die assembly.

As shown in FIG. 29, the outboard turret assembly pusher ram block 1250 defines a positioning key mounting 1252 and the process shaft assembly shaft 1022 defines a corresponding positioning key mounting 1254. That is, the outboard turret assembly pusher ram block 1250 is positioned on the process shaft assembly shaft 1022 with the outboard turret assembly pusher ram block positioning key mounting 1252 disposed opposite the process shaft assembly shaft positioning key mounting 1254 whereby the two positioning key mountings create a forming station shaft assembly quick-change assembly positioning key assembly cavity 1256. The outboard turret assembly positioning key 1280 is disposed in the forming station shaft assembly quick-change assembly positioning key assembly cavity 1256. In a manner substantially similar to the traveling hub assembly positioning key assembly 580 described above, the outboard turret assembly positioning key 1280 moves between a first configuration, wherein the cross-sectional area of the forming station shaft assembly quick-change assembly positioning key assembly is relatively smaller and wherein the outboard turret assembly pusher ram block 1250 is not aligned with the process shaft assembly process shaft 1022, and, a second configuration, wherein the cross-sectional area of the forming station shaft assembly quick-change assembly positioning key assembly 1280 is relatively larger and wherein the outboard turret assembly pusher ram block 1250 is aligned with the process shaft assembly process shaft 1022. Thus, the outboard turret assembly positioning key 1280 is structured to, and does, move the pusher assemblies 1260 into alignment with the associated die assemblies 1060.

As shown in FIG. 27, the outboard turret assembly pusher ram block 1250 further includes a number of pusher assembly linear bearings 1258. As shown, the outboard turret assembly pusher ram block, pusher assembly linear bearings 1258 (hereinafter "pusher assembly linear bearings 1258") extend substantially parallel to the axis of rotation of the process shaft assembly shaft 1022. The pusher assembly linear bearings 1258 are discussed further below.

As shown in FIGS. 30-34, the pusher assemblies 1260 are substantially similar to each other and only one is described herein. As shown in FIG. 28, the pusher assembly 1260 includes a housing 1400, a quick-release mounting assembly 1410, and a pusher pad 1480. The pusher assembly housing 1400 includes a body 1402 defining a cavity 1404 and supporting two adjacent cam followers 1406, 1408. The pusher assembly housing 1400 is movably coupled to the outboard turret assembly pusher ram block 1250 and rotates therewith. More specifically, the pusher assembly housing 1400 defines a bearing passage 1409. The pusher assembly housing 1400 is movably coupled to the outboard turret assembly pusher ram block 1250 with a pusher assembly linear bearing 1258 disposed in the pusher assembly housing bearing passage 1409. Further, the pusher assembly housing cam followers 1406, 1408 are operatively coupled to the outboard turret assembly upper portion cam ring 1214. Thus, as the outboard turret assembly pusher ram block 1250 rotates, each pusher assembly housing 1400 is structured to, and does, move between a retracted, first position, wherein the pusher assembly housing 1400 is closer to the outboard turret assembly lower portion 1204, and, an extended, second position, wherein the pusher assembly housing 1400 is closer to the inboard turret assembly 1000.

It is understood that each pusher assembly pusher pad 1480 corresponds to, i.e., is structured to support, a can body 1 with a specific radius. Thus, when the necker machine 10 needs to process a can body 1 of a different radius, the pusher assembly pusher pads 1480 must be exchanged. The quick-release mounting assembly 1410, which is also identified herein as an element of the forming station quick-change assembly 900, is structured to allow the pusher assembly pusher pads 1480 to be exchanged while using a very limited, or in an exemplary embodiment, an exceedingly limited, number of retained couplings.

That is, as described below, each quick-release mounting assembly 1410 is a retained release coupling assembly. Each quick-release mounting assembly 1410 includes a base 1412, a number of balls 1414 (one shown), a ball lock sleeve 1416, a ball retainer 1418 and a number of biasing devices 1420. The quick-release mounting assembly biasing devices 1420 are, in an exemplary embodiment, springs 1422. As shown, the quick-release mounting assembly base 1412, ball lock sleeve 1416, and a ball retainer 1418 are generally cylindrical and toroid bodies 1413, 1415, 1419, respectively. In an exemplary embodiment, the ball retainer 1418 includes an outer sleeve. The pusher assembly quick-release mounting assembly base 1412 includes a generally toroid body 1413, including an outer surface coupling 1421 such as, but not limited to threads. It is understood that the pusher assembly housing body cavity 1404 has a corresponding coupling. Thus, the pusher assembly quick-release mounting assembly base 1412 is structured to be, and is, coupled, directly coupled, or fixed to the pusher assembly housing 1400. Each pusher assembly quick-release mounting assembly ball lock sleeve 1416 includes a generally toroid body 1417 with a first end 1430, a medial portion 1432, and a second end 1434. The pusher assembly quick-release mounting, assembly ball lock sleeve body first end 1430 includes a tapered portion 1431. The pusher assembly quick-release mounting assembly ball lock sleeve body medial portion 1432 includes an inwardly extending radial lug 1436. The pusher assembly quick-release mounting assembly ball retainer 1418 includes a generally toroid body 1419 with a sleeve body lug slot 1450.

Each pusher assembly quick-release mounting assembly base 1412 is coupled to the pusher assembly housing 1400 with the pusher assembly quick-release mounting assembly base body 1413 substantially disposed within an associated pusher assembly housing mounting cavity 1404. Each pusher assembly quick-release mounting assembly ball lock sleeve body 1417 is movably disposed within an associated pusher assembly housing mounting cavity 1404 with the pusher assembly quick-release mounting assembly ball lock sleeve body first end 1430 disposed adjacent an associated pusher assembly quick-release mounting assembly base 1412. The pusher assembly quick-release mounting assembly ball lock sleeve body 1417 is biased to a forward position by a pusher assembly quick-release mounting assembly biasing device 1420. The pusher assembly quick-release mounting assembly ball retainer 1418 is movably disposed within an associated pusher assembly housing mounting cavity 1404 and generally within an associated pusher assembly quick-release mounting assembly ball lock sleeve body. Each pusher assembly quick-release mounting assembly ball retainer 1418 is biased to a forward position by a pusher assembly quick-release mounting assembly biasing device 1420. Further, each pusher assembly quick-release mounting assembly ball lock sleeve body medial portion lug 1436 extends through an associated pusher assembly quick-release mounting assembly ball retainer lug slot 1450. Further, each pusher assembly quick-release mounting ball 1414 is trapped between an associated pusher assembly quick-release mounting assembly base 1412 and an associated pusher assembly quick-release mounting assembly ball retainer 1418.

In this configuration, each quick-release mounting assembly 1410 is structured to, and does, move between three configurations, an unengaged first configuration wherein no pusher pad is disposed within the pusher assembly quick-release mounting assembly base 1412, each of the pusher assembly quick-release mounting assembly ball lock sleeve body 1417 is biased to a forward position relative to an associated pusher assembly quick-release mounting assembly ball retainer 1418, and each of the pusher assembly quick-release mounting ball 1414 is biased toward an inner position, a release configuration wherein each of the pusher assembly quick-release mounting assembly ball lock sleeve body 1417 is biased to a rearward position relative to an associated pusher assembly quick-release mounting assembly ball retainer 1418, and each of the pusher assembly quick-release mounting ball 1414 is biased toward an outer position, and an engaged second configuration wherein a pusher pad 1480 is disposed within the pusher assembly quick-release mounting assembly base 1412, each of the pusher assembly quick-release mounting assembly ball lock sleeve body 1417 is biased to a forward position relative to an associated pusher assembly quick-release mounting assembly ball retainer 1418, and each of the pusher assembly quick-release mounting ball 1414 is biased toward an inner position wherein each of the pusher assembly quick-release mounting ball 1414 is disposed in an associated pusher pad body first end locking channel 1488.

The pusher assembly pusher pads 1480 are substantially similar and only one is described. The pusher assembly pusher pad 1480 includes a toroid body 1482 including a narrow first end 1484 and a wide second end 1486 as well as defining a passage 1487. That is, the pusher assembly pusher pad body 1482 has a generally T-shaped cross-section. The pusher assembly pusher pad body first end 1484 includes a locking channel 1488 on the outer surface thereof. The pusher assembly pusher pad body 1482 is coupled to the quick-release mounting assembly 1410 by inserting the pusher assembly pusher pad body first end 1484 into the pusher assembly quick-release mounting, assembly base 1412 until the pusher assembly pusher pad body first end 1484 displaces the quick-release mounting assembly number of balls 1414 outwardly. Further motion of the pusher assembly pusher pad body 1482 into the pusher assembly quick-release mounting assembly base 1412 moves the pusher assembly pusher pad body first end locking channel 1488 into alignment with the quick-release mounting assembly number of balls 1414. That is, the quick-release mounting assembly number of balls 1414 are disposed in the pusher assembly pusher pad body first end locking channel 1488. This is the second configuration of the quick-release mounting assembly discussed above.

The quick-release mounting assembly 1410 is structured to be, and is, actuated to move to the release configuration from the second configuration by applying a bias to the pusher assembly quick-release mounting assembly ball lock sleeve lug 1436 and moving it from a forward position to a rearward position within the pusher assembly housing body cavity 1404. This actuation moves the pusher assembly quick-release mounting assembly ball lock sleeve 1416 so that the pusher assembly quick-release mounting assembly ball lock sleeve body first end tapered portion 1431 is disposed adjacent to the quick-release mounting assembly number of balls 1414 thereby allowing the quick-release mounting, assembly number of balls 1414 to move radially outward. That is, the quick-release mounting assembly number of balls 1414 are no longer disposed in the pusher assembly pusher pad body first end locking channel 1488. In this configuration, the pusher assembly pusher pad 1480 is removable from the quick-release mounting assembly 1410. The pusher assembly quick-release mounting assembly ball lock sleeve lug 1436 is, in an exemplary embodiment, actuated by a generally cylindrical rod, or similar construct being inserted through the pusher assembly pusher pad body passage 1487. Thus, only an exceedingly limited number of couplings, i.e., one quick-release mounting assembly 1410, are used to couple the pusher assembly body 1402 to the pusher assembly mounting assembly 1410.

Further, each pusher assembly pusher pad body second end 1486 includes an axially extending, arcuate lip 1490 structured to protect a can body 1 as the can body 1 moves adjacent to a guide starwheel 1092. The pusher pad body second end lip 1490 includes a distal end 1492 that is, in an exemplary embodiment, tapered and/or resilient. Further, the pusher pad body second end lip 1490 extends over an arc of less than 180 degrees and, in an exemplary embodiment, about 140 degrees. The pusher pad body second end lip 1490 is a can body 1 locator. As used herein, a "can body locator" is a construct structured to support a can body 1 and to align the can body 1 with a die assembly 1060 and to protect the can body 1 as the can body 1 moves adjacent to a guide starwheel 1092.

As shown in FIG. 27, the forming station quick-change assembly 900 further includes a quick-change die assembly 1500 (the elements thereof are also identified herein as part of the inboard turret assembly process shaft assembly die assemblies 1060 and vice-versa).

As noted above, the process shaft assembly 1020 includes a plurality of knockout rain mountings 1030, a plurality of knockout rain assemblies 1040, a plurality of die assemblies 1060, and a die assembly support 1080. That is, the die assembly support 1080 is, in an exemplary embodiment, a toroid body 1082 that is structured to be, and is, coupled, directly coupled, or fixed to the process shaft assembly shaft 1022. The die assembly support 1080 is further structured to support a number of knockout ram mountings 1030, a plurality of knockout ram assemblies 1040, and a number of die assemblies 1060. As is known, a knockout ram mounting 1030 supports a knockout ram assembly 1040, and an associated die assembly 1060. There are a plurality of sets of these associated elements which are generally similar. As such, the following will discuss one set of these associated elements. It is understood that the process shaft assembly 1020 includes a plurality of these associated elements disposed about the process shaft assembly shaft 1022.

In an exemplary embodiment, the knockout ram mounting 1030 is a linear bearing 1032 disposed on the die assembly support 1080 and which extends generally parallel to the axis of rotation of the process shaft assembly shaft 1022. In this exemplary embodiment, the knockout ram mounting linear bearing 1032 is a "substantially decoupled" linear bearing. As used herein, a "substantially decoupled" linear bearing means a linear bearing that is coupled to a number of forming constructs such as, but not limited to a die, wherein a rotational coupling is disposed between all forming constructs and the linear bearing so that only force in a single direction is applied to the linear bearing.

The knockout ram assembly 1040 includes a body 1041 that is an inner die mounting 1042. That is, the knockout ram assembly inner die mounting 1042 supports the inner die 1560 and is structured to, and does, reciprocate over the knockout ram mounting 1030. Generally, the knockout ram assembly inner die mounting 1042 defines a bearing channel that corresponds to the knockout ram mounting linear bearing 1032. The knockout ram assembly inner die mounting 1042 further includes two cam followers 1044, 1046 that operatively engage the inboard turret assembly cam ring 1010. In one embodiment, the knockout ram assembly inner die mounting 1042 defines a cavity 1047 that is open on one end. In another embodiment, the knockout ram assembly inner die mounting 1042 includes a rotational coupling lug 1048 located on a first end (which includes the forward surface of the inner die mounting 1042) of the knockout rain assembly inner die mounting 1042. As used herein, a "rotational coupling lug" is a toroid lug having an L-shaped cross-section.

There are, generally, two embodiments of the quick-change die assembly 1500 although elements of each embodiment are, in another embodiment, combined. In both embodiments, the quick-change die assembly 1500 includes an outer die mounting 1502, an outer die 1504, an outer die quick-release coupling 1506, an inner die mounting 1512, an inner die assembly 1514, and an inner die quick-release coupling 1516. As used herein, an "outer die quick-release coupling" and/or an "inner die quick-release coupling" means a coupling wherein the die coupled to a mounting via the "quick-release coupling" is structured to be released following the actuation of one of a limited number of couplings, a significantly limited number of couplings, a very limited number of couplings, or an exceedingly limited number of couplings, and, wherein the couplings are a retained coupling, a release coupling, a retained release coupling, or a reduced actuation coupling. As shown in FIGS. 35A-39, the outer die 1504 is coupled, directly coupled, or fixed to the outer die mounting 1502 by the outer die quick-release coupling 1506. The inner die assembly 1514 is coupled, directly coupled, or fixed to the inner die mounting 1512 by the inner die quick-release coupling 1516.

The outer die 1504 includes a generally toroid body 1520 having a shaped inner surface. As is known, the outer die shaped inner surface is structured to, and does, reduce the diameter of a can body first end 6 and generally includes a first radius portion and a second radius portion. The outer die body 1520 includes a proximal, first end 1522 (disposed further from the gap 1001 when installed), a medial portion 1523 and a distal, second end 1524 (disposed closer from the gap 1001 when installed). In one exemplary embodiment, the outer die body first end 1522 includes an outwardly radially extending annular locking lip 1525 that extends about the outer die body first end 1522.

In another embodiment, the outer die body first kind 1522 includes a number of outwardly radially extending, arced locking members 1540. As used herein, an "arced locking member" is an extension that extends over an arc that is less than about 60° and which is structured to engage with opposed arced locking members. In the embodiment shown, there are three arced locking members 1540 extending about 60° each.

As shown in FIGS. 40-43, the inner die assembly 1514 includes an inner die 1560 and an inner die support 1562. The inner die 1560 includes a toroid body 1564 with an inwardly extending flange (not numbered). The inner die body 1564 flange defines a passage. The inner die support 1562 includes a body 1565 having a first end 1566 and a second end 1568. The inner die support body first end 1566 defines a coupling 1569, such as, but not limited to, a threaded bore, to which the inner die body 1564 is coupled. For example, a fastener (not numbered) extends through the inner die body 1564 flange and into the inner die support body first end coupling 1569, i.e. the threaded bore. In one embodiment, the inner die support body 1565 is generally toroid and the inner die support body second end 1568 includes an annular locking channel 1570 on the outer surface. In another embodiment, not shown, the inner die body is generally a parallelepiped and the inner die support body second end 1568 includes a radial access cavity 1572. As used herein, a "radial access cavity" means a cavity that is structured to be, and is, coupled to a rotational coupling lug and which is structured to, and does, engage the rotational coupling lug while moving generally radially relative to a process shaft assembly shaft 1022.

Figure 37A:
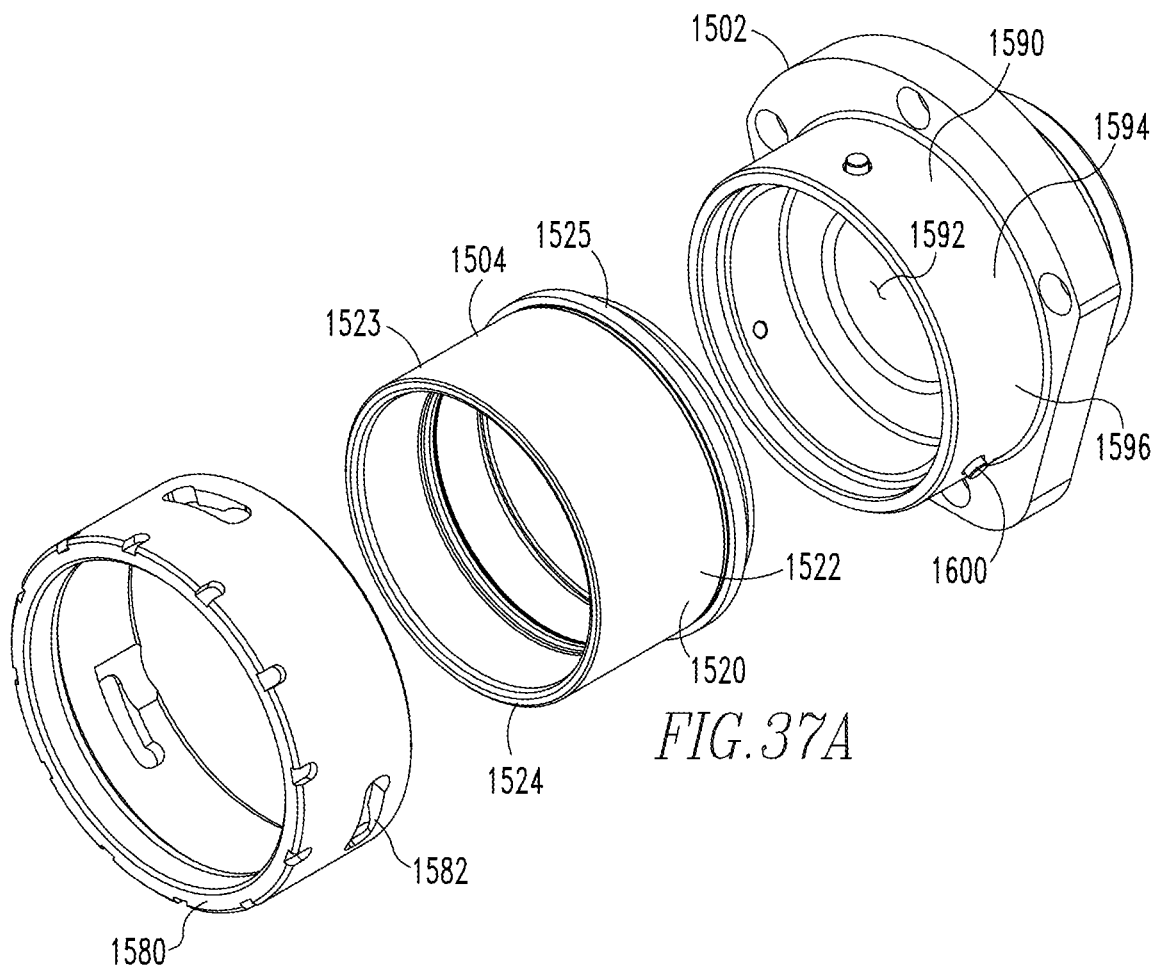
FIG. 37A is an isometric, exploded view of another embodiment of an outer die assembly quick-change die assembly.
Figure 37B:
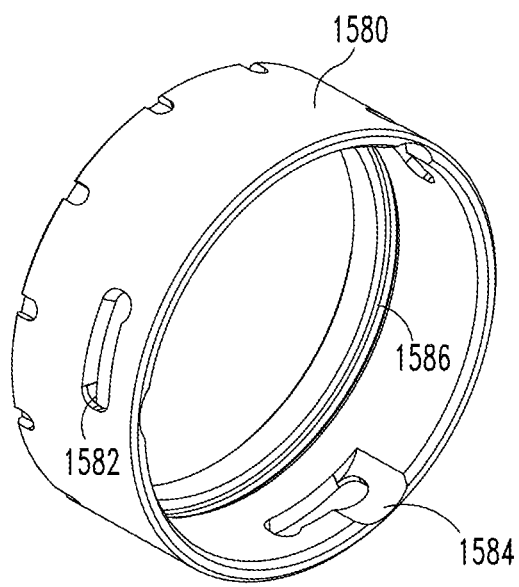
FIG. 37B is an isometric view of an outer die assembly quick-change coupling.
Figure 38C:
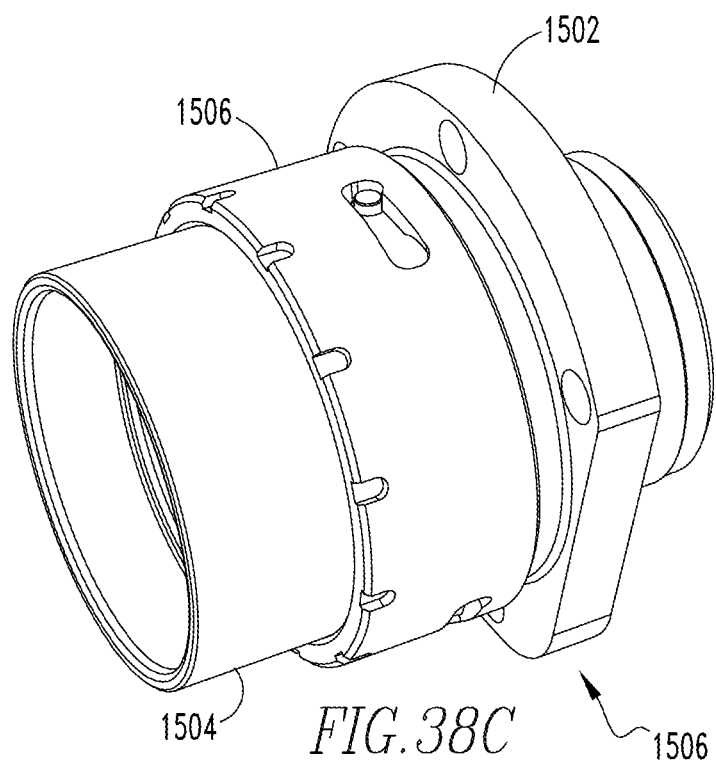
Figure 39:
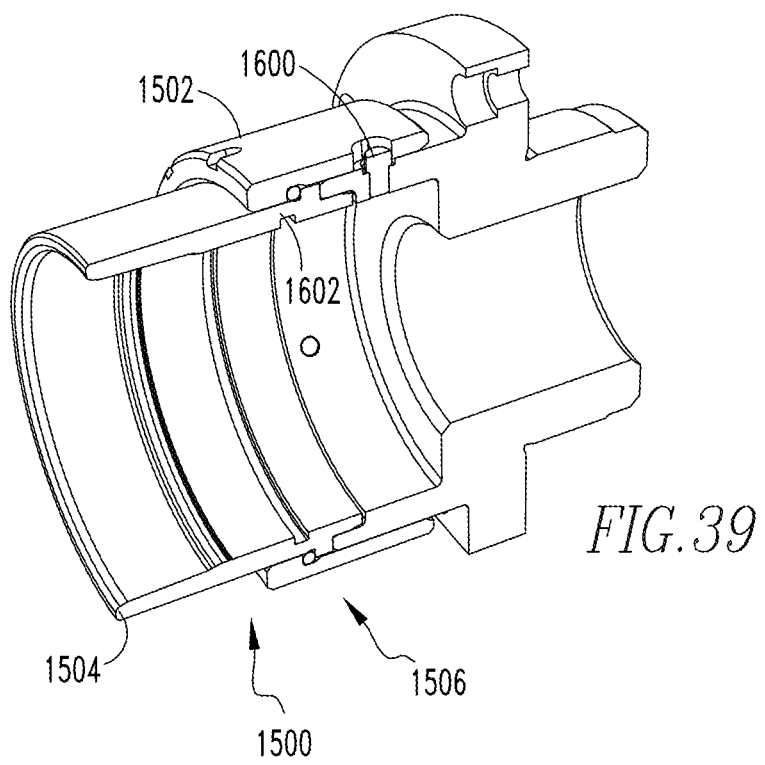
FIG. 39 is an isometric cross-sectional view of the embodiment of an outer die assembly quick-change die assembly shown in FIG. 38C.
Figure 40:
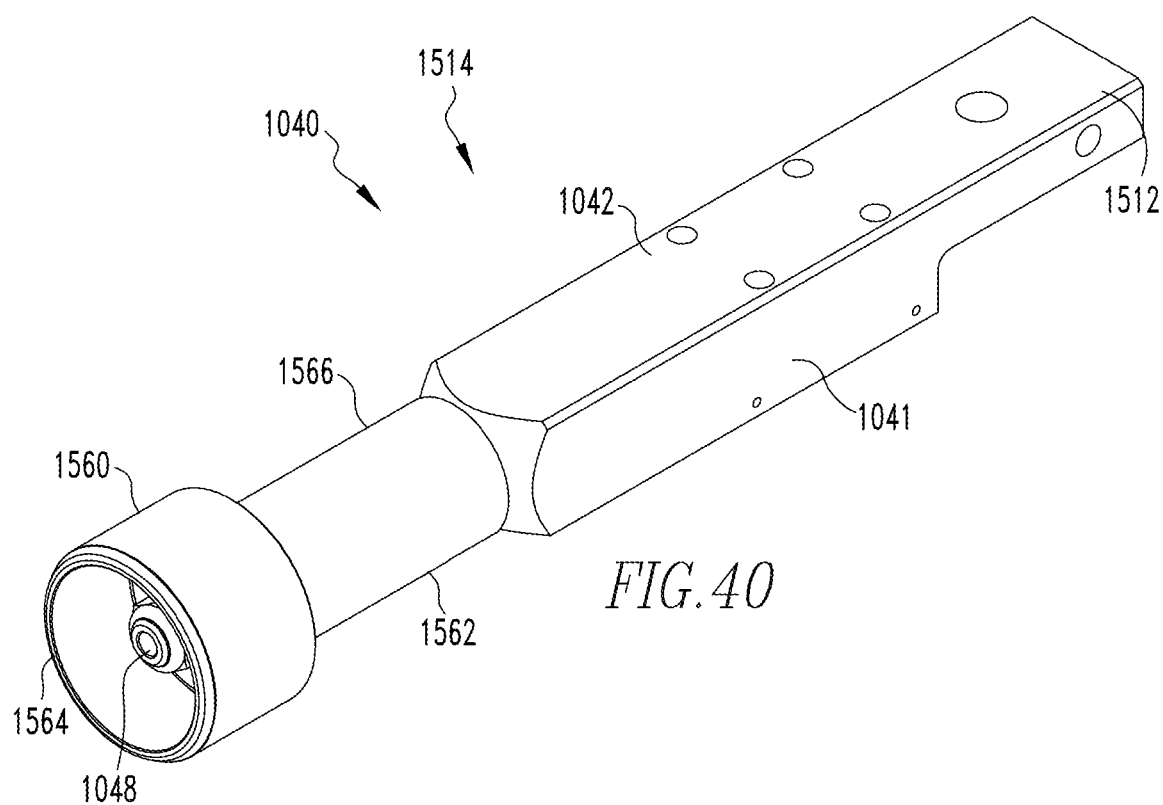
FIG. 40 is an isometric view of a portion of an inner die assembly quick-change die assembly.
Figure 41:
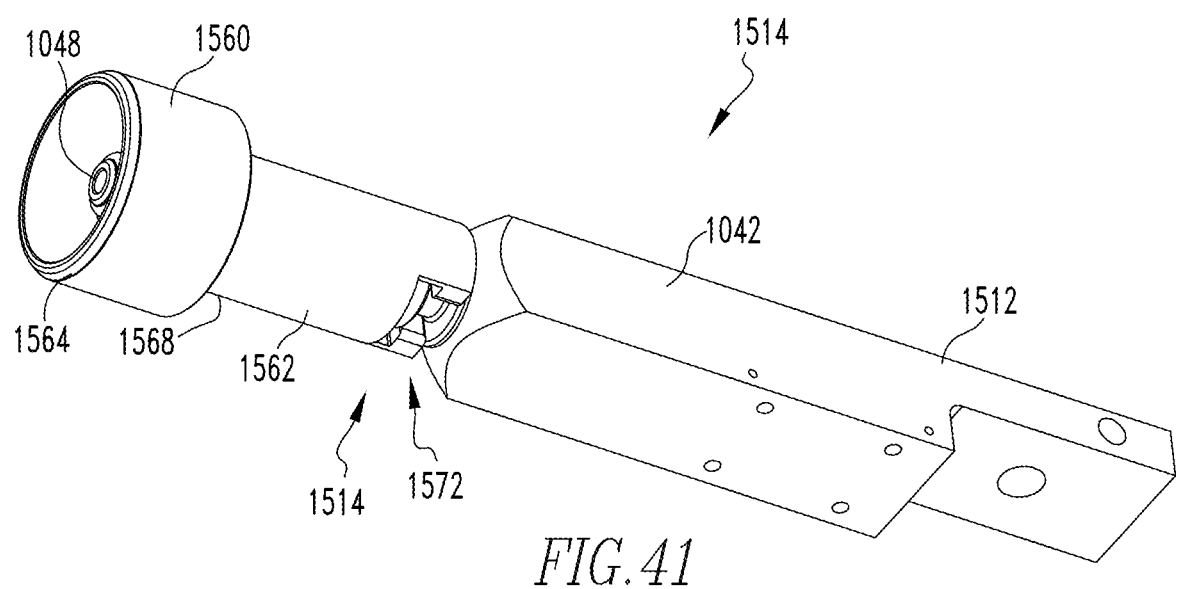
FIG. 41 is another isometric view of a portion of an inner die assembly quick-change die assembly.

In one embodiment, shown in FIG. 37B, the outer die quick-release coupling 1506 includes a generally toroid body 1580 with a number of bayonet pin channels 1582, a bayonet pin channel cutout 1584, and, an inwardly, radially extending locking lip 1586. The outer die quick-release coupling body bayonet pin channels 1582 are generally similar and only one is described. Each outer die quick-release coupling body bayonet pin channel 1582 is an elongated obround channel that is disposed at an angle relative to the axis of rotation of the process shaft assembly shaft 1022 (when installed). Further, the outer die quick-release coupling body bayonet pin channels 1582 are defined by a compliant material and include offset ends. As used herein, an "offset end" is an end that is shifted to one lateral side relative to a longitudinal axis of the channel.

Further, a bayonet pin channel cutout 1584, as used herein, means a thin portion of the outer die quick-release coupling body 1580 that is structured to not engage, or otherwise contact, a bayonet pin. That is, in a toroid body, the bayonet pin channel is a thinned portion wherein the bayonet, pins fit under the bayonet pin channel cutout 1584.

In this embodiment, shown in FIG. 37A, the outer die mounting 1502 includes a generally planar body 1590 with a passage 1592 therethrough and a collar 1594 disposed about the outer die mounting body passage 1592. The outer die mounting body 1590 is, in one embodiment, a generally toroid disk 1596 that is coupled, directly coupled, or fixed to the process shaft assembly shaft 1022 and which includes a plurality of passages 1592, i.e., one for each die assembly 1060. In this embodiment, outer die mounting body 1590 includes a number of radially extending bayonet pins 1600, i.e., rigid pins. In an exemplary embodiment, there are a plurality of outer die body bayonet pins 1600 disposed generally evenly about the outer die body 1600 (three shown at about 120° apart).

In this embodiment, the outer die quick-release coupling 1506 operates as follows. The outer die 1504 is disposed on the front surface of the outer die mounting collar 1594, The outer die quick-release coupling body 1580 is moved over the outer die 1504 with the outer die mounting collar bayonet pins 1600 passing under the bayonet pin channel cutout 1584 into the outer die quick-release coupling body bayonet pin channels 1582. In this configuration, the outer die quick-release coupling body inwardly, radially extending locking lip 1586 engages the outer die body first end locking lip 1525. When the outer die quick-release coupling body 1580 is rotated, and because the outer die quick-release coupling body bayonet pin channel 1582 is disposed at an angle as described above, the outer die quick-release coupling body 1580 is drawn toward the outer die mounting collar 1594. This, in turn, biases the outer die 1504 against the outer die mounting collar 1594. Further, in another embodiment, a compliant ring 1602 is disposed between the outer die quick-release coupling body 1580 and the outer die 1504.

In another embodiment, FIGS. 35A-35E the outer die quick-release coupling 1506 includes a toroid body with a number of inwardly radially extending, arced locking members 1542. The outer die quick-release coupling body is coupled, directly coupled, or fixed to the outer die mounting collar or a support element fixed to the process shaft assembly shaft 1022. That is, for example, the outer die quick-release coupling 1506 includes a threaded end and a support disk (which is fixed to the process shaft assembly shaft 1022) including a threaded bore corresponding to the outer die quick-release coupling body 1580 threaded end. The outer die quick-release coupling 1506 is fixed to the support disk. The outer die quick-release coupling 1506 includes a number of inwardly radially extending, arced locking members. The outer die body 1520 is disposed within the outer die quick-release coupling 1506, i.e., between the outer die quick-release coupling body 1580 and the collar 1594 or support disk, and is structured to move between an unlocked first position, wherein the outer die body locking members 1540 are not aligned with the outer die quick-release coupling body locking members 1542 (and, therefore, can be moved past the outer die quick-release coupling body locking members 1542 when moved away from the collar or support disk), and, a locked second position, wherein the outer die body locking members 1540 are aligned with the outer die quick-release coupling body locking members 1542. Further, the outer die quick-release coupling body locking members 1542 and/or the outer die body locking members 1540 are made from a compliant material, or, have a sufficient thickness, so that when the elements are in the locked second position, the outer die body is biased against the collar or the support disk.

In this embodiment, the inner die support body second end 1568 includes the annular locking channel 1570, as described above. The inner die assembly 1514 is coupled to the knockout ram assembly inner die mounting cavity 1047 (also identified herein as the "knockout ram assembly body cavity" 1047) by a quick-release mounting assembly 1410 that is substantially similar to the one described above. That is, the quick-release mounting assembly 1410 is disposed in the knockout ram assembly body cavity 1047 (which is threaded or otherwise structured to be coupled, directly coupled, or fixed to the quick-release mounting assembly 1410). The inner die support body second end locking channel 1570 engages the ball(s) of the quick-release mounting assembly 1410.

Figure 44:
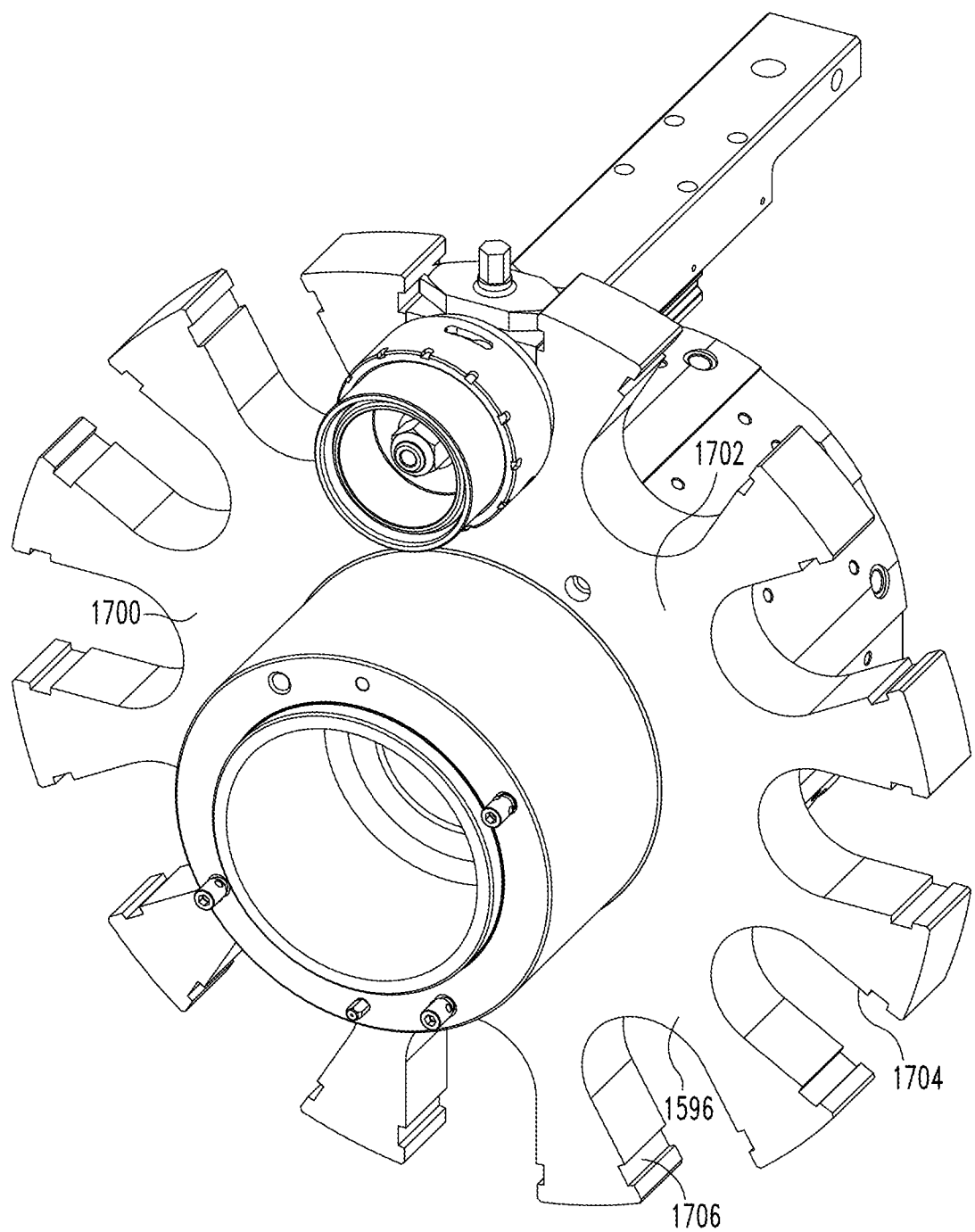
FIG. 44 is an isometric view of another embodiment of an outer die assembly quick-change die assembly.
Figure 45:
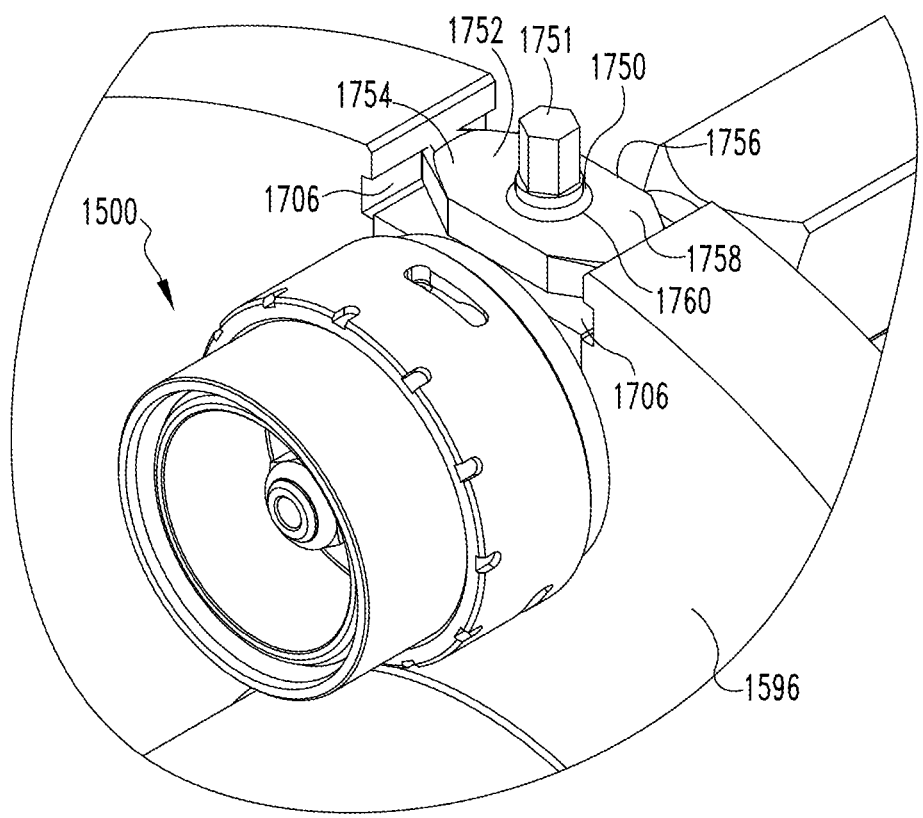
FIG. 45 is a detail isometric view of the embodiment of an outer die assembly quick-change die assembly shown in FIG. 44.

In another embodiment, the outer die mounting, the outer die, the outer die quick-release coupling, the inner die mounting, the inner die assembly, and the inner die quick-release coupling, are a unit assembly. In this embodiment, shown in FIGS. 44-45, the process shaft assembly shaft 1022 includes a mounting disk 1700. The process shaft assembly shaft mounting disk 1700 includes a body 1702 with a number of peripheral, radial cutouts 1704. The mounting disk body radial cutouts 1704 include axially extending locking channels 1706. As shown, the mounting disk body radial cutouts 1704 are generally U-shaped and open toward the radial surface of the process shaft assembly shaft mounting disk body 1702.

In this embodiment, the outer die mounting includes a generally planar body that is structured to correspond to the mounting disk body radial cutouts. The outer die mounting body includes a radial surface (which is the surface generally parallel to the mounting disk body 1702 radial surface). The outer die quick-release coupling includes a locking pawl assembly 1750 disposed on the outer die mounting body radial surface. The locking pawl assembly includes a pivot pin 1751 and an elongated pawl body 1752. The locking pawl assembly pawl body 1752 includes a first end 1754, a medial portion 1756, and a second end 1758. The locking pawl assembly pawl body medial portion defines a pivot pin passage 1760. The locking pawl assembly pawl body first end 1754 and the locking pawl assembly pawl body second end 1758 are structured to engage the mounting disk body locking channels 1706. The locking pawl assembly pawl body 1752 is rotatably coupled to the locking pawl assembly pivot pin 1751. In this configuration, the locking pawl assembly 1750 is structured to move between an unlocked, first configuration, wherein the locking pawl assembly pawl body first end 1754 and the locking pawl assembly pawl body second end 1758 do not engage the mounting disk body locking channels 1706, and, a locked, second configuration wherein the locking pawl assembly pawl body first end 1754 and the locking pawl assembly pawl body second end engage 1758 the mounting disk body locking channels 1706.

Further, in this embodiment, the inner die support body second end 1568 includes a radial access cavity 1572 and the inner die mounting 1042 includes a rotational coupling lug 1048. Thus, in this configuration, the outer die and the inner die, and the elements coupled thereto, are structured to be, and are, removed from the process shaft assembly shaft 1022 as a unit assembly. Further, these elements, i.e., the unit assembly, are moved radially relative to the process shaft assembly shaft 1022.

As is known, it is desirable to apply positive pressure to the interior of the can bodies 1 as the can bodies 1 are being formed at the forming stations 20. The positive pressure helps the can bodies resist damage during forming. Accordingly, each inboard turret assembly 1000, or each process shaft assembly 1020 includes a rotary manifold assembly 1800 structured to supply positive pressure to each process shaft assembly die assembly 1060. It is understood that the process shaft assembly shaft 1022, or elements fixed thereto, define a number of generally longitudinal passages 1028 each having an inlet 1027 and an outlet 1029. Each process shaft assembly shaft outlet 1029 is structured to be, and is, in fluid communication with an associated process shaft assembly die assembly 1060. Each process shaft assembly shaft inlet 1027 is disposed adjacent, or immediately adjacent, the rotary manifold assembly 1800.

Figure 47:
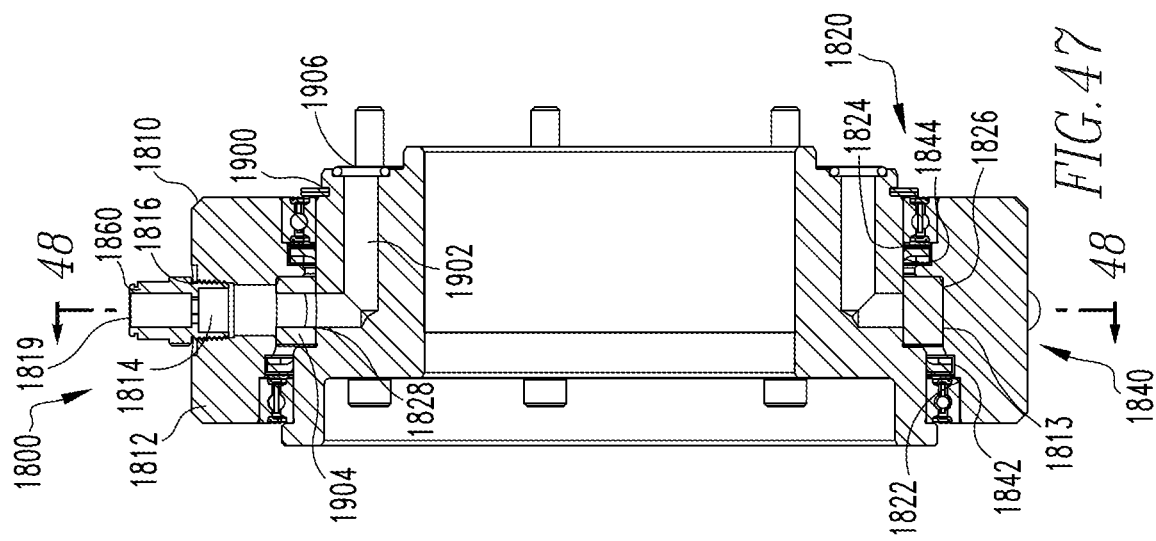
FIG. 47 is a radial cross-sectional view of a rotary manifold.
Figure 46:
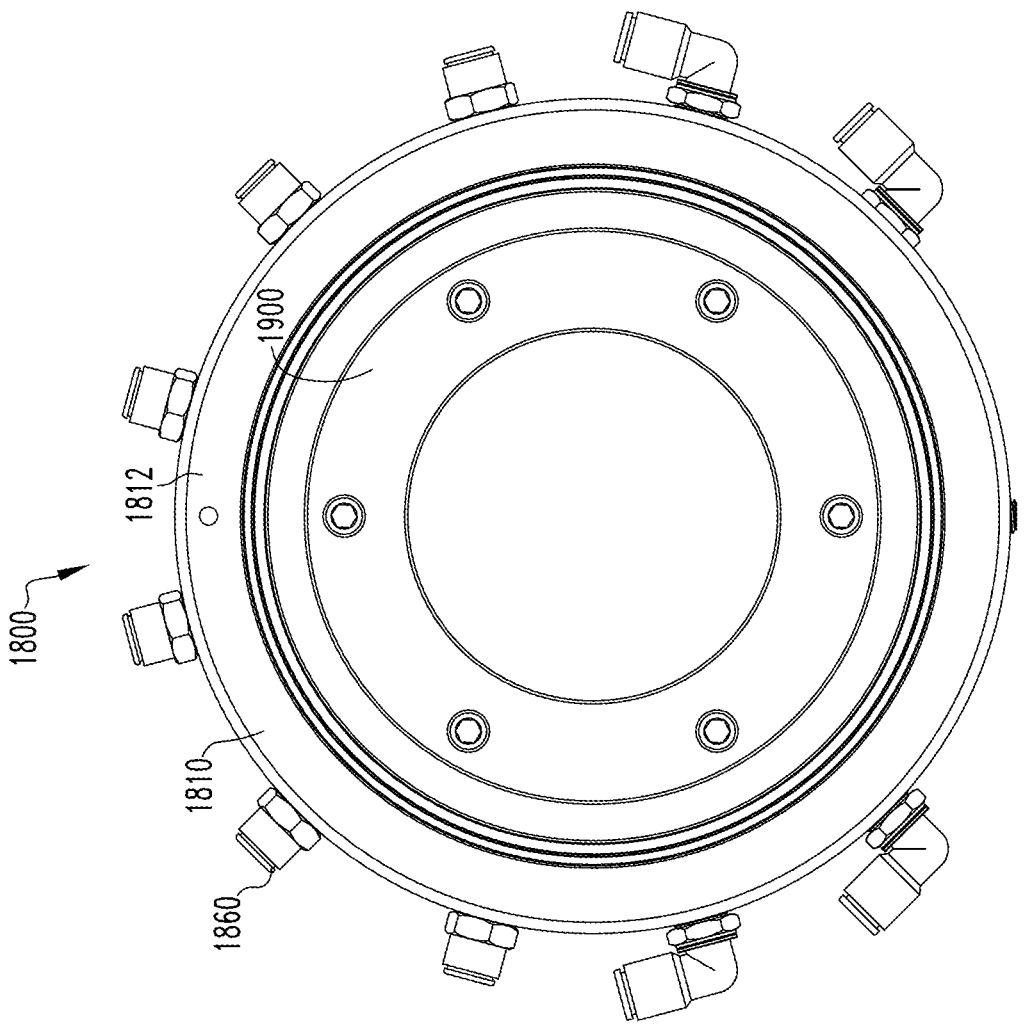
FIG. 46 is an axial view of a rotary manifold.
Figure 48:
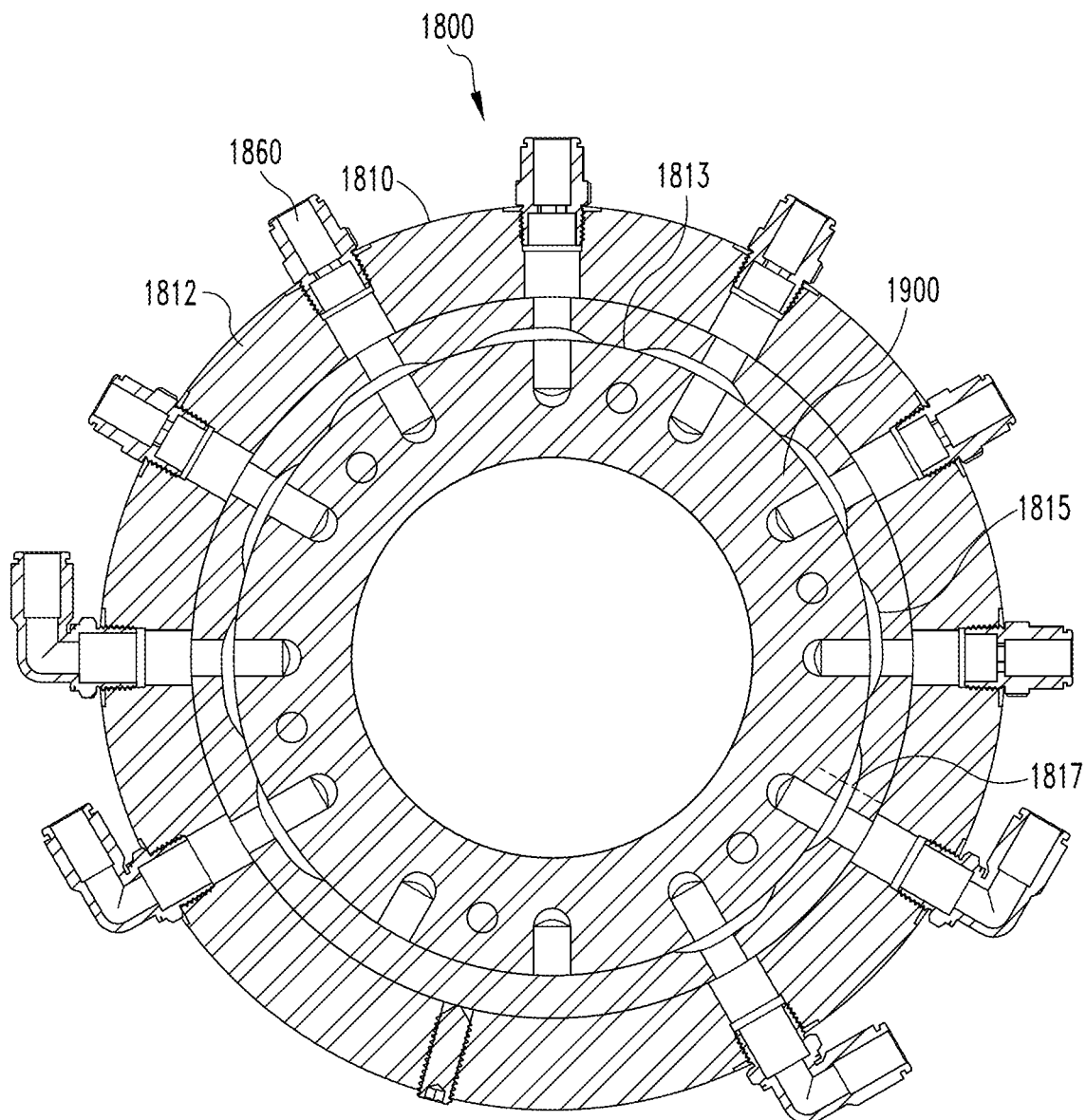
FIG. 48 is an axial cross-sectional view of a rotary manifold.

In an exemplary embodiment, as shown in FIGS. 46-48, the rotary manifold assembly 1800 includes an outer body assembly 1810 and an inner body 1900. As discussed herein, the various seals, bearings, etc., are identified as part of the manifold assembly outer body assembly 1810. That is, the manifold assembly outer body assembly 1810 includes a generally toroid outer body 1812, a number of bearing assemblies 1820, a number of seals 1840, and a number of fluid couplings 1860. The manifold assembly outer body 1812 is structured to be, and is, coupled in a generally fixed position to the frame assembly 12. As used herein, a "generally fixed position" means that one element is able to rotate about, but not with, a generally circular or cylindrical element but not move longitudinally on that element. Thus, the manifold assembly outer body 1812 is structured to rotate about, but not with, the process shaft assembly shaft 1022, as discussed below.

The manifold assembly outer body assembly body 1812 defines a number of radial passages 1814. Each manifold assembly outer body assembly body radial passage 1814 includes an inlet 1816 and an outlet 1818. The manifold assembly outer body assembly body radial passages 1814 are disposed in a common axial plane within the manifold assembly outer body assembly body 1812. In an exemplary embodiment, the plane of the manifold assembly outer body assembly body radial passages 1814 is disposed substantially at the middle of the manifold assembly outer body assembly body 1812.

Further, the manifold assembly outer body assembly body 1812 includes an inner surface 1813. The manifold assembly outer body assembly body inner surface 1813 includes a number of "scallops" 1815. As used herein, a "scallop" means a generally concave cavity. Each manifold assembly outer body assembly body inner surface scallop 1815 includes an axial centerline 1817 (a centerline when viewed axially). Each manifold assembly outer body assembly body inner surface scallop 1815 is disposed about (encircling) a manifold assembly outer body assembly body radial passage outlet 1818. As shown, however, the manifold assembly outer body assembly body radial passage outlet 1818 is not, in an exemplary embodiment, disposed on the manifold assembly outer body assembly body inner surface scallop axial centerline 1817. That is, each of the manifold assembly outer body assembly body radial passage outlet 1818 is offset relative to the manifold assembly outer body assembly body inner surface scallop axial centerline 1817.

Each manifold assembly outer body assembly fluid coupling 1860 is structured to be, and is, in fluid communication with a pressure assembly (not shown) structured to produce positive or negative pressure. As discussed herein, the pressure assembly is structured to produce positive pressure. Further, each manifold assembly outer body assembly fluid coupling 1860 is structured to be, and is, in fluid communication with an associated manifold assembly outer body assembly body radial passage inlet 1816.

The generally toroid manifold assembly inner body 1900 defines a number of right angle passages 1902. As used herein, a right angle passage on a toroid body extends from a radial surface on the toroid body to an axial surface on the toroid body. Each manifold assembly inner body passage 1902 includes an inlet 1904 and an outlet 1906. The manifold assembly inner body 1900 is rotatably disposed within the manifold assembly outer body assembly body 1812.

Each manifold assembly outer body assembly bearing assembly 1820 is disposed between the manifold assembly outer body assembly body 1812 and the inner body 1900. In an exemplary embodiment, there are three manifold assembly outer body assembly bearing assemblies; a first annular manifold assembly outer body assembly bearing assembly 1822, a second annular manifold assembly outer body assembly bearing assembly 1824, and an annular manifold assembly outer body assembly low friction bearing 1826. As used herein, an "annular" bearing or seal is a bearing/seal that extends circumferentially about a generally cylindrical body. In an exemplary embodiment, the first annular manifold assembly outer body assembly bearing assembly 1822 and the second annular manifold assembly outer body assembly bearing assembly 1824 are "sealed" bearings. As used herein, a "sealed" bearing includes two races, or similar constructs, that are sealingly coupled to each other and which include bearing elements such as, but not limited to, ball bearings, disposed between the races. In an exemplary embodiment, the annular manifold assembly outer body assembly low friction bearing 1826 is an annular bearing including a number of radial passages 1828. Each annular manifold assembly outer body assembly low friction bearing passage 1828 is structured to correspond to (be aligned with) a manifold assembly outer body assembly body radial passage outlet 1818.

The first annular manifold assembly outer body assembly bearing assembly 1822 is disposed on a first, axial side of the manifold assembly outer body assembly body radial passages 1814. The second annular manifold assembly outer body assembly bearing assembly 1824 is disposed on a second axial side of the manifold assembly outer body assembly body radial passages 1814. The annular manifold assembly outer body assembly low friction bearing 1826 is disposed in the plane of the manifold assembly outer body assembly body radial passages 1814 with each annular manifold assembly outer body assembly low friction bearing passage 1828 aligned with an associated manifold assembly outer body assembly body radial passage 1814.

In an exemplary embodiment, the manifold assembly outer body assembly number of seals 1840 includes a first annular seal 1842 and a second annular seal 1844. The first seal 1842 is disposed between the first manifold assembly outer body assembly bearing assembly 1822 and the manifold assembly outer body assembly body radial passages 1814. The second seal 1844 is disposed between the second manifold assembly outer body assembly bearing assembly 1824 and the manifold assembly outer body assembly body radial passages 1814. That is, the manifold assembly outer body assembly number of seals 1840 are structured to, and do, resist positive pressure fluid from impinging upon the first annular manifold assembly outer body assembly bearing assembly 1822 and the second annular manifold assembly outer body assembly bearing assembly 1824.

The rotary manifold assembly 1800 is assembled as follows. The manifold assembly inner, body 1900 is rotatably disposed within the manifold assembly outer body assembly body 1812 with the number of bearing assemblies 1820 and the number of seals 1840 disposed therebetween as described above. The manifold assembly inner body 1900 is fixed to the process shaft assembly body 1022. Thus, the manifold assembly inner body 1900 rotates with the process shaft assembly body 1022. Each manifold assembly outer body assembly fluid coupling 1860 is coupled to, and placed in fluid communication with, an associated manifold assembly outer body assembly body radial passage inlet 1816. The manifold assembly outer body assembly body 1812 is coupled in a generally fixed position to the frame assembly 12. That is, the manifold assembly outer body assembly body 1812 is circumferentially rotatable relative to the axis of rotation of the process shaft assembly body 1022. Thus, the manifold assembly outer body assembly body 1812 can be rotated about the process shaft assembly body 1022.

In this configuration, each manifold assembly inner body passage inlet 1904 is structured to be, and is, discontinuously in fluid communication with the manifold assembly outer body assembly body passage outlets 1818. That is, when a manifold assembly inner body passage inlet 1904 rotates to be aligned with a manifold assembly outer body assembly body passage outlets 1818 (or an associated scallop 1815), the manifold assembly inner body passage inlet 1904 is in fluid communication with that manifold assembly outer body assembly body passage outlet 1818. As the manifold assembly inner body passage inlet 1904 continues to rotate, the manifold assembly inner body passage inlet 1904 moves out of fluid communication with that manifold assembly outer body assembly body passage outlet 1818. Further rotation of the manifold assembly inner body passage inlet 1904 moves the rotation of the manifold assembly inner body passage inlet 1904 into fluid communication with the next manifold assembly outer body assembly body passage outlet 1818. As used herein, this type of intermittent fluid communication is defined as "discontinuously in fluid communication." Similarly, each manifold assembly inner body passage outlet 1906 is structured to be, and is, discontinuously in fluid communication with the process shaft assembly body passages inlets 1027.

Further, in this configuration, the interface between the manifold assembly outer body assembly 1810 and the manifold assembly inner body 1900 is an axially extending interface. This solves the problems noted above. Further, in this configuration, neither the manifold assembly outer body assembly 1810 nor the manifold assembly inner body 1900 includes a seal biasing assembly. Thus, no seal is biased toward the rotating elements, i.e., the manifold assembly inner body 1900. This solves the problems noted above.

Figure 50:
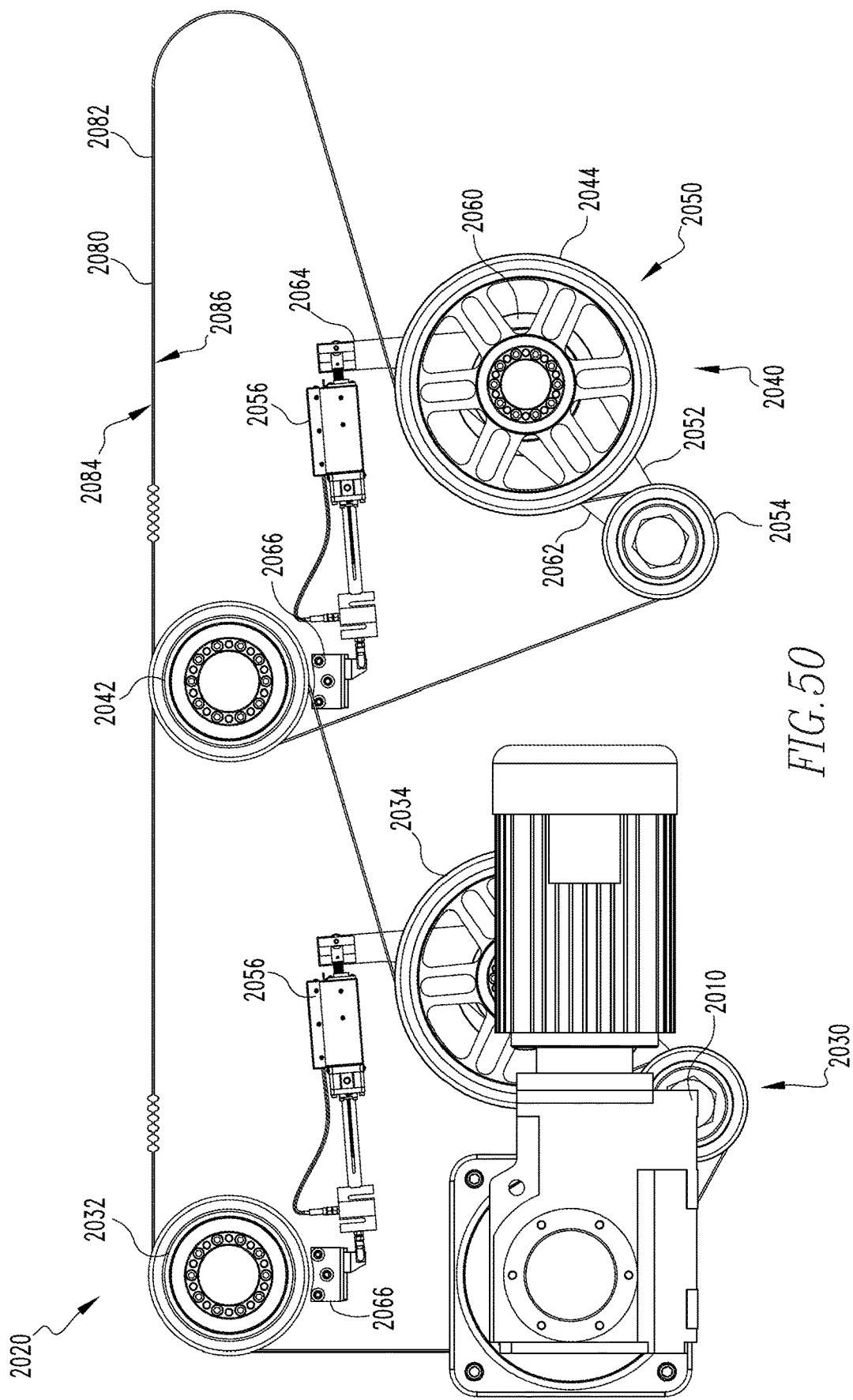
FIG. 50 is a rear view of selected elements of a drive assembly.
Figure 51:
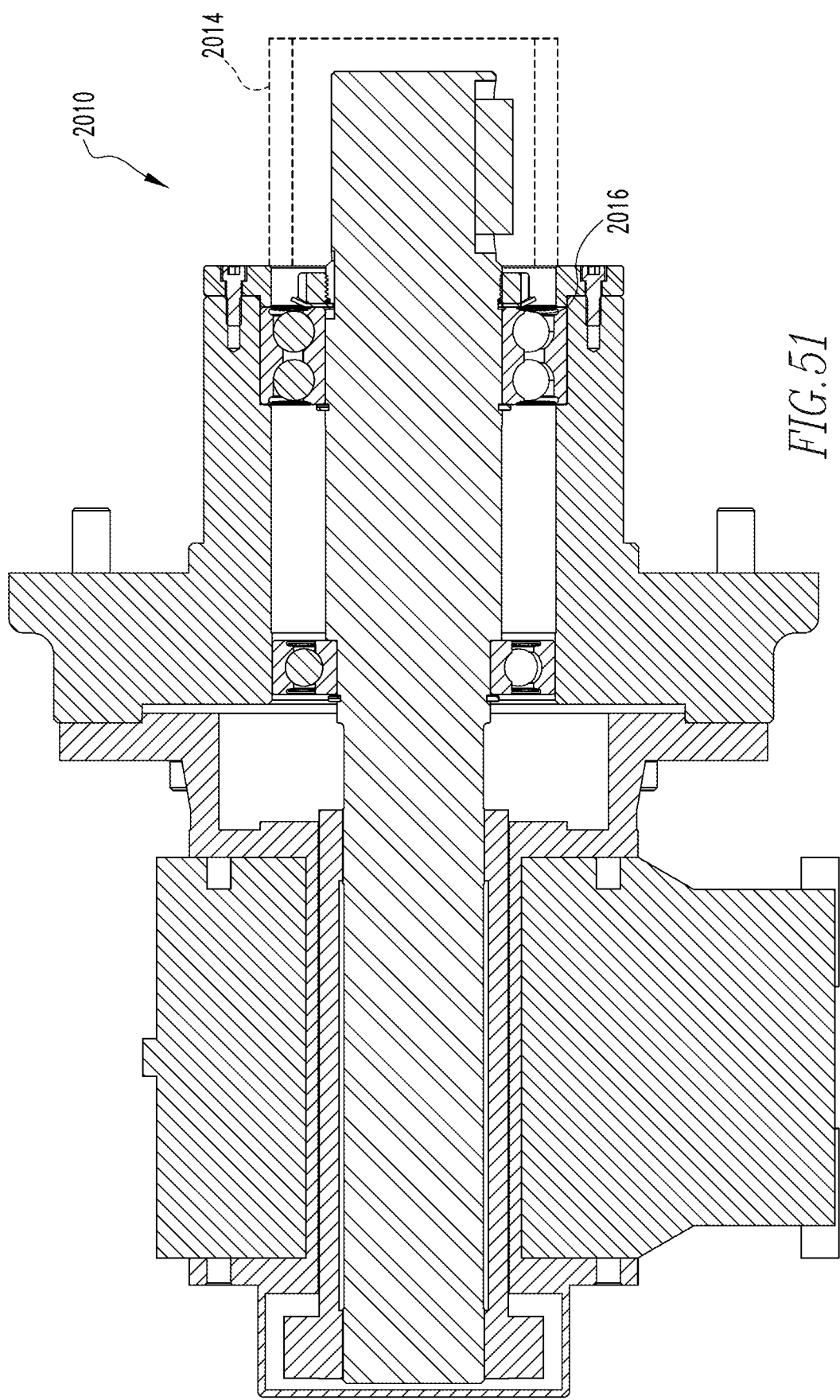
FIG. 51 is a cross-sectional view of drive assembly components.
Figure 52:
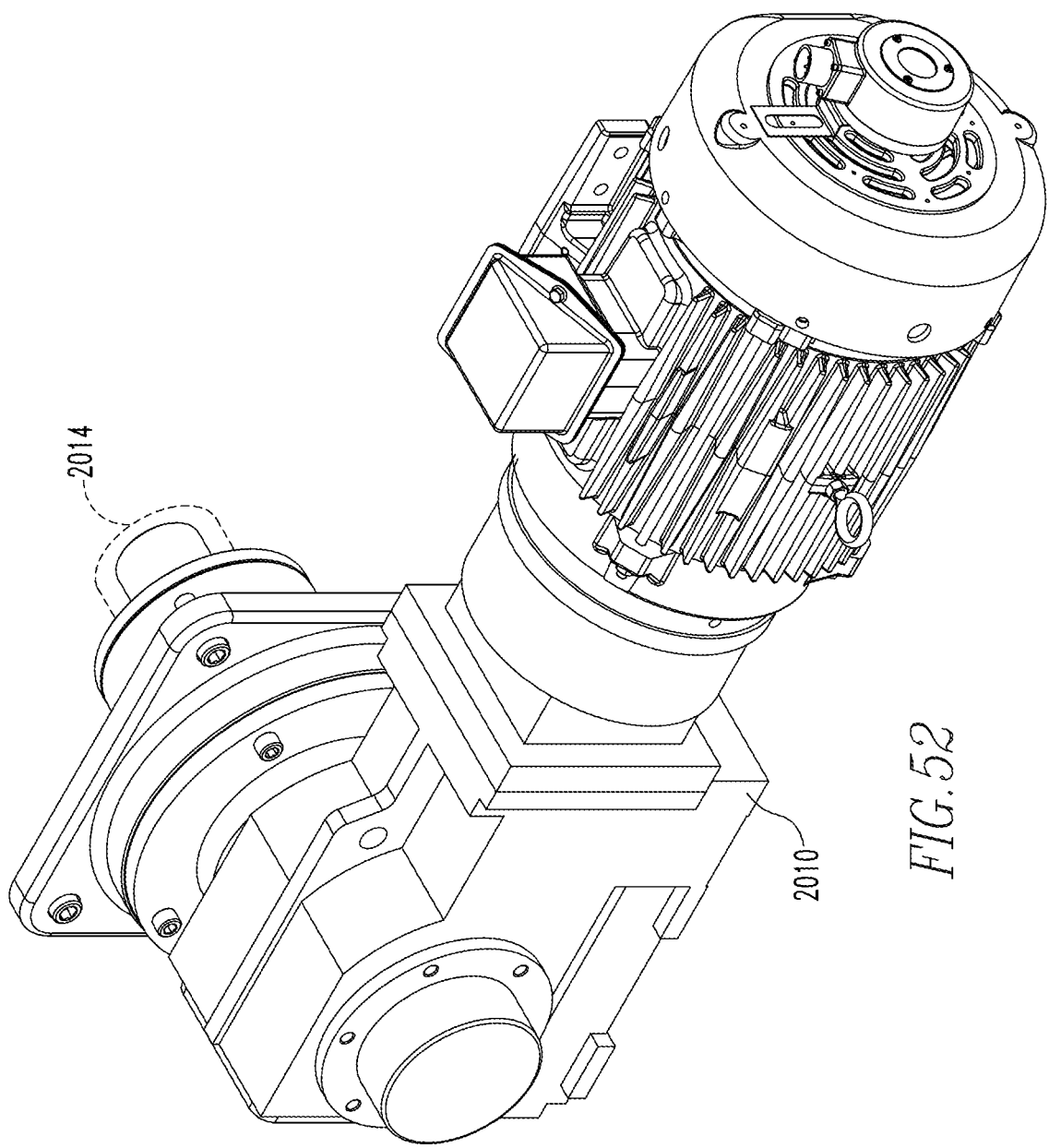
FIG. 52 is an isometric view of drive assembly components.
Figure 53:
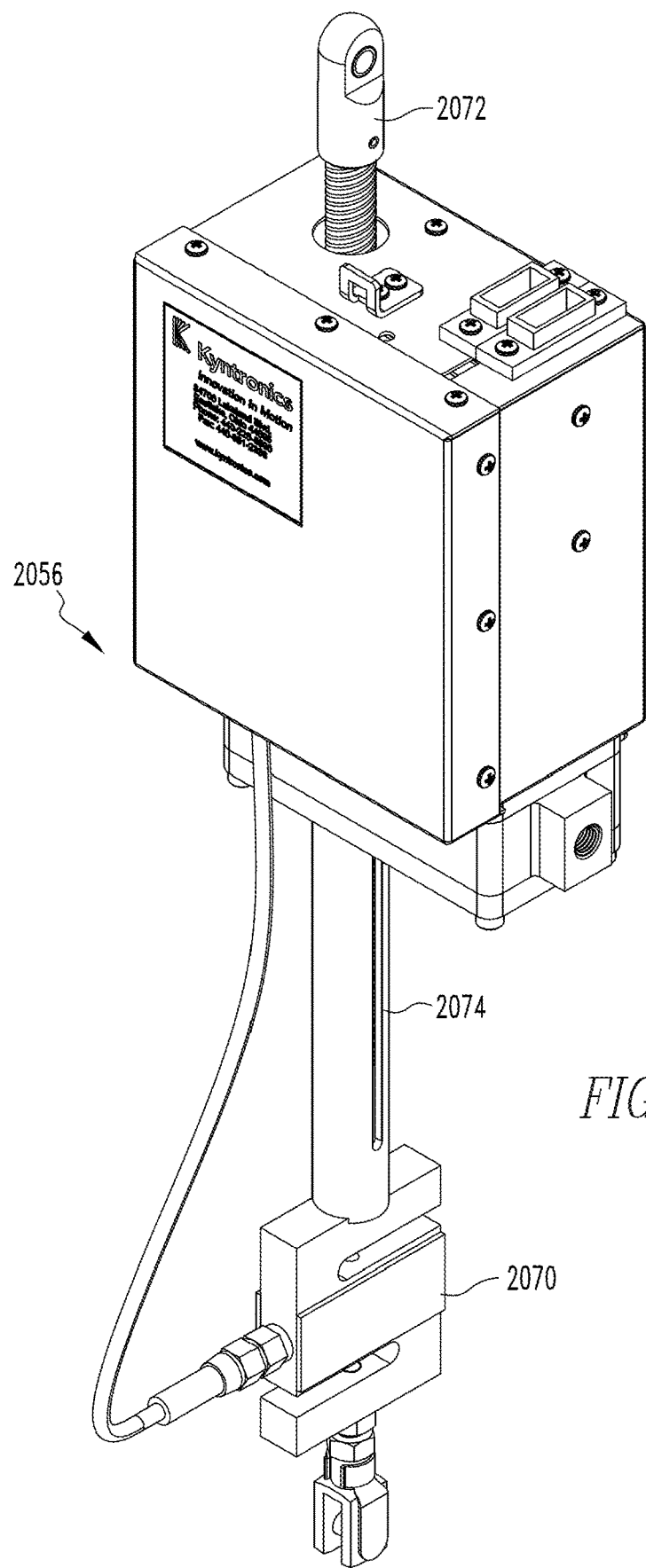
FIG. 53 is an isometric view of other drive assembly components.

The drive assembly 2000 is structured to, and does, provide rotational motion to an element of each processing station 20. That is, as shown in FIGS. 49 and 50, each processing station 20 includes a number of drive shafts 2002 such as, but not limited to, the rotating shaft assembly rotating shaft 416. As used herein, any of the "number of drive shafts 2002" represents a drive shaft which is a part of a processing station 20; selected drive shafts 2002 have been discussed above and have an additional reference number associated therewith. In an exemplary embodiment, and at a processing station 20, the drive assembly 2000 is operatively coupled to the rotating shaft assembly rotating shaft 416 and the process shaft assembly shaft 1022.

As shown, each processing station 20 includes a processing station first drive shaft 2002A and a processing station second drive shaft 2002B. Further, the number of processing stations 20 includes a number of station pairs 2004. As used herein, a "station pair" means two adjacent processing stations; a first station 2004A and a second station 2004B. As shown, the necker machine 10 includes a plurality of station pairs 2004. For example, as shown, there is a first station pair 2004' (which includes a first station 2004A' and a second station 2004B'), and, a second station pair 2004" (which includes a first station 2004A" and a second station 2004B").

In an exemplary embodiment, the drive assembly 2000 includes a plurality of motors 2010, a plurality of drive wheel assemblies 2020, and a number of timing drive belts 2080. Each drive assembly motor 2010 includes an output shaft 2012 and a drive wheel 2014. As used herein, a "drive wheel" is a wheel that is structured to, and does, operatively engage timing/drive belts 2080. That is, in an exemplary embodiment, each "drive wheel" includes teeth that correspond to teeth on a timing/drive belt 2080. Further, as used herein, a "drive wheel" is fixed to a processing station drive shaft 2002 or a motor output shaft 2012. Further, each drive assembly motor 2010 includes an angular contact bearing 2016. As used herein, an "angular contact bearing" is a bearing that is structured to, and does, decouple the axial loads applied to the angular contact bearing from the shaft about which the angular contact bearing 2016 is disposed. The drive assembly motor angular contact bearing 2016 is disposed about the drive assembly motor output shaft 2012. Thus, each drive assembly motor output shaft 2012 is decoupled from all axial loads.

Each drive wheel assembly 2020 is structured to be, and is, operatively coupled to an associated processing station drive shaft 2002. Each drive wheel assembly 2020 includes a driver assembly 2030 and a driven assembly 2040. Each drive wheel assembly driver assembly 2030 includes a first drive wheel 2032 and a second drive wheel 2034, and, each drive wheel assembly driven assembly 2040 includes a first drive wheel 2042 and a second drive wheel 2044. Each drive wheel assembly driver assembly 2030 is directly and operatively coupled to a motor output shaft 2012. As used herein, "directly and operatively coupled" means that a timing/drive belt 2080 extends directly between the two elements that are "directly and operatively coupled." Each drive wheel assembly driven assembly 2040 is not "directly and operatively coupled" to a motor output shaft 2012.

That is, each drive wheel assembly driver assembly 2030, i.e., the drive first wheel 2032 and a second drive wheel 2034 thereof, is operatively coupled to the drive shafts 2002 of a first station 2004A and each drive wheel assembly driven assembly 2040, i.e., the first drive wheel 2042 and the second drive wheel 2044 thereof, is operatively coupled to the drive shafts 2002 of a second station 2004B. Further, to form the meshed link among the number of motors, at least one timing/drive belts 2080 extends between, and is operatively coupled to, adjacent station pairs 2004. That is, for example a timing/drive belt 2080 from one drive wheel assembly 2020 extends between, and is operatively coupled to an adjacent wheel assembly 2020. This is accomplished by including one double wide drive wheel in each drive wheel assembly 2020. As used herein, a "double wide drive wheel" is a drive wheel having an axial length sufficient to accommodate a plurality of timing/drive belts 2080. As shown, each drive wheel assembly driver assembly first drive wheel 2032 is a double wide drive wheel. Thus, at least one timing/drive belt 2080 is operatively coupled to both a first station pair 2004' and a second station pair 2004".

Further, each drive wheel 2014, 2032, 2034, 2042, 2044 is a "cantilevered drive wheel." As used herein, a "cantilevered drive wheel" means a drive wheel wherein the drive wheel is outboard of any support bearings; this enables the timing/drive belts 2080 to be changed without removing any parts from the necker machine 10. Further, all the drive wheels 2014, 2032, 2034, 2042, 2044 are disposed generally in the same plane. Thus, the drive elements, i.e., the tinting/ drive belts 2080 are in easy to access locations. As used herein, an "easy to access" location is one that requires the removal of one or more other components prior to accessing the fastener wherein the "other component" is an access device such as, but not limited to, a door or housing panel.

In an exemplary embodiment, each drive wheel assembly 2020 includes a number of tensioner assemblies 2050. As shown, each drive wheel assembly driver assembly 2030 and each drive wheel assembly driven assembly 2040 includes a tensioner assembly 2050. The tensioner assemblies 2050 are substantially similar and only one is described. The tensioner assembly 2050 includes a tensioner assembly mounting 2052, a tensioner wheel 2054 and a tensioner device 2056. Each tensioner assembly mounting 2052 includes a hub 2060 with a first radial arm 2062 and a second radial arm 2064, and, a bracket 2066. The tensioner assembly mounting hub 2060 is, in an exemplary embodiment, a toroid body that is disposed about a process station drive shaft 2002. The tensioner assembly tensioner wheel 2054 (which is similar to a drive wheel but is not fixed to a drive shaft 2002) is rotatably coupled to the tensioner assembly mounting hub first radial arm 2062. It is understood that a timing/drive belt 2080 operatively engages the tensioner assembly tensioner wheel 2054.

The tensioner assembly tensioner device 2056 is structured to detect the tension in an associated timing/drive belt 2080, i.e., the timing/drive belt 2080 operatively engaging the drive wheel 2014, 2032, 2034, 2042, 2044 to which the tensioner assembly 2050 is directly coupled. Each tensioner assembly tensioner device 2056 includes a sensor 2070, a first input member 2072 and a second input member 2074. In an exemplary embodiment, the tensioner assembly tensioner device sensor 2070 is a load cell. Both the tensioner assembly tensioner device first input member 2072 and the tensioner assembly tensioner device second input member 2074 are operatively coupled to the tensioner assembly tensioner device sensor 2070. The tensioner assembly tensioner device first input member 2072 is operatively coupled to the tensioner assembly mounting hub second radial arm 2064. The tensioner assembly tensioner device second input member 2074 is operatively coupled to the tensioner assembly mounting bracket 2066. The tensioner assembly mounting bracket 2066 is fixed to the frame assembly 12. Further, the tensioner assembly tensioner device 2056 is disposed generally in the same plane as the drive wheels 2014, 2032, 2034, 2042, 2044. In an exemplary embodiment, the tensioner assembly tensioner device 2056 is structured to adjust the tension in an associated timing/drive belt 2080.

Each timing/drive belt 2080 is structured to be, and is, operatively coupled to each drive wheel assembly, i.e., all the timing/drive belts 2080 are operatively coupled to all the drive wheel assemblies 2020. As used herein, a "timing/ drive belt" is a belt that is structured to, and does, provide a drive function and a timing function. In an exemplary embodiment, each timing/drive belts 2080 includes an elongated body 2082 having a first side 2084 and a second side 2086. Both timing/drive belt body first side and second side 2084, 2086, have teeth thereon. In an exemplary embodiment, all the timing/drive belts 2080 are operatively coupled to all the drive wheel assembly drive wheels 2032, 2034, 2042, 2044. In this configuration, the timing/drive belts 2080 form a meshed link among the plurality of motors 2010. As used herein, a "meshed link" means a configuration wherein all the timing/drive belts 2080 are operatively coupled to all the drive wheel assemblies 2020. Further, a drive assembly 2000 utilizing timing/drive belts 2080 does not require a lubrication system for a drive shaft linkage. A drive assembly 2000 in the configuration describe herein solves the problems noted above.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof

What is claimed is:

1. A quick-change starwheel guide assembly structured to be coupled to a starwheel guide assembly mounting base, said quick-change starwheel guide assembly comprising:
a starwheel guide assembly mounting assembly;
a starwheel guide assembly support assembly;
a number of starwheel guide assembly guiderails;
a starwheel guide assembly can body height adjustment assembly;
said starwheel guide assembly mounting assembly coupled to said starwheel guide assembly support assembly;
said number of starwheel guide assembly guiderails coupled to said starwheel guide assembly mounting assembly;
said starwheel guide assembly can body height adjustment assembly coupled to at least one said starwheel guide assembly guiderail; and
wherein at least one of said starwheel guide assembly mounting assembly or said can body height adjustment assembly is a quick-change assembly;
said starwheel guide assembly mounting assembly includes a body;
said starwheel guide assembly mounting assembly body defines a single active coupling passage; and
said starwheel guide assembly mounting assembly body single active coupling passage structured to be coupled to a single starwheel guide assembly mourning base retained coupling.

2. The quick-change starwheel guide assembly of claim 1 wherein:
said starwheel guide assembly mounting assembly is quick-change starwheel guide assembly mounting assembly; and
said starwheel guide assembly can body height adjustment assembly is a quick-change can body height adjustment assembly.

3. The quick-change starwheel guide assembly of claim 1 wherein said starwheel guide assembly mounting base defines a positioning contour and wherein:
said starwheel guide assembly mounting assembly body defines a positioning contour; and
said starwheel guide assembly mounting assembly body positioning contour corresponding to said starwheel guide assembly mounting base assembly positioning contour.

4. The quick-change starwheel guide assembly of claim 1 wherein said starwheel guide assembly mounting assembly, said star heel guide assembly support assembly, said number of starwheel guide assembly guiderails, and said starwheel guide assembly can body height adjustment assembly define a unit assembly.

5. A quick-change starwheel guide assembly structured to be coupled to a starwheel guide assembly mounting base, said quick-change starwheel guide assembly comprising:
a starwheel guide assembly mounting assembly;
a starwheel guide assembly support assembly;
a number of starwheel guide assembly guiderails;
a starwheel guide assembly can body height adjustment assembly;
a starwheel guide assembly mounting assembly coupled to said starwheel guide assembly support assembly;
said number of starwheel guide assembly guiderails coupled to said starwheel guide assembly mounting assembly;
said starwheel guide assembly can body height adjustment assembly coupled to at least one said starwheel guide assembly guiderail; and
wherein at least one of said starwheel guide assembly mounting assembly or said can body height adjustment assembly is a quick-change assembly;
said starwheel guide assembly mounting assembly includes a body;
said starwheel guide assembly support assembly includes an elongated first support member and an elongated second support member;
said starwheel guide assembly support assembly support first and second members extending from said starwheel guide assembly mounting assembly body;
wherein said starwheel guide assembly support assembly first and second support members are spaced from each other;
said number of starwheel guide assembly guiderails including an inner guiderail and an outer guiderail;
said outer guiderail including an elongated rail body and said quick-change can body height adjustment assembly; and
said outer guiderail movably coupled to said starwheel guide assembly support assembly support members.

6. The quick-change starwheel guide assembly of claim 5 wherein:
said quick-change can body height adjustment assembly includes a primary body, a secondary body, and a single retained coupling;
said quick-change can body height adjustment assembly primary body defining a single coupling passage;
said quick-change can body height adjustment assembly retained coupling adjustably fixed to said quick-change can body height adjustment assembly secondary body;
said quick-change can body height adjustment assembly retained coupling extending through said quick-change can body height adjustment assembly primary body coupling passage; and
wherein said quick-change can body height adjustment assembly secondary body is movably coupled to said quick-change can body height adjustment assembly primary body.

7. The quick-change starwheel guide assembly of claim 6 wherein:
said quick-change can body height adjustment assembly primary body defines a first support member channel and a second support member channel;
said quick-change can body height adjustment assembly primary body first support member channel and said quick-change can body height adjustment assembly primary body second support member channel correspond to said starwheel guide assembly support assembly support first and second members;
said quick-change can body height adjustment assembly secondary body defining a first engagement surface and a second engagement surface;
said quick-change can body height adjustment assembly secondary body first engagement surface and said quick-change can body height adjustment assembly secondary body second engagement surface are positioned to correspond to said starwheel guide assembly support assembly support first and second members;
said starwheel guide assembly support assembly first support member is disposed between said quick-change can body height adjustment assembly primary body first support member channel and said quick-change can body height adjustment assembly secondary body first engagement surface;

said starwheel guide assembly support assembly second support member is disposed between said quick-change can body height adjustment assembly primary body second support member channel and said quick-change can body height adjustment assembly secondary body second engagement surface; and wherein said quick-change can body height adjustment assembly secondary body moves between a non-engaging first position, wherein said quick-change can body height adjustment assembly secondary body first engagement surface and said quick-change can body height adjustment assembly secondary body second engagement surface do not engage said starwheel guide assembly support assembly support first and second members, and an engaging second position, wherein said quick-change can body height adjustment assembly secondary body first engagement surface and said quick-change can body height adjustment assembly secondary body second engagement surface engage said starwheel guide assembly support assembly support first and second members.

8. The quick-change starwheel guide assembly of claim 7 wherein:
said quick-change can body height adjustment assembly primary body first support member channel defines a reduced contact surface; and
said quick-change can body height adjustment assembly primary body second support member channel defines a reduced Contact surface.

9. The quick-change starwheel guide assembly of claim 8 wherein:
said starwheel guide assembly support assembly support first and second members are generally cylindrical;
said quick-change can body height adjustment assembly primary body first support member channel is an inverted generally V-shaped channel; and
said quick-change can body height adjustment assembly primary body second support member channel is an inverted generally V-shaped channel.

10. A necker machine comprising:
a frame assembly;
said necker machine frame assembly including a number of starwheel guide assembly mounting assemblies;
a number of quick-change starwheel guide assembles;
each quick-change starwheel guide assembly including a starwheel guide assembly mounting assembly, a starwheel guide assembly support assembly, a number of starwheel guide assembly guiderails, and a starwheel guide assembly can body height adjustment assembly;
said starwheel guide assembly mounting assembly coupled to said starwheel guide assembly support assembly;
said number of starwheel guide assembly guiderails coupled to said starwheel guide assembly mounting assembly;
said starwheel guide assembly can body height adjustment assembly couple to at least one said starwheel guide assembly guiderail; and
wherein at least one of said starwheel guide assembly mounting assembly or said can body height adjustment assembly is a quick-change assembly;
each single starwheel guide assembly mounting base includes a single retained coupling;
each starwheel guide assembly mounting assembly includes a body;
each starwheel guide assembly mounting assembly body defines a single active coupling passage; and
each starwheel guide assembly mounting assembly body single active coupling passage coupled to a single starwheel guide assembly mounting base retained coupling.

11. The necker machine of claim 10 wherein:
each starwheel guide assembly mounting assembly is a quick-change starwheel guide assembly mounting assembly; and
each starwheel guide assembly can body height adjustment assembly is a quick-change can body height adjustment assembly.

12. The necker machine of claim 10 wherein:
each starwheel guide assembly mourning base defines a positioning contour;
each starwheel guide assembly mounting assembly body defines a positioning contour; and
each starwheel guide assembly mounting assembly body positioning contour corresponding to said starwheel guide assembly mounting base positioning contour.

13. The necker machine of claim 12 each quick-change starwheel guide assembly is a unit assembly.

14. The necker machine of claim 10 wherein:
each starwheel guide assembly mounting assembly includes a body;
each starwheel guide assembly support assembly includes an elongated first support member and an elongated second support member;
each starwheel guide assembly support assembly support first and second members extending from said starwheel guide assembly mounting assembly body;
wherein each starwheel guide assembly support assembly first and second sup members are spaced from each other;
said number of starwheel guide assembly guiderails including an inner guiderail and an outer guiderail;
each outer guiderail including an elongated rail body and said quick-change can body height adjustment assembly; and
each outer guiderail movably coupled to said starwheel guide assembly support assembly support members.

15. The necker machine of claim 1 wherein:
each quick-change can body height adjustment assembly includes a primary body, a secondary body, and a single retained coupling;
each quick-change can body height adjustment assembly primary body defining a single coupling passage;
each quick-change can body height adjustment assembly retained coupling adjustably fixed to said quick-change can body height adjustment assembly secondary body;
each quick-change can body height adjustment assembly retained coupling extending through said quick-change can body height adjustment assembly primary body coupling passage; and
wherein each quick-change can body height adjustment assembly secondary body is movably coupled to said quick-change can body height adjustment assembly primary body.

16. The necker machine of claim 15 wherein:
each quick-change can body height adjustment assembly primary body defines a first support member channel and a second support member channel;
each quick-change can body height adjustment assembly primary body first support member channel and said quick-change can body height adjustment assembly primary body second support member channel correspond to said starwheel guide assembly support assembly support first and second members;

each quick-change, can body height adjustment assembly secondary body defining a first engagement surface and a second engagement surface;

each quick-change can body height adjustment assembly secondary body first engagement surface and said quick-change can body height adjustment assembly secondary body second engagement surface are positioned to correspond to said starwheel guide assembly support assembly support first and second members;

each starwheel guide assembly support assembly first support member is disposed between said quick-change can body height adjustment assembly primary body first support member channel and said quick-change can body height adjustment assembly secondary body first engagement surface;

each starwheel guide assembly support assembly second support member is disposed between said quick-change can body height adjustment assembly primary body second support member channel and a quick-change can body height adjustment assembly secondary body second engagement surface; and wherein each quick-change can body height adjustment assembly secondary body moves between a non-engaging first position, wherein each quick-change can body height adjustment assembly secondary body first engagement surface and each quick-change can body height adjustment assembly secondary body second engagement surface do not engage an associated starwheel guide assembly support assembly support first or second members, and an engaging second position, wherein each quick-change can body height adjustment assembly secondary body first engagement surface and each quick-change can body height adjustment assembly secondary body second engagement surface engage an associated starwheel guide assembly support assembly support first or second member.

17. The necker machine of claim 16 wherein:

each quick-change can body height adjustment assembly primary body first support member channel defines a reduced contact surface; and each quick-change can body height adjustment assembly primary body second support member channel defines a reduced contact surface.

18. The necker machine of claim 17 wherein:

each starwheel guide assembly support assembly support first and second rr embers are generally cylindrical;

each quick-change can body height adjustment assembly primary body first support member channel is an inverted generally V-shaped channel; and each quick-change can body height adjustment assembly primary body second support member channel is an inverted generally V-shaped channel.

* * * * *